(12) United States Patent
Tinker et al.

(10) Patent No.: US 12,117,576 B2
(45) Date of Patent: Oct. 15, 2024

(54) NETWORKED SYSTEM AND METHOD FOR PASSIVE MONITORING, LOCATING OR CHARACTERIZING ACTIVITIES

(71) Applicant: Quantum Technology Sciences, Inc., Melbourne, FL (US)

(72) Inventors: Mark Tinker, Rockledge, FL (US); Kevin Hutchenson, Melbourne, FL (US); Paul Nyffenegger, Melbourne, FL (US); Kathryn Englehardt, Indialantic, FL (US); Rex Lowther, Palm Bay, FL (US)

(73) Assignee: Quantum Technology Sciences, Inc., Melbourne, FL (US)

( * ) Notice: Subject to any disclaimer, the term of this patent is extended or adjusted under 35 U.S.C. 154(b) by 134 days.

(21) Appl. No.: 17/480,059

(22) Filed: Sep. 20, 2021

(65) Prior Publication Data
US 2022/0091289 A1 Mar. 24, 2022

Related U.S. Application Data

(60) Provisional application No. 63/081,234, filed on Sep. 21, 2020, provisional application No. 63/080,666, filed on Sep. 18, 2020.

(51) Int. Cl.
*G01V 1/18* (2006.01)
*G01V 1/30* (2006.01)

(52) U.S. Cl.
CPC . *G01V 1/18* (2013.01); *G01V 1/30* (2013.01)

(58) Field of Classification Search
CPC .................................. G01V 1/18; G01V 1/30
See application file for complete search history.

(56) References Cited

U.S. PATENT DOCUMENTS

| | | | |
|---|---|---|---|
| 2009/0122645 A1* | 5/2009 | Guigne | G01V 1/362 367/56 |
| 2015/0124562 A1* | 5/2015 | Yoneshima | G01V 1/40 367/25 |
| 2017/0146674 A1* | 5/2017 | Kryszczynski | G10K 11/004 |

* cited by examiner

*Primary Examiner* — Isam A Alsomiri
*Assistant Examiner* — Abdallah Abulaban
(74) *Attorney, Agent, or Firm* — Harris Wilson & Christenson PLLC

(57) ABSTRACT

Systems and methods are provided for determining localization information for sources of seismic energy positioned below a ground surface. In accord with one series of embodiments, a method of determining localization information receives data from first seismic sensors in a first three dimensional array containing sensors emplaced below the ground surface and coherently processes the signals to provide three dimensional localization information that enables determination of an angle of arrival for a signal of interest. In combination with data from second seismic sensors in a second three dimensional array the method provides determination of a position in three dimensional space.

12 Claims, 22 Drawing Sheets

3-Sensor String

4-Sensor String

NETWORKED SYSTEM AND METHOD FOR PASSIVE MONITORING, LOCATING OR CHARACTERIZING ACTIVITIES

RELATED APPLICATIONS

This application claims priority to U.S. Provisional Application 63/080,666, filed 18 Sep. 2020 and claims priority to U.S. Provisional Application 63/081,234, filed 21 Sep. 2020. This application is related to U.S. Pat. Nos. 10,401,513 and 9,678,231 and United States Patent Application US2017/0146674 (Ser. No. 15/343,312), each of which is hereby incorporated by reference.

FIELD OF THE INVENTION

Embodiments of the invention relate to systems comprising multi-sensor array configurations for acquisition of seismic signals and determining location of the source of the seismic signals. Signal data may be processed to characterize the source, extract derivation information, and determine that the identified signals originate with a source of interest. More specifically, certain embodiments are useful for passive and persistent monitoring of activities in a local geologic volume to detect subterranean activities within the volume.

BACKGROUND AND SUMMARY OF THE INVENTION

It is desirable to detect natural and manmade underground activities, determine activity characteristics, locate positions of activities and track movement of activities based on three-dimensional position coordinates, identify the nature and sources of the activities, and deliver that information with minimal latency, referred to as "real time" or, in a manner timely enough to facilitate an effective response. Of particular interest are seismic energy sources that occur across multiple categories of subterranean activities that, for example, span the fields of civil, mine, and petroleum engineering, and also include security and surveillance applications where unauthorized underground activities can present significant risks. Such applications include but are not limited to hydraulic fracturing and similar petroleum production activities, monitoring microseismic events associated with underground petroleum storage facilities and reservoirs, underground mining and solution mining, geothermal and enhanced geothermal energy production, underground liquid disposal and analogous operations, and carbon capture and storage operations.

These applications all benefit from a real-time, accurate understanding of the human associated stimulus of the reservoir, whether fluids are being introduced or extracted. This stimulus may or may not result in a seismic "expression" of the reservoir, either observation being important as long as there is confidence in the answer and the answer is timely (near real-time). Activities of interest in fields of security and surveillance include illicit tunnel creation and usage and illegal drilling in horizontal directions, e.g., along the ground plane, and general intrusion by personnel or equipment, vehicle-borne, on foot or remotely controlled.

However, it is particularly difficult to identify and discriminate underground sources from sources positioned along the ground surface, or even above the ground surface without requiring time-consuming involvement by a skilled analyst to detect and interpret signals and, ideally, provide a detailed breakdown of events and sources for establishing associations from which strong inferences may be drawn about occurrences of activities of interest.

In the past, technologies developed for underground exploration and monitoring have typically required use of active sources, a plethora of data acquisition channels, and complete control over the region under exploration. Processing methods associated with these active technologies, e.g., seismic surveys, determine the geologic structure, i.e., the media through which seismic waves propagate. They may develop images of the geologic structure, this requiring a large number of sensors distributed over a wide area to provide a large variety of source-receiver geometries. In contrast to active technologies, passive methodologies are typically directed to determining source characteristics, including source locations. These sources could be microseismic events, consisting of impulsive transient sources that generate broadband impulsive transient waveforms. However, attempting to determine geologic structure with passive methodologies requires nearly the same sensor deployment as active technologies but, moreover, collecting data over extended time periods, e.g., months to years, such that there is no real advantage to passive seismic imaging of the geologic structure either for engineering monitoring or for security purposes.

Demonstrated active technologies have only confirmed existence of underground targets, such as tunnels, after the fact and not during construction. In addition, active survey technologies cannot generally determine the state of modifications to underground reservoirs as engineering activities intended to stimulate oil production progress or monitor reservoir engineering activities as they occur. The geologic images generated from the signal processing of the active seismic surveys are of limited use, such as in before-and-after type comparisons for determining the effect of the reservoir engineering activities, and so causes of any observed change can only be hypothesized as they have not been directly observed.

Systems and methods according to the invention involve persistent passive monitoring to acquire seismic energy propagation and directly observe, characterize, and locate the energy source. Obtaining useful information about seismic sources can require consideration of numerous factors influencing transmission velocity (e.g., source depth and media discontinuities), anisotropic propagation, multiple modes and paths of propagation, and dispersion. Given that propagation through such media is complex, features of the disclosed embodiments include criteria for determining when certain factors must be assessed or compensated for to assure useful results.

Embodiments of the invention include a system and method for micro-seismic monitoring which is more accurate, and more sensitive than the prior art, and in real-time. Monitoring systems according to the invention may be entirely passive in the sense that the detection of independent energy sources unrelated to the monitoring system, e.g., uncontrolled seismic sources, originating underground, does not rely on or involve active transmission of seismic energy from a prescribed source and the primary goal is not the imaging of geological structures. In addition, while the recent advances in data acquisition technologies for survey systems based on active technologies can deliver acquired data in near-real-time frames, such systems have not provided real time data analysis for characterization of the complete variety of sources of interest as disclosed herein. At best, such technologies may be helpful for after-the-fact forensic analysis of the geology.

By way of comparison, RADAR (see U.S. Pat. No. 1,981,884, granted in 1934) is typically deployed as an active system, providing a source which transmits controlled, known radio-frequency (rf) energy and interprets the received energy of reflections from objects. LIDAR, which provides laser light as the source, typically at infrared frequencies, is exclusively an active ranging system.

As used herein, coherent processing means spatial-coherence processing, more commonly known as beamforming, where signals acquired with multiple suitably arranged point-sensors (e.g., in an array of spatially distributed sensors) are processed based on the signal coherence across the multiple spatially distributed point-sensors. The term "point-sensor" is used in the comparison of the dimensions of the sensor with the wavelengths of a sensed wavefield, as a sensor that measures the applicable field at a single point in three-dimensional space, rather than as a distributed sensor that measures the field over a finite aperture compared to the wavelength of the measured signals. Specifically, the dimensions of the point sensor are much smaller than the wavelength of the maximum seismic frequency of interest.

In the past, beamforming techniques have been suggested for locating the depth of a leak in a working borehole (see U.S. Pat. No. 10,598,563. Use of linear arrays to detect acoustic sources associated with a leak (e.g., see, again, U.S. Pat. No. 10,598,563) has an inherent ambiguity in azimuth angle about an array axis. The source may be located anywhere along the surface of a cone having the cone axis placed along the array axis and with the cone apex at the center of the array. Without additional information, it becomes impossible to locate the source as a point in three-dimensional space.

Embodiments of monitoring systems according to the invention form patterns of beams along directions defined by an array response pattern and use multiple volumetric arrays to detect, locate, and classify multiple, spatially distinct sources, some of which may be simultaneous. Example applications of the disclosed passive system automatically sense seismic energy generated beneath ground level from natural sources. The sources may result from intentional or unintentionally induced seismicity, or the use of equipment in an underground setting. The system automatically determines the nature of the source of energy, its characteristics, its location, and whether there has been a change in the source location and source characteristics over time.

Previously, a number of limited seismic solutions have been proposed for security applications, such as tunnel detection. These may rely on a single sensor or multiple sensors acting autonomously. At best, such approaches provide what may be referred to as a proximity locations. They do not automatically provide precise information about the source location in three-dimensional space, or changes in location of sources, or classifications of the individual sources from the full range of possible sources, or a fused picture of the information derived from the sources over time, or the separation of similar simultaneous sources that are spatially separated. See, for example, U.S. Pat. Nos. 4,374,378, 8,004,405, and US/2008/0309482.

Generally, the prior approaches may be characterized as (i) yielding limited sensitivity ranges to detect tunneling activity at deep locations and (ii) having limited ability or no ability to discriminate between underground activities of interest from, for example, typical anthropomorphic diurnal activities along the overlying ground surface. Nor can this approach distinguish separate but similar sources that are simultaneously generating signals from different locations.

To the extent systems proposed for security applications have been based on sensor arrays, they have not processed data based on spatial coherence criteria across the array sensors to detect, classify, and locate underground activities in the presence of interfering signals. Furthermore, such systems cannot detect, separate, and classify simultaneous sources occupying the same frequency band but occurring in different locations. See, for example, U.S. Pat. No. 8,659,424. Although prior arrangements of sensors are technically three dimensional, the data processing has not been based on signal coherence. Rather, it is well-known to temporally compare detections received by spatially spaced sensors, i.e. based on time delays of arrival at the sensors to, for example, determine whether a signal originated from the overlying ground level or from the volume of ground below the sensors).

The same concept can be applied for pairs of sensors in linear horizontal or vertical arrays, and may be extended to trios of laterally displaced sensor strings. However, such systems have limited or no ability to associate seismic sources with discrete latitude-longitude points on a map or in three-dimensional space. On the other hand, systems and methods according to the invention can both (i) identify signals and sources, and (ii) determine source locations in three-dimensional space, with accompanying uncertainty measures or levels of confidence.

Global monitoring systems of seismic surveillance networks include monitoring for earthquake activities and detection of large explosions. Passive monitoring systems according to the invention differ from seismic surveillance networks such as for monitoring earthquake activities and detection of large explosions. Sensor arrays according to example embodiments, are compact three-dimensional arrays, i.e., compact and volumetric, as opposed to the very large traditional planar, two-dimensional arrays used for global monitoring, and the dense areal deployments used in petroleum exploration.

The term volumetric as used herein refers to a three-dimensional array geometry, where the individual array point-sensors (known generally as array elements) are arranged in a three-dimensional distribution that encloses a polyhedral volume of earth. The volumetric array elements are generally arranged with inter-element spacings corresponding to one or more design frequencies and may be arranged in any of multiple ways to enclose a volume so long as all sensors are either located at vertices or interior to the boundaries of the polyhedron. Advantageously, the array may be in the form of a three dimensional, bounded convex polytope, where array elements are the vertices of the polytope. In some embodiments this arrangement may also be subject to the condition that the overall array shape is convex. The inter-element spacings of the elements along the surface of the bounding polytope largely correspond to the minimum design frequency of the array. Generally, these are the elements that correspond to the greatest distance from the array centroid or a specified axis of symmetry.

The element spacing, d, depends upon the frequencies of interest and, in particular, the design frequency, $f_d$, which may be within the upper frequencies of the frequency band of interest. The corresponding design wavelength is then $\lambda_d = c/f_d$ where c is the phase velocity of the media into which the array is emplaced. Embodiments of the ideal element spacings d are based on the design frequency, and then derived from the design wavelength as $d = \lambda_d/2$. Because seismic propagation involves multiple types of waves travelling at different phase velocities c, a single element spacing d will correspond to more than one design wavelength.

Furthermore, array geometries are possible that would include more than one design frequency.

As is well-known generally, the array aperture determines the ability to resolve the angle of arrival of an incoming signal. The specific aperture as referred to herein is the maximum distance across elements contained in a plane oriented perpendicular to the direction of arrival of a plane wave. Therefore, unless the array geometry is in the form of a regular sphere, array aperture will be a function of both azimuth (measured east of north) and dip (measured down from the horizontal plane). Horizontal or vertical array aperture may also be discussed but limited to those planes in order for discussion to be less dependent on functions of the angle of arrival.

For described embodiments the aperture is not much greater than the seismic wave coherence length of the maximum frequency of interest in order for the beamforming operation to yield a gain. The coherence length is the propagation distance over which a signal wave maintains a specified degree of coherence, and is frequency dependent as well as somewhat site dependent. The signal spatial coherence is measured using the cross-correlation between seismic signals of interest sensed at two spatially separated sampling points (e.g., array elements) for all times. The term "signal of interest (SOI)" as used herein refers to a signal from a source or activity type that requires a response.

The separation point at which the spatial coherence is equivalent to the noise spatial coherence is where the Signal-to-Noise Ratio (SNR) gain of beamforming operations is greatly reduced (as a function of frequency). It is also of importance that the noise within the band of sensitivity not be coherent (as a function of wavelength), such that when spatial coherence processing (i.e., beamforming) is performed, the noise is not coherent from sensor to sensor and so will appear more or less as a random process and destructively interfere.

The term compact array as used herein refers to a convex polytope arrangement of array elements having apertures defined, for example, in horizontal and vertical planes such that the aperture in the respective planes is limited to that determined by the array design frequency that maximizes dimensions of the convex hull containing all sensors in that plane and where all vertices are array elements with spacing between elements d determined by at least one design frequency. In one example embodiment, the compact array may be limited to geometries for which any plane containing array elements that is parallel to a horizontal base plane that contains at array elements, must contain more than one element. Furthermore, in a compact array the maximum distance between vertices of the bounding polytope must correspond to the minimum design frequency, and that minimum design frequency must lie within the band of interest and within the primary frequency response band of the point sensors used as array elements.

In other embodiments, the compact array is also bounded such that all elements within the array lie within a particular distance of each other, and namely that would be a coherence length chosen for a particular level of coherence and a specified wavelength corresponding preferably to the maximum frequency of interest. This can also be cast in terms of the aspect ratio of the array, where the aspect ratio is measured by comparing the smallest dimension to the largest dimension in the three-dimensional space. For example, a spherical array would have an aspect ratio of 1:1 or "one", and a linear array would have an aspect ratio 0:1, i.e., zero, and therefore is considered restricted to two dimensions. For a compact array, an aspect ratio approaching that of a sphere is desirable, while an aspect ratio of less than 1:4 or (0.25) would not be considered compact for optimal embodiments.

Frequencies of interest for applying the disclosed systems for local area monitoring are much higher than those available to Global Monitoring Systems which often rely on frequencies as low as small fractions of a Hertz and are limited on the upper end to frequencies on the order of 20 Hz because higher frequencies attenuate relatively quickly and therefore cannot carry signals at detectable power levels to sensors across the globe, e.g., over 1,000 km away from the source. This is partly due to simple geometric spreading of the signal and partly due to the intrinsic attenuation characteristics of the media. Thus, the total bandwidth of these systems is limited to ~20 Hz.

In contrast to the very low frequency seismic signals which propagate over such long distances, the disclosed local area monitoring systems effectively sense and process seismic frequencies ranging from a few Hertz to at least ~2 kHz because the signal sources of interest provide enough detectable power over the relatively short ranges of interest, e.g., less than a few kilometers from the source. The detectability of a signal at these distances is largely governed by the source energy, with greater source energies correlating with greater detection ranges. With this relatively wide frequency band of acquired data, systems according to the present invention effectively perform their designed functions, based on sufficient detectable energy and extractable information for characterizing the energy source.

Advantageously, the disclosed systems and methods with which the data is processed and analyzed utilize the relatively wide spectrum of data to provide conclusions such as identification, classification, and location, with sufficient accuracy and confidence to quickly take intervening actions. These systems and methods also provide information about the temporal evolution of identified sources and associations with other sources as well as activities of longer duration. In contrast to the spatially very large array characteristics of global monitoring systems or reservoir monitoring systems, the disclosed systems and methods can be dimensionally much smaller due to the higher frequencies of operation with array aperture sizes on the order of meters.

Another distinction between global monitoring systems and array designs suitable for use with the invention is that application of the two-dimensional array designs used for global monitoring to the monitoring of local activities would result in spatial aliasing for signals related to the stated activities of interest due to the high frequencies, i.e., this aliasing being to such a degree that the sensors could only be processed as stand-alone instruments and not as a coherent array. That is, signal coherency across the array sensors would be lost.

Disclosed embodiments of systems according to the invention require control and accurate determination of sensor locations in all three dimensions to a known accuracy, e.g., on the order of a few centimeters, whereas processing for global monitoring system arrays can often ignore differences in depth of the elements because the wavelengths used for those applications are much longer than any error due to misestimates in the sensor depth and because the seismic energy arrives at a very steep angle (measured from the horizontal plane).

Sensor arrays for use with systems according to the invention are suitable for detecting a variety of source types while systems comprising two-dimensional sensor arrays and processing techniques utilized for earthquake or nuclear explosion monitoring are designed for detecting, and locating broadband, impulsive transient signals from very energetic sources. Likewise, sensor arrays used for petroleum exploration and permanent reservoir monitoring also focus on broadband, impulsive transient signals. Those networks and processing systems are not designed for processing narrow band signals of long duration generated by many of the seismic energy sources typical of underground intrusion activities.

Systems according to the invention are able to operate differently than global monitoring systems, as they can detect low-power energy from electromechanical machinery sources relatively close to the sensor arrays. Such systems may be designed based on the tenet that all phases and propagation modes should arrive at array elements nearly simultaneously, e.g., within about 300 ms and therefore require a much greater sample rate than used in global monitoring systems. In comparison, global monitoring systems operating to detect signals after propagating global-scale distances from the sources to the receivers manifest significant and useful phase separation among the different waveform propagation modes, as well as among signal components having undergone reflections and refractions (e.g., compressional waves, shear waves, and surface waves, p, s, P, S, PcP, ScS, pP, sP, PKiKP, etc. as known in the field). The phase separation occurs because compression waves, shear waves, and surface waves travel at different propagation velocities, and over large distances. The clear phase separation exhibited for multi-modal wave propagation renders interpretation of reflections, depth phases, and the like apparent, and useful to understand the origin and the nature of the seismic sources and the non-homogeneous complexity of the earth's structure. This is not generally the case for low-power energy sources (e.g., such as from electromechanical machinery) relatively close to the sensor array. That is, phase separation does not exist and so cannot be used for performing source location at the relatively smaller distances relevant to this invention. The design principles by which global monitoring systems operate simply will not work to provide the desired source location information. A different methodology is needed.

Summarily, systems are provided in a manner which differs markedly from global monitoring systems designed to detect signals that have propagated global-scale distances. The distinctions are present in both (i) the array configuration used to detect seismic signals from sources many orders of magnitude less energetic than sources of interest for global monitoring, and (ii) the processing methodologies used to identify, classify, locate, and monitor the sources, and deliver that information in real time. With the generated wavefields being much different than those sensed for global monitoring, the design of the array, down to the three-dimensional arrangement of the elements and the array aperture, has little in common with the global monitoring arrays.

Principal differences according to embodiments include the source type characterizations, where Global Monitoring Systems (GMS) only characterize impulsive transient signals. Embodiments of the disclosed system characterize impulsive persistent, emergent persistent, band limited, FM/CW, and extended time duration source signals and all signature types. GMS analyzes large seismic sources, such as earthquakes and nuclear explosions, while the disclosed system detects and analyzes much smaller sources, such as footsteps, vehicles, and powered hand tools. The GMS signal and information processing systems are simple pipelines designed around global phase association of impulsive transient signals and determining source radiation patterns, and the disclosed system performs very broad classifications designed to take advantage of the joint time-frequency patterns of the source signals. GMS bandwidths are on the order of 20 Hz and are at very low frequencies, with a design frequency typically of 1 Hz or below. Our disclosed system has bandwidths on the order of 2 Hz to 2 kHz, and a design frequency of 75 Hz or above. GMS array dimensions are two dimensional and have horizontal apertures of many km, while our disclosed system is three dimensional and has horizontal and vertical apertures of several meters to ten meters maximum. In terms of range, GME sensitivity ranges are thousands of kilometers for global monitoring. Our disclosed system sensitivity ranges vary from a few meters to 10 kilometers or more. Clearly, the design, functionality, and operating characteristics of the disclosed system are distinct from those of global monitoring systems.

Further, the disclosed invention offers three distinct advantages over traditional monitoring techniques. The first advantage is sensor deployment. Typical techniques require a large number of sensors to cover the surface at small separation distances. This dense sensor coverage is environmentally disruptive and expensive. For example, roughly 750 evenly distributed sensors may be used to monitor 5 square kilometers. A deployment of the invention would only require 10 to 15 array locations, a drastically reduced surface "footprint."

A second feature according to embodiments of the invention separates array performance from sensor performance. The disclosed embodiments produce waveform data with significantly enhanced signal to noise, resulting in greater range to the source, or resulting in being able to monitor to lower magnitude sources (smaller sources of energy). Embodiments automatically produce an additional spatial "layer" of information that traditional sensors cannot match, which not only improves results, but also improves noise and clutter rejection, an equally important result.

The third advantageous feature is the architecture of the real-time seismic analytic "pipeline." Pipeline is a term used herein to describe the sequence of algorithmic steps that reduce technical data (e.g., time series waveforms) to human understandable information such as latitude/longitude. By incorporating spatial information with time and frequency information a traditional seismic processing pipeline can be reimagined in order to produce results that are more accurate, more sensitive, and more computationally possible.

With an appropriately designed array and spatially coherent processing, embodiments of the invention may be applied to separate energy arriving from different directions and distinguish source signals of overlapping frequencies that are simultaneously received, but which emanate from different locations. The disclosed geometries for volumetric arrays provide multiple advantages over planar array designs in order to determine both the azimuth angle and the dip angle. Referring to FIG. 10, in the context of defining the direction from which a signal is received, the azimuth angle and the dip angle are angles about the origin. The azimuth angle is an angle about the origin and within the horizontal plane containing the horizontal axes North-South, East-West and the origin; and the dip angle is an angle of displacement about the origin in a vertical direction above or below the horizontal plane. For the illustrated examples, the origin is at the centroid of the volumetric array, but may differ from the exact centroid location to be at the location of a particular sensor located near but not at the centroid.

Horizontal planar arrays used for three-dimensional angle-of-arrival determinations have limited application for large aperture arrays, in the context of assessing impulsive transient sources, with the caveat that for vertically incident p- or s-waves, the apparent slowness (reciprocal velocity) is zero across a planar array parallel to the earth's surface. On the other hand, a volumetric array deployed in three dimensions provides the true propagation velocity across the planes parallel to the specific aperture, and hence slowness across the array, and not an apparent slowness which results from projection of the arriving wave inclined to the plane of the array, across the array. Processing of signals received by sensors in the three-dimensional array is illustrated in accord with the true measured propagation velocity to determine the angle of arrival in a spherical coordinate system and sample the wavefield more completely, i.e., not just across a horizontal plane, thus enabling a more accurate location analysis.

It is conventional to use a single two-dimensional seismic sensor array to provide an azimuth to the energy source in the plane of a two-dimensional array of sensors for global monitoring systems, but this provides no information on the dip angle relative to the arriving seismic waves other than the apparent velocity which then requires mapping to the angle of arrival using a velocity model for the pertinent modes of propagation.

Prior application of volumetrically distributed sensors, such as using several vertical strings of sensors, have been applied to detect and locate fracking activities. They are not designed to provide specific array element spacings and maximize the coherence, SNR, and therefore array gain at the specific frequencies required to support beamforming computations. Rather, these systems are limited to processing based on time-difference-of-arrival information to, for example, locate hypocenters of fracking-induced events, while systems and methods according to disclosed embodiments of the invention uniquely apply spatial coherence techniques to detect, analyze, classify, locate, and track multiple classes of sources in multiple scenarios, reliably and with superior precision and accuracy, and deliver that information in real time.

It is desirable to provide a monitoring system that detects a signal as one emanating from a specific source or activity type that requires a response. These types of signals are often relatively rare events embedded in a variable background of noise and finite duration signals that are not of interest. Such monitoring systems may consist of a single sensor device or a group of sensor devices that respond by measuring a threshold signal level of light, vibration, or a magnetic field, or by producing images of light. However the system responds, the objectives of these systems are identifying and separating the signals of interest (SOIs), or a notifiable condition, from the bulk of the noise or uninteresting signals present in the sensed data. With the setting of a threshold for an alarm condition an operator may be notified based on the measurements. Systems disclosed herein coherently process real-time data streams across array data channels of each single array to automatically detect and classify SOIs embedded in the ambient noise field that could be associated with sources and activities of interest. Illustrated examples of the systems then process the detected, classified signals and information from multiple arrays of sensors, effectively fusing this data to determine locations and activities, monitor those activities in subsequent time frames, and then issue alerts based on measures of confidence derived from the accumulated information associated with those activities.

Embodiments disclosed herein involve deployment of multiple passive compact volumetric arrays of sensors emplaced underground and then coherently processing the signals acquired with the multiple sensors using a hierarchy of signal and information processing subsystems designed to alert the user to the presence and location of notifiable activities with very high confidence and exceptionally low false/nuisance alarm rates. Notifiable activities include personnel intrusions (on foot), ground vehicle intrusions, aircraft or powered drone activities, subterranean activities, or other activities such as construction or traffic, explosive events, small artillery, microseismic events as would be associated with energy production activities or underground disposal well activity, or microseismic events as would be associated with activities designed to capture and store carbon dioxide in underground reservoirs.

Disclosed embodiments comprise a network of multiple coordinated passive arrays of sensors with the sensors in each array operating continuously to provide automatic persistent surveillance of a region of interest with a minimally discernable above ground footprint. However, the system can also function as a series of single stand-alone uncoordinated arrays (singularly or in a network) having lesser capabilities.

With reference to FIG. 1, features according to an embodiment of the invention are illustrated with an energy source, S, which creates a seismic disturbance within a region being monitored by a Network Segment 12 in a passive monitoring System. The System automatically processes received seismic signals for detection of underground events. Elastic energy from the disturbance propagates outward in all directions in the form of seismic waves. Arrays of seismic sensors receive the signals generated by those energy sources. The individual seismic sensors elements in the arrays respond to reception of the seismic signals with an analog voltage (or similar measurable quantity that can be converted to voltage) proportional to the received strain or time derivatives of the strain or displacement. For electromechanical sensors, each analog voltage channel feeds into an analog-to-digital (A/D) converter, and the resulting digital data is streamed to a local control unit (LCU) where it is time stamped packaged, and then transferred to a Data Acquisition (DAQ) Server for management and storage. For optical sensors, the seismic signal is extracted from the continuously transmitted optical signal in a central processing facility removed from the locality of the field sensors, and then converted to a voltage, conditioned, digitized, and conditioned again as a digital signal, and then transferred to a Data Acquisition Server for management and storage.

With reference to FIG. 3 the DAQ Server forwards the packaged digital data for all array channels to an Array Server Subsystem, where the data is formatted and routed to an instance of an Array Processor Application (APA) which identifies and characterizes SOIs embedded in the data streams acquired using that array. This operation is performed separately for each sensor array in the Network Segment. Initial APA operations are performed in first and second parallel pipeline segments. In a first processing segment, the spatial coherence processor initially operates on data frames to perform beamforming operations that create a large number of discrete "beams" corresponding to specified angles of arrival and a specified slowness (reciprocal velocity) value for the received wave front. Each beam in a sensor array additively collects the seismic signals impinging upon the array with plane-wave fronts perpendicular to a unique angle of arrival, and rejects those signals arriving from other directions. The actual slowness depends on numerous soil and environmental parameters, as well as on the seismic wave type. In one embodiment, the seismic signal inputs for the particular data frame are phase shifted in the frequency domain based on the delay in arrival time between arrival times among sensors and a value associated with the beam is saved for further processing in relation to identifying and characterizing SOIs. Further processing performed on data across the sensor arrays facilitates determinations of the location of the energy source, S.

In disclosed embodiments the arrays are spaced apart in a manner which provides overlapping coverage which enables the sources of detected signals to be located and spatially tracked over time. Overlapping coverage by two or more arrays is advantageous. Determining a source range or location based on data acquired from a single passive array is, at best, unreliable or inaccurate, and may be unattainable in view of factors relating to the number of sensors, the particular spatial distribution of the elements about the volume of ground being monitored relative to the actual location of the signal source, and types of signals emitted by the source.

The disclosed multi-array system architecture is scalable on multiple levels of sensing and processing, allowing for many sensor arrays that provide overlapping coverage and forming a continuous network of arrays extending, for example, along a boundary, and a network of multiple such independent segments extending, for example, throughout a geographic region. Such an arrangement of multiple sensor arrays to form the overlapping spatial coverage is referred to as a Network Segment. Each illustrated Network Segment is complete with the power and the computational and data storage infrastructure required for independent operation of that segment. Operational integration of multiple Network Segments is implemented with a final supervisory level of computer hardware and software that operates across the multiple independent Network Segments but just as easily can provide the same functions for a single Network Segment.

The sensor arrays providing overlapping coverage may be deployed as multiple Network Segments along a boundary that may not be straight or continuous, and the array design may vary from array to array or among different Network Segments (e.g., based on the geological environment and constraints imposed by particular sites) and the distances (e.g., distances on center) between the emplaced arrays in the network may vary. The network may be designed to provide no coverage in areas where is it impractical to install arrays or where coverage is not needed.

The sensor arrays may also be deployed in preferential zones of limited area to provide overlapping coverage for areal or volumetric monitoring instead of a linear monitoring. Such deployments are suitable for monitoring underground reservoirs where fluids are extracted, or where fluids and gasses are injected. The overlapping coverage may be created with more than two or three arrays as required by the accuracy and precision goals of the deployment, and may be provided by entire Network Segments within the areal expression of the volume and/or surrounding the areal extent of the volume of interest.

Referring generally to FIGS. 2 and 3, illustrated embodiments of Systems according to the invention comprise a Sensor Subsystem, a Data Acquisition Subsystem, a Single Array (processing) Pipeline, an Aggregator (processing) Pipeline in an Aggregator Server Subsystem and a User Interface Subsystem. Embodiments generate beams for determining the angles of arrival of signals from a source of seismic energy. Additional information at the single sensor level may include time of arrival to support multiple methods of source location used in the Aggregator Server Subsystem. Embodiments may further include built-in-test functions and establish confidence levels for data and conclusions sent to the Aggregator Server Subsystem for determinations of source location.

An Aggregator Subsystem comprises one or more Aggregator Instances which execute and control an Aggregator Pipeline which assimilates information acquired from multiple arrays of sensors and processed by the single Array Pipeline to determine, for example, the probable location of a source which has been identified within a class of interest. The Aggregator Server Subsystem combines information in the form of notifiable events from multiple Network Segments to provide services to the User Interface Subsystem. The User Interface Subsystem assimilates and presents a common operating picture (COP) of notifiable events and additional geographic and non-geographic information. For example, the COP may include a combination of Network Segment, geographic, geologic and infrastructure information in graphical layers. The User Interface Subsystem allows the user to interact with the various layers and system alerts. For example, the User Interface Subsystem displays an Alert entered into the Enterprise Database when accumulated information meets criteria for a high-confidence determination of the identification of an activity of interest. The Alert may take the form of a multi-media notification.

The design of individual sensor arrays (Array Design), along with the architecture of hardware and software components allows for scalable array networks where the basic unit is a Network-Segment. Factors for consideration in the overall network design are source signal strength, location resolution, network tolerance of degradation, ensuring a persistent capability along non-linear boundaries with variable topographies and geologies, ensuring a persistent and reliable capability for monitoring of Earth volumes, and in view of a given pre-existing infrastructure.

The described array embodiments are compact three-dimensional arrangements of sensors positioned underground (i.e., compact volumetric arrays) to monitor activity within a volume of earth material. The spacing between elements in an array is based on the design frequency and the propagation velocity of the media where the array is installed. The required gain and ambient noise conditions dictate the minimum number of elements in an array.

The required angular azimuthal resolution dictates the desired aperture of the array subject to the restriction of numbers of elements and element spacing. As more fully discussed herein, the array elements may be arranged as a cube, a cylinder, a half sphere, a sphere, subject to the requirements of the array maintaining a compact volume. The array elements may also be arranged as a cubic lattice, nested cylindrical shells, nested hemispherical shells, or nested spherical shells. See FIGS. 6A-6F. These arrangements are commonly referred to as "uniform" geometries in texts, such as a uniform cylinder, where elements are distributed symmetrically or uniformly within the compact volume. The array elements may also be arranged in a configuration resembling a cubic-close-pack or hexagonal-close-pack lattice, or combinations of any of the aforementioned designs to produce a more broad-band response implementing multiple design frequencies. However, other arrangements are contemplated which are not uniform geometries and distributions of sensors depending upon the goals for the array emplacement or site restrictions. Both the geometry and the spacings between sensors can be tailored to specific monitoring problems and site restrictions with the array design being compact as previously defined and enclosing a volume, as previously discussed. Thus, array design is an optimization exercise considering the above-mentioned variables in addition to the limitations imposed by site restrictions and emplacement difficulty. In addition, there are always cost/benefit aspects to consider based on System wide implications of the array design. However, the arrangement of elements in all cases defines an array where the specific aperture is much greater than the ideal element spacing d, as related to the design frequency, such that there will be an improvement in the signal to noise ratio provided by the beamforming operation.

The emplaced individual sensors, i.e., array elements, are arranged in particular patterns designed with an understanding of the physical properties of the signals of interest, the geological environment that requires monitoring, the constraints imposed by a particular site, and the capabilities of the individual sensors. However, the geologic strata do not need to be completely known for the System to function effectively. In the illustrated embodiments, each sensor or element in the array is allocated to a single dedicated channel. However, the system is not limited to one channel per array element. For example, an array element may take the form of a tri-axial sensor package, in which case three channels of data are produced for each array element.

Vibrations measured with embodiments of the System originate with seismic signals that may enter into the ground either in close proximity to the array elements or may propagate considerable distances to the array elements. The compact volumetric array design and processing system favors sources at ranges where the wavefront largely exhibits characteristics of a plane wave. The sensors react to these seismic signals and other propagating seismic energy arriving at the sensors and the diffuse seismic noise by generating an analog voltage proportional to the amplitude of the seismic wave, or a time derivative of the amplitude of the seismic wave.

The emplaced individual sensors each output a continuous voltage proportional to the amplitude of the seismic wave that is continually sampled and converted into a digital time-series. However, the processing system is agnostic to the type of sensor used to acquire the signal so long as the sensor acts as a point-sensor. The resulting output of the sensor and data acquisition subsystems is a digital stream that is proportional to the amplitude in the seismic wavefield. Any of a standard geophone or accelerometer, or an omnidirectional seismic sensor, or an optical point-sensor that generates a voltage proportional to the amplitude or a time derivative of the amplitude of the seismic wave, is an exemplary illustration of a useful sensor type.

The continuous voltage signals derived from the sensors are converted to a continuous digital data stream using data acquisition electronic components with suitable timing control, e.g., an externally disciplined clock with minimal drift and precision down to 1 part in $10^6$. Having strong timing control across the System of multiple arrays is important both for spatially coherent processing and for time coherent processing. Strong timing control is also required for follow-on processing activities that involve signals and information from multiple arrays. The output of the data acquisition electronic components is a real-time digital data stream where the absolute time of each digital sample is known. These data streams are input to the signal and information processing pipelines, as well as logged for temporary and/or long-term storage.

The real-time digital data streams are the inputs to signal and information processing pipelines which, in illustrated examples, are a series of stages that build upon the signal and information processing of previous stages. In the first steps of pipeline processing, the continuous digital time series is packed into data frames of defined time duration. Each data frame passes through the entire processing pipeline defining a single processing cycle, i.e., a single cycle. Multiple processing pipelines may be provided, each tailored to specific signal classes or processing objectives. Some of the processing pipeline embodiments may be restricted to performing operations on data and information from single arrays of sensors (single array pipelines), while other processing pipeline components aggregate information from multiple arrays of sensors in order to perform more advanced stages of signal and information.

Embodiments of the System constantly monitor the functionality of all processing components in the pipelines and provide state-of-health logs and notifications upon the occurrence of preset notifiable conditions and events. Monitoring includes testing the functionality of individual sensors through standard test mechanisms specific to sensor architectures. Moreover, System embodiments may test the performance of an array as a whole using a built-in-test function composed of multiple redundant actuators, emplaced at the same time that the array is emplaced, that provide a controlled or predetermined seismic stimuli to the array elements. Such built-in-test actuators may produce a controllable-frequency output. For example, the actuators may inject into the ground tones and frequency modulated chirps such that the operational range of the individual sensors may be separately tested or characterized for multiple frequencies, one frequency at a time. Cyclic processing algorithms are used in the exemplary pipeline architectures to both detect and monitor activities that may extend over multiple data frames.

The term "single-cycle processing" refers to the action of a set of processes operating on an individual time series data frame in either the time domain, the frequency domain, or any other vector-space domain in which the processing may be expedited. The majority of the pipeline components may operate on a single cycle basis, but may include processing of buffers that incorporate previous frames when the process is not completely time independent or requires longer data frames. For example, some types of advanced adaptive filtering may require buffers longer than a single data frame. However, at the most advanced stages of information processing, the pipeline components may only operate on a multi-cycle basis on the accumulated information. The Aggregator Pipeline functions asynchronously with respect to the single array pipelines. Information fed forward by the single array pipelines may be processed in the order received without a set cycle rate. However, if no associations or updates are received within a pre-determined time interval, actions may be taken to close aggregated information objects or cancel alerts as applicable.

In the first stage of the single array processing pipeline, real-time digital data streams are input to signal processing components that condition the single channel digital data in preparation for processing operations that take advantage of coherencies in the acquired signals. A feature of System embodiments is that data frames can be sized according to the characteristics of sources that generate types of signals, and according to how those signals may be best processed to identify the source type. For example, the length of data frames may be customized for initial detections of signals of potential interest as well as for successful classifications. The frames of data may overlap with adjacent frames in a time series or may be entirely distinct from one another. The signal conditioning components set data frame length(s) and may generate more than a single stream of data per channel with different data frame lengths.

After conditioning, the digital time series is processed with a spatial-coherence (beamforming) technique, i.e., based on the coherence of measured SOIs across the spatially separated sensors in an array, this yielding information about the direction of arrival of the coherent signal. In advantageous embodiments the coherent processing increases the power of the measured signal and decreases random noise in the data. By way of example, beams corresponding to multiple potential directions of arrival in three-dimensional space, are generated for particular values of phase velocity, azimuth angle, $\Phi$, and dip angle, $\theta$, where the latter two are defined in FIG. 10. The beams generated by the spatial-coherence processing are then further processed using single-array signal processing pipelines for automated detection and classification of signals of interest.

Functions of the single-array processing pipelines are the separation of the SOIs from the uninteresting signals and noise present in the total scene, "tracking" patterns of characteristics in the signals of interest, and classifying the signals of interest. Accordingly, beam data processing detects and separates SOIs from the bulk of the noise and uninteresting signals present in the data stream. Such signals are often of a relatively low power level, close to or embedded below ambient noise levels. Multiple different single-array processing pipelines may generally include a detection stage, a pattern chaining stage, and a classification stage, constructed in a modular architecture. The detection stage applies one or more detection processes tailored to identify characteristics of SOIs within the beamformed continuous data streams.

Different detection modules may be specific to a particular single-array processing pipeline. For example, one possible detection module may apply only to Impulsive Transient signals which are broadband but time limited, and a different detection module may apply to tones which are narrowband but of extended duration. The processing methods implemented with the pipeline components may also include estimating the state of the background noise within the data. In this case, "state" refers to the characteristics extracted from noise, i.e., noise including data that is not signal.

In one example, if a signal is detected as one of potential interest, it can subsequently be processed to provide information including characteristics measured both directly from the signal or from other series derived from the signal. That provided information is referred to as an "information object." As used herein, the word "object" refers to a collection of information extracted from a common signal which information, in the later processing stages, may be attributed to a common source of vibrational energy, i.e. an "information object." Such information objects may include "detection objects," or "events," or "track objects" or "activities" or similarly named data structures. Consistent with the previous definitions of "objects," information objects may be single-cycle or multi-cycle objects. Multi-cycle objects may contain multiple single-cycle information objects, thus defining a hierarchy of information derived from the acquired signals, and then classified within a distinct group of objects for which the process is intended to identify members.

The single array "tracking" stage associates like detection objects and performs an estimation of the state of the object with respect to the observed signals. This stage may also be referred to as a pattern chaining stage. Estimation of the state of the object may be effected with algorithms typically labelled as "trackers", where the behavior(s) of one aspect or multiple aspects of the detected signal are assessed as a function of time or another variable. However, these algorithms do not necessarily determine a positional track, that is, a determination of location as a function of time. In a general sense, the state-space representation can be thought of as a mathematical model of the system as a set of input, output, and state variables, where the values of the state variables evolve over time, and where the output variables depend upon the values of the state variables. For the following described cases, the state variables are usually functions of time.

With imposition of predetermined criteria, the classification stage performs an analysis of the previously derived and accumulated information to determine whether a signal of potential interest meets criteria to be a SOI, (i.e., a member of a particular class of objects), and form a decision about identity of the source of the signals of interest. In the alternative it may be determined that the signal is not a SOI. Embodiments of the classification stage, which is the final operation in the single array pipeline may provide a confidence level for each decision.

Upon the successful classification of specific SOIs and association of one or more signals into information objects at the single array level, the signals and information are made available to downstream processing pipeline components that, aggregate information objects across the multiple arrays subject to, for example, classification criteria. That is, embodiments of the System initially combine, or aggregate, or fuse signals and information from that reported from each of multiple single arrays, and where signals and information are determined to be identified within a like class of interest. Aggregation of information objects is based on the mathematical concepts related to fusing the information derived from different sensor arrays and the implications for how those data are stored, accessed, and further processed. The System then uses the aggregated signals and information to determine a probable location and a depth, if below-ground, and spatial tracks of position as a function of time when warranted. The information may be further fused into Activity sets comprising located, classified sources and tracks that are related to one another, of compatible class and characteristics, and proximate in time and space according to predetermined criteria.

To summarize the Aggregator functionality, the information regarding detected and classified SOIs from each single array is combined across arrays wherein an association is established between like source class objects across the multiple arrays based on proximity, classification results, and contained information. A determination of location is made for the objects meeting criteria of time and angular geometry from the single arrays that may be arranged to provide overlapping coverage. In addition, the spatial track of the aggregated location information (as a function of time) is determined. The state of other aggregated derived information may also be tracked. Following the determination of a source location, an Activity is initiated consisting of the accumulated information from all single arrays contributing classified objects associated with that location.

In subsequent times, the Activity is maintained by associating new locations based on predetermined criteria of time, source class, location, and other characteristics to the Activity, and the state of the Activity may thereby be determined. With the state of the Activity monitored over subsequent time frames, an assessment of activity class is determined. For example, activity classes may include "construction," or "vehicle in in transit," or "personnel movement" or "microseismic cluster." By way of example, the System may detect, classify and group into activities the information derived from signals originating with sources such as hand-operated construction tools, hand-operated electromechanical powered construction equipment, heavy/large construction equipment, stationary or moving electrical or mechanical equipment as information compatible with a common Activity.

In a different processing pipeline design, the System is capable of automatically and in real-time detecting, locating, and characterizing small seismic events typically called microseismic events, and fusing those events based on analysis of time, location, and characteristics into a single Activity for microseismic monitoring purposes. The System is not limited to these classes of vibrational energy; other classes of vibrational energy sources exist that act above the surface, on the surface, and below the Earth's surface and generate signals detectable with seismic sensors. These classes of vibrational energy may be processed in separate pipelines, the results of which are merged in follow-on information processing stages such as, for example, an Activity monitor hosted on the Aggregator Server computational platform.

Also for the disclosed embodiments, the System generates an Alert when the accumulated information meets criteria for a high-confidence determination that an activity of interest is identified. Alert notifications are logged within the Enterprise Database, and then automatically loaded by the User Interface Subsystem. The Alert may take the form of a multi-media notification primarily through the System user interface. System operators can choose to receive alerts via email, cell phone text message, and telephone or cell phone voice message. The Alert information contains database references to the accumulated information such that algorithmic reasoning that activated the Alert is traceable to the evidence supporting the automated decision.

An operator may interact with the System via the graphical user interface (GUI) of the User Interface Subsystem to examine maps, data and information logs related to the Alert, and via summary reports provided to the user through a geographical information architecture. The User Interface Subsystem is web-enabled such that the only software that is required on a remote monitor computer is a standard browser; all the software and required database functionality, that is maps, playback, database queries, and reporting, are managed and provided as a service by the Aggregator Server. At the same time, the System continues the cyclic process of acquiring sensor data, monitoring activities, tracking, and updating the map and information logs for each alert while the operator initiates protocols to deal with the Alert. Alerts are exemplary of multiple types of notifiable events. Notifiable events also include power outages, State-of-Health assessments, condition-based-maintenance alerts of System conditions, and tamper/physical security determinations. System operators can choose how to receive a notification that any of the notifiable conditions have been identified.

Once installed and verified, the System functions autonomously and does not requiring human interaction, e.g., by an analyst, engineer or scientist to detect, classify and locate signal sources, or to issue alerts on activities of interest. By way of example, detecting and identifying construction sources of interest with data acquired from a single three-dimensional array may be assessed using:

(a) Signal processing algorithms that coherently combine data continuously acquired from each sensor, resulting in an increased signal-to-noise ratio of the seismic energy incident upon each sensor array which processed data are specific to one or more directions of arrival of that energy to sensors in the array;

(b) Signal detection and classification algorithms for detecting and identifying a signal of interest and assigning a signal class;

(c) Direction-of-arrival determination comprising an azimuth or bearing angle and a dip or depression angle of the detected signals;

(d) Determination of features in the character of the detected signals that enable formulation of class discrimination statistics and fusing of information into an object (e) Determination and identification of feature patterns such as signal amplitude-time, joint-time-frequency, joint-time-azimuth, joint-time-dip, and joint-time-array-velocity patterns; and (f) Classification algorithms that enable assignment of a detected signal to a source class.

With the System operating at the Network Segment level, the signals and information are combined from across the multiple spatially separated arrays in the Network Segment. For illustrated embodiments, the arrays have overlapping coverage in range and azimuth to facilitate automatically locating a source of signal energy identified by the different arrays.

Also by way of example, locating and monitoring construction activities of interest using a Network Segment may be assessed using:

a) Aggregating (classified) signal and information objects on a time and space basis to form associated information objects b) Locating events corresponding to associated information objects c) Initiating the Activity corresponding to the located associated information objects d) Maintaining the Activity via associating additional located information objects to the Activity e) Deriving additional information based on the multidimensional patterns, e.g. joint time-space positional track f) Monitoring and assessing the Activity to generate a confidence g) Issuing an Alert based on the confidence and pre-determined criteria h) Maintaining and cancelling the Alert based on confidence and pre-determined criteria.

In one example application of the disclosed System, two uniform cylindrical sensor arrays, such as shown in FIG. 6A, detect a signal excited from a common source of seismic energy positioned under the ground surface. The arrays each have a radius, r, extending outward from the cylindrical axis of symmetry to an imaginary cylindrical wall bounding the sensor array. The direction of arrival of the signal for each array indicates an angle of arrival for the source of energy, i.e., along an acute angle of bearing from each end of a line connecting a center point of each of the two arrays to the source location, e.g., at a range many times the radius, r, of either array. For simplicity, assuming the portion of the geologic volume, V, between the source and the arrays A1 and A2 is uniform and homogeneous, the determined azimuth and dip angles are within the beam response centered about the beam axis defined by the angles $\Phi$, $\theta$.

The beam response, centered on the azimuth angle $\Phi$ and dip angle $\theta$ for the specified propagation velocity that defines the beam main response axis, carries with it some uncertainty which can be quantified, and that generally approximates a solid cone centered about the beam main response axis. The intersection of these "uncertainty cones" drawn along those directions of arrival from the two arrays provides an approximate location in three-dimensional space for that signal source. Noting that reflection and refraction of seismic wave energy can be influential, depending on the true nature of the earth under the surface, corrections accounting for these effects may be selectively applied to localization solutions. The correction factors may be obtained during prior calibration and characterization activities performed under controlled conditions.

When the signal location changes in subsequent time frames, components of the automated processing system fuse the accumulated information from the individual arrays, creating a spatial track (i.e., a positional track) of corresponding changes in location, which changes may be reported out to the system user along with the characteristics of the spatial track known as the track state and state history. Over time, monitoring can reveal very distinct patterns of activities over hours and days, with characteristics of the derived information patterns becoming a distinguishing feature relative to other sources of seismic energy in the locale. System real-time output in this example may be a report, issued by the User Interface Subsystem, that a high priority Activity of Interest has been detected, including the direction from which those signals have been arriving at each array; and, for a network of arrays, a location estimate of for the signal source. The accumulated information and reports are automatically forwarded to the Aggregator Server that maintains the enterprise database, and then the information is provided as a service to a web-based graphical user interface. The graphical user interface combines geographic, geologic, infrastructure, and additional relevant and contextual information in a series of graphical layers. The user interface may be what is referred as a common operating picture (COP). The interface allows the user to interact with the various layers and system alerts, including the features and histories of the alerts.

Systems and methods are provided for determining localization information for sources of seismic energy positioned below a ground surface. In accord with one series of embodiments, a method of determining localization information receives data from first seismic sensors in a first three-dimensional array containing sensors emplaced below the ground surface and coherently processes the signals to provide three dimensional localization information that enables determination of an angle of arrival for a signal of interest (SOI). Processing of the signals identifies first angle of arrival SOI components derived from signals acquired from a first subset of the sensors in the first array. Sensors in the first subset are spaced apart from one another by distances corresponding to one half of a signal wavelength associated with a seismic sensed signal frequency present in the signal of interest. Processing of the first angle of arrival signal components from the first subset of sensors provides a first composite signal exhibiting a high signal-to-noise ratio (SNR). The method includes determining the angle of arrival at which the SOI intersects a reference point of the first array based on results of processing signals received from the first plurality of the sensor elements in the first array.

In one embodiment of the described method, seismic signals from a second sensors in a second array are coherently processed to provide location information by identifying processed second angle of arrival signal components generated from a second subset of the sensors associated with the SOI, where sensors in said second subset spaced apart from one another by distances corresponding to one half of the signal wavelength associated with the seismic sensed signal frequency present in the signal of interest. Processing of second angle of arrival signal components from the second subset of sensors provides a second composite signal exhibiting a high SNR. A second angle of arrival is determined at which the signal of interest intersects a reference point of the second array based on results of coherent processing of signals received from the sensors in the second array. In one example, (i) the first angle of arrival is definable by a first beam vector which intersects the reference point of the first array and (ii) the second angle of arrival is definable by a second beam vector which intersects the reference point of the second array, and location information is generated for the energy source of the seismic sensed signal of interest based on intersection of the first and second beam vectors.

In accord with another series of embodiments a System is provided for determining localization information for a first energy source positioned below a ground surface based on sensed seismic signals associated with a first signal of interest (SOI) generated by the first energy source. The first SOI includes first waveform components associated with a first design frequency for which phase velocity and wavelength of the first waveform components vary based on properties of media below the ground surface. A sensor subsystem includes a first group of seismic sensors arranged in a first array emplaced below the ground surface, which sensors are responsive to sense seismic energy from the first source. A processing subsystem is coupled to receive seismic data acquired from sensors in the first array. The processing system includes computer instructions to perform spatial coherent processing of said first waveform components associated with the first design frequency. Seismic signals which include the first waveform components are received from a first series of sensors in the first group. At least one subset of sensors in the first series of sensors has spacings between pairs of the sensors in the same subset rendering the coherent processing of said seismic signals responsive to the first waveform components associated with the first design frequency so that, when coherent processing is performed on seismic signals received from said at least one subset in the first series of sensors, a three-dimensional angle of arrival of the first SOI from the first energy source to the first array is determined. Relative to one of said first waveform components impinging on a first sensor in said one subset, and having a wavelength associated with the first design frequency, at the first sensor, the first sensor is a point sensor, having maximum dimensions less than five percent of the wavelength.

In one implementation the System is configured to determine localization information where the sensor subsystem includes a second group of seismic sensors arranged in a second array emplaced below the ground surface. Seismic sensors in the second array are responsive to sense seismic energy from the first source in a frequency range extending from 10 Hz to 2 kHz. The processing subsystem is coupled to receive seismic data acquired from sensors in the second array and execute computer instructions to perform coherent processing of said first waveform components associated with the first design frequency and acquired from sensors in the second array. Seismic signals which include said first waveform components are received from a second series of sensors in said second group. A second subset of sensors in the second series of sensors has spacings between pairs of the sensors in the second subset rendering the coherent processing of said seismic signals responsive to the first waveform components associated with the first design frequency so that, when coherent processing is performed on seismic signals received from said at least the second subset in the second series of sensor elements, a three dimensional angle of arrival of the first SOI from the first energy source to the second array is determined.

In a further implementation of the System, the three-dimensional angle of arrival of the first SOI from the first energy source to the first array is defined by a first beam vector which intersects a reference point of the first array and the first energy source, and the three dimensional angle of arrival of the first SOI from the first energy source to the second array is defined by a second beam vector which intersects a reference point of the second array and the first energy source. The processing subsystem includes storage media having further computer instructions stored thereon to provide location information for the energy source of the seismic sensed signal of interest based on intersection of the first and second beam vectors.

BRIEF DESCRIPTION OF THE FIGURES

For the purpose of illustrating the invention, the figures show aspects of one or more embodiments of the invention. However, the invention is not so limited to these or to the particular arrangements shown in the drawings where.

Figure 1:
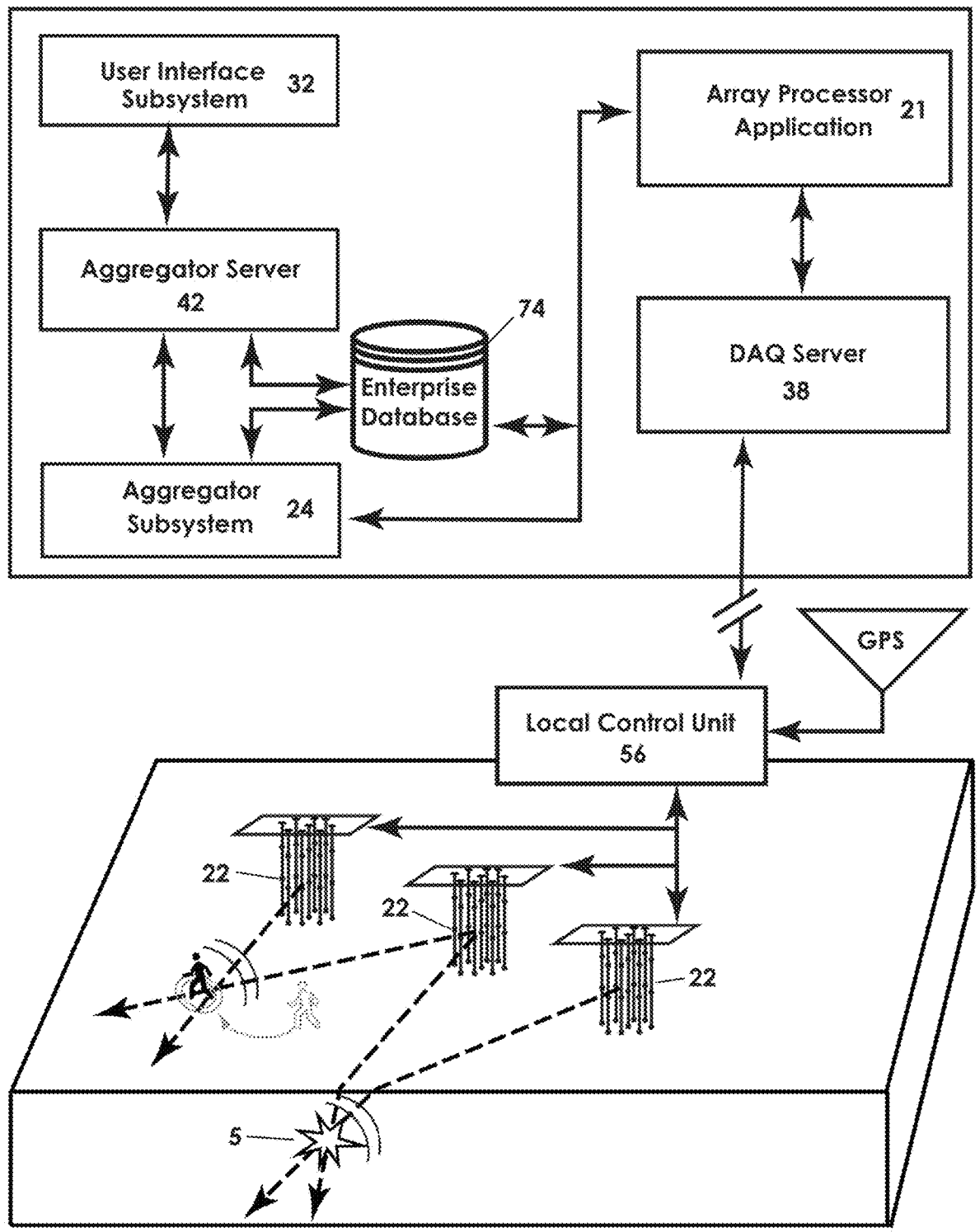
FIG. 1 provides an overview of Systems according to the invention.

Like reference numbers are used throughout the figures to denote like components. Numerous components are illustrated schematically, it being understood that various details, connections and components of an apparent nature are not shown in order to emphasize features of the invention. Various features shown in the figures are not shown to scale in order to emphasize features of the invention.

DETAILED DESCRIPTION OF THE INVENTION

Before describing in detail particular methods, apparatuses and Systems related to embodiments of the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to understanding the invention. Further, the described example embodiments do not define limits as to structure or method according to the invention, but only provide examples which include features that are permissive rather than mandatory and illustrative rather than exhaustive.

Numerous terms, used in describing example embodiments and features of the invention, have well-known meanings in the art. For clarity terms are defined in this description.

As used herein, "specific aperture" and "array aperture" refer to the maximum distance across sensors contained in any of multiple planes perpendicular to the angle of arrival of a plane wave. Unless the array geometry is in the form of a regular sphere, array aperture is a function of both azimuth (measured east of north) and dip (measured down from the horizontal plane). As is well-known, the array aperture determines the ability to resolve the angle of arrival of an incoming signal.

"Array aspect ratio" is the ratio of an array geometry's smallest dimension to its largest dimension. "Array Element" means an arrangement of one or more sensors at a single point within a sensor array.

"Coherence length" is the propagation distance over which a signal wave maintains a specified degree of coherence. The coherence length is frequency dependent and, to some extent, site dependent. For described embodiments the array aperture is not much greater than the seismic wave coherence length in order for the beamforming operation to yield a gain.

"Coherent processing" means spatial-coherence processing, more commonly known as beamforming, where signals, acquired with multiple suitably arranged point-sensors (e.g., in an array of spatially distributed sensors), are processed based on signal coherence across the multiple spatially distributed point-sensors.

"Compact array" refers to a convex polytope arrangement of array elements having apertures defined, for example, in horizontal and vertical planes such that the aperture in the respective planes is limited to that determined by the array design frequency that maximizes dimensions of the convex hull containing all sensors in that plane and where all vertices are array elements.

"Point-sensor", in the context of the wavelengths of a sensed wavefield, means a sensor that measures the applicable field at a single point in three-dimensional space, rather than as a distributed sensor that measures the field over a finite aperture compared to the wavelength of the measured signals. Specifically, the dimensions of the point-sensor are much smaller than the wavelength of the maximum seismic frequency of interest. By way of example, for a seismic wave propagating in solid ground with a wavelength of 3 m, the maximum dimension of a seismic sensor element acting as a single point sensor would be less than 5% of the wavelength, or 15 cm in this example.

The expression "sensor array" refers to a coordinated arrangement of array elements, e.g., sensors. "Signal of interest" (SOI) refers to a signal from a source or activity type that requires a response.

"Volumetric" refers to a three-dimensional array geometry, where the individual array point-sensors (known generally as array elements) are arranged in a three-dimensional distribution that encloses a polyhedral volume of earth. The volumetric array elements are generally arranged with inter-element spacings corresponding to one or more design frequencies and may be arranged in any of multiple ways to enclose a volume so long as all sensors are either located at vertices or interior to the boundaries of the polyhedron.

Referring again to FIG. 3, an exemplary embodiment of a passive monitoring system, referred to herein as the System 10. In this example, the System 10 monitors seismic signals for detection of relatively shallow underground activities such as tunneling and drilling, but is applicable to detection of subterranean microseismic activities such as occur in association with carbon sequestration, permanent reservoir monitoring, reservoir engineering activities such as fracking and geothermal power production. As used herein the term seismic refers to signals in the form of elastic waves transmitted through solid or fluid Earth media in the form of seismic or acoustic waves in frequency ranges extending from below 1 Hertz (Hz) up to at least 2 kilohertz (kHz).

The System 10 comprises a series of subsystems that perform operations from fundamental sensing to automatic report generation and reporting of Alerts to users. The System can be scaled and customized for monitoring a chosen site based on the geological environment, physical constraints imposed by the site, overlapping coverage requirements for the arrays of sensors and the region to be monitored for a Signal of Interest (SOI) to optimally provide monitoring or protection.

The system architecture is based on a modular hierarchy of components that may be joined in combinations of serial or parallel arrangements to efficiently monitor for activity that meets criteria for providing an automated notification. The configurations illustrated in the figures are only exemplary of a few among a wide variety of system hardware designs and pipeline processes. The System 10 is composed of a plurality of Network Segments 12. Each Network Segment 12 comprises a sensor subsystem 14, a data acquisition (DAQ) subsystem 16, and an Array Server Subsystem 18, comprising a plurality of Single Array Pipelines 20. The System 10 also includes an Aggregator Subsystem 24 and a User Interface (UI) Subsystem 32.

The Aggregator Subsystem 24 comprises one or more Aggregator Instances, each executing and controlling an Aggregator Pipeline 26, each pipeline providing a data aggregation processing for a different Network Segment 12. Results from processing the data input to each Aggregator pipeline 26 are provided to the Aggregation Server Subsystem 30, which manages the enterprise database functions and provides services for the user interface. The UI Subsystem 32 provides Alerts and useful information compiled by the Aggregation Server Subsystem 30.

Each Sensor Subsystem 14 associated with a different Network Segment 12 comprises a series of sensor arrays 22 that provide an overlapping coverage to receive seismic data in parallel, from up to n sensor arrays 22, e.g., forty sensor arrays, each such series of n sensor arrays being connected to a different LCU 56 in a Network Segment 12. In the example embodiment each of the sensor arrays 22 comprises 27 sensors 23 with up to forty sensor arrays in each Network Segment 12. Each array 22 in a Network Segment 12 operates independent of the other arrays in the same Network Segment. The processing pipelines 26 of the subsystem 24 aggregate information derived from the single array pipeline instances 20 associated with each of the multiple sensor arrays within a Network Segment 12.

The Aggregator Subsystem 30 provides an Aggregator Instance that aggregates or fuses processed information derived from arrays in single Network Segments to perform higher level processing. The Aggregator Server Subsystem provides database management functions for one or more Network Segments as well as providing UI subsystem services. The System architecture allows for the combination of many Network Segments, each operating in parallel and creating a larger, highly scalable network of sensor arrays 22.

The arrangement of sensor arrays 22 in each Network Segment 12 is distributed to provide continuously overlapping spatial coverage for the portion of the geologic volume, V, being monitored by sensor arrays in that Network Segment. In the illustrated examples, each Network Segment 12 is operationally complete, comprising necessary infrastructure for operation independent of any other segment. Accordingly, the Network Segments 12 each comprise the Sensor Subsystems 14 that form the multiple sensor arrays, the Data Acquisition Subsystem that interacts directly with individual sensors that are the array elements in the Sensor Subsystem 14 and that provides the data logging services for each independent array, and infrastructure elements such as power supplies, communications connections, and physical enclosures to support the functionality of applicable components of these subsystems.

Figure 3A:
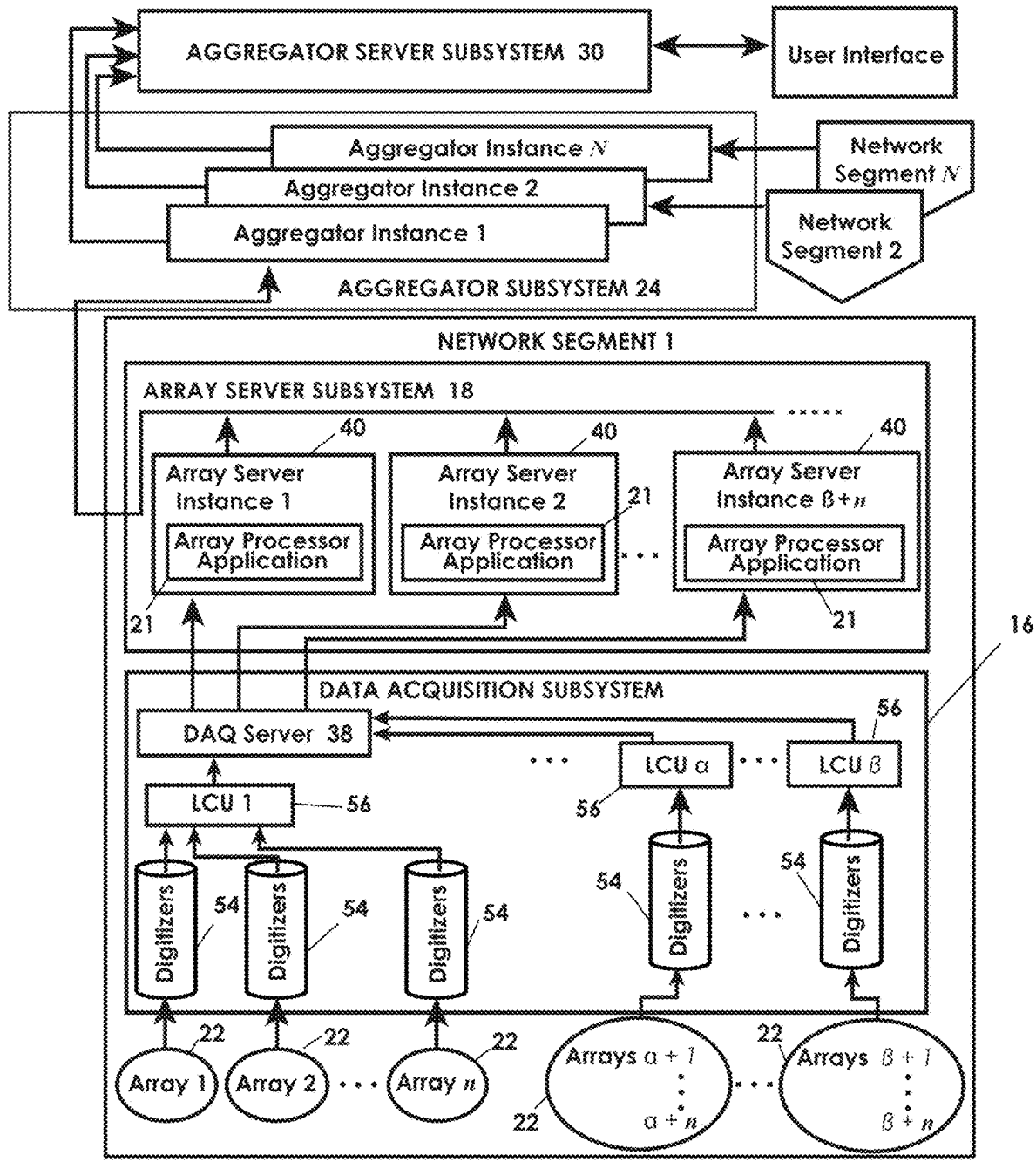
FIGS. 3A and 3B illustrate an overall architecture for the System illustrated in FIGS. 1 and 2, where FIG. 3A encompasses the system signal and information flow through various hardware and software components, while FIG. 3B provides a detailed illustration of the system computational hardware architecture.
Figure 3B:
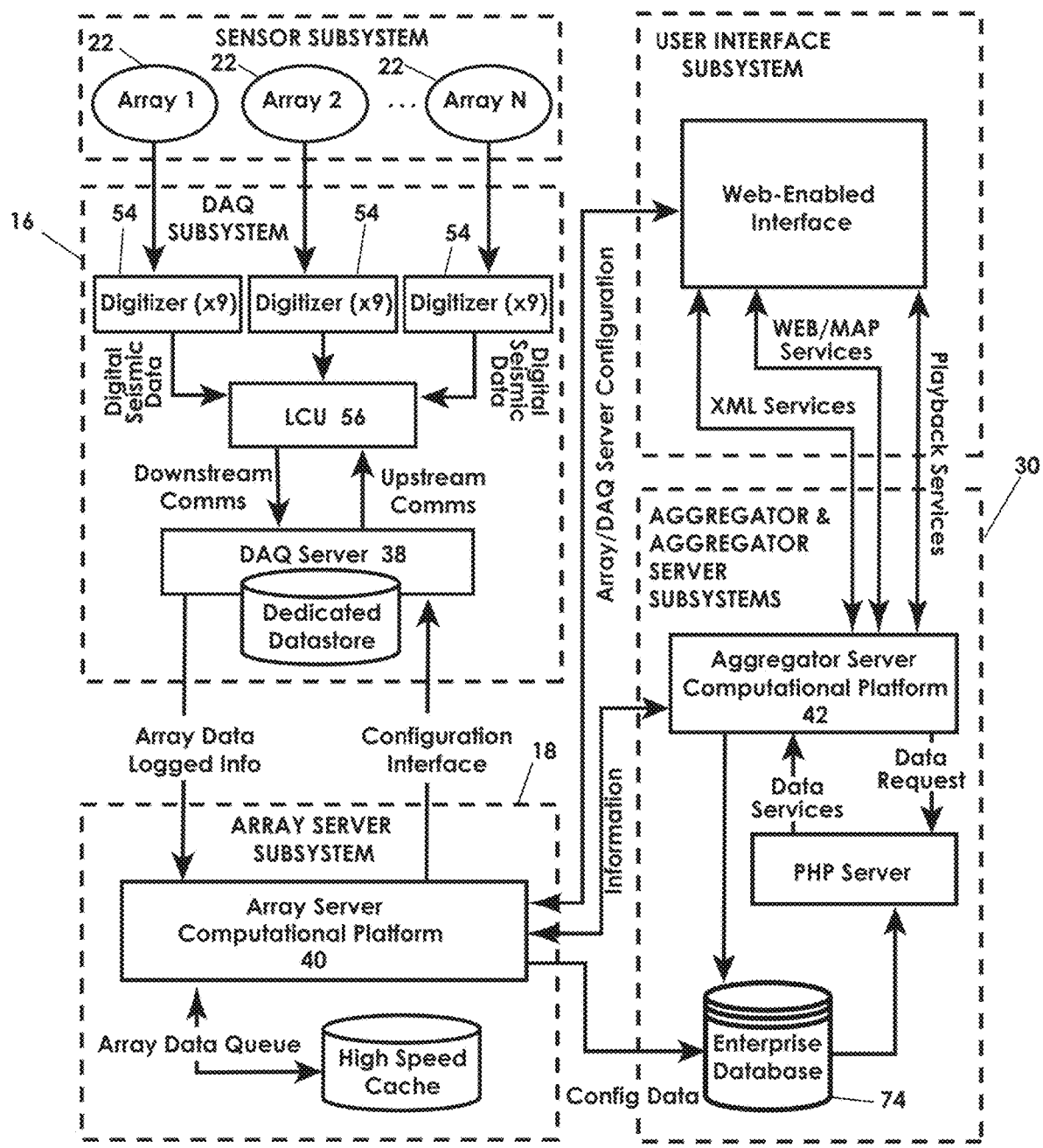

Referring to FIGS. 3A and 3B, each Network Segment includes a Data Acquisition (DAQ) Subsystem 16 dedicated to processing all data generated by the sensor arrays in the one Network Segment. With the multiple DAQ Subsystems 16 each conditioning and processing data received from a different one of the multiple Network Segments 12, each DAQ Subsystem 16 provides the processed data to a different Array Server Subsystem 18 which provides an instance of the Array Server Application per each array in the same Network Segment to perform multiple processing functions, including single-array classification functions per the single array pipeline 20.

Each one of the plurality of Array Server Subsystems 18 (one for each Network Segment) transfers processed information (such as azimuth and dip angle information and conclusions on classification) to an instance of the Aggregator Subsystem 30. Each of the Aggregator Instances is associated with a single Network Segment 12 to perform processing to generate higher level information derived from multiple arrays within the associated Network Segment, such as object location information and tracking of object movements. The plurality of all Aggregator Instances, each of which acts to combine the information from arrays 22 in the same Network Segment, in turn provide information through a single Aggregator Server Subsystem to the User Interface Subsystem.

Operational integration of the array Network Segments is provided by supervisory levels of computer hardware and software that receive information from multiple Network Segments as shown in FIG. 3a and FIG. 3b. The network may be designed to provide no coverage where it is impractical to install arrays or where coverage is not needed.

The system computational architecture shown in FIG. 3b integrates three enterprise-wide dual redundant server sets installed at hosting facilities that provide the computational hardware resources required to process the array data streams in real time. These are the of the Data Acquisition (DAQ) Server 38 of the DAQ Subsystem, the Array Server 40 of the Array Server Subsystem 18, and the Aggregator Server 42 of the Aggregator Server Subsystem 42, collectively referred to as the Enterprise Servers or the enterprise-server set, clustered over a network connection to provide redundancy and to support continuous system operations in the case of a failure at one server set.

In addition, the Array Server 40 and the Aggregator Server 42 are computational platforms that may connect to other physical infrastructure data storage servers where pertinent raw and event related information is stored on a longer-term basis. The Enterprise Servers include their own operating systems appropriate to the level of processing they support. In some cases the operating system may be Windows based, but other operating systems may be used, including variants of the Linux operating system. The three Enterprise Servers are the computational platform hosts for all of the software functions that do not take place in the field.

The System 10 includes substantial physical infrastructure components that a) provide power to both the field and the computational components, b) provide two-way communications via either standard communications cabling using either metal conductors or optic fiber pairs, or wireless communications means using components readily available in the marketplace, and c) provide data storage devices required by the System 10. The Enterprise Server sets connect to infrastructure data storage hardware systems where pertinent raw and event related information is stored on a longer-term basis. Some of these infrastructure components are deployed on a network segment basis.

The Sensor Subsystem 14 includes the physical sensing elements buried in the ground, cable components, and connector components.

The DAQ Subsystem 16 receives analog signals from the sensors via cable, digitizes the analog signals, provides timing control, time-stamps the digital data, logs that data for long-term storage, controls built-in-test (BIT) hardware and digital to analog signal components, and outputs digital data to the Array Server for processing.

Figure 15:
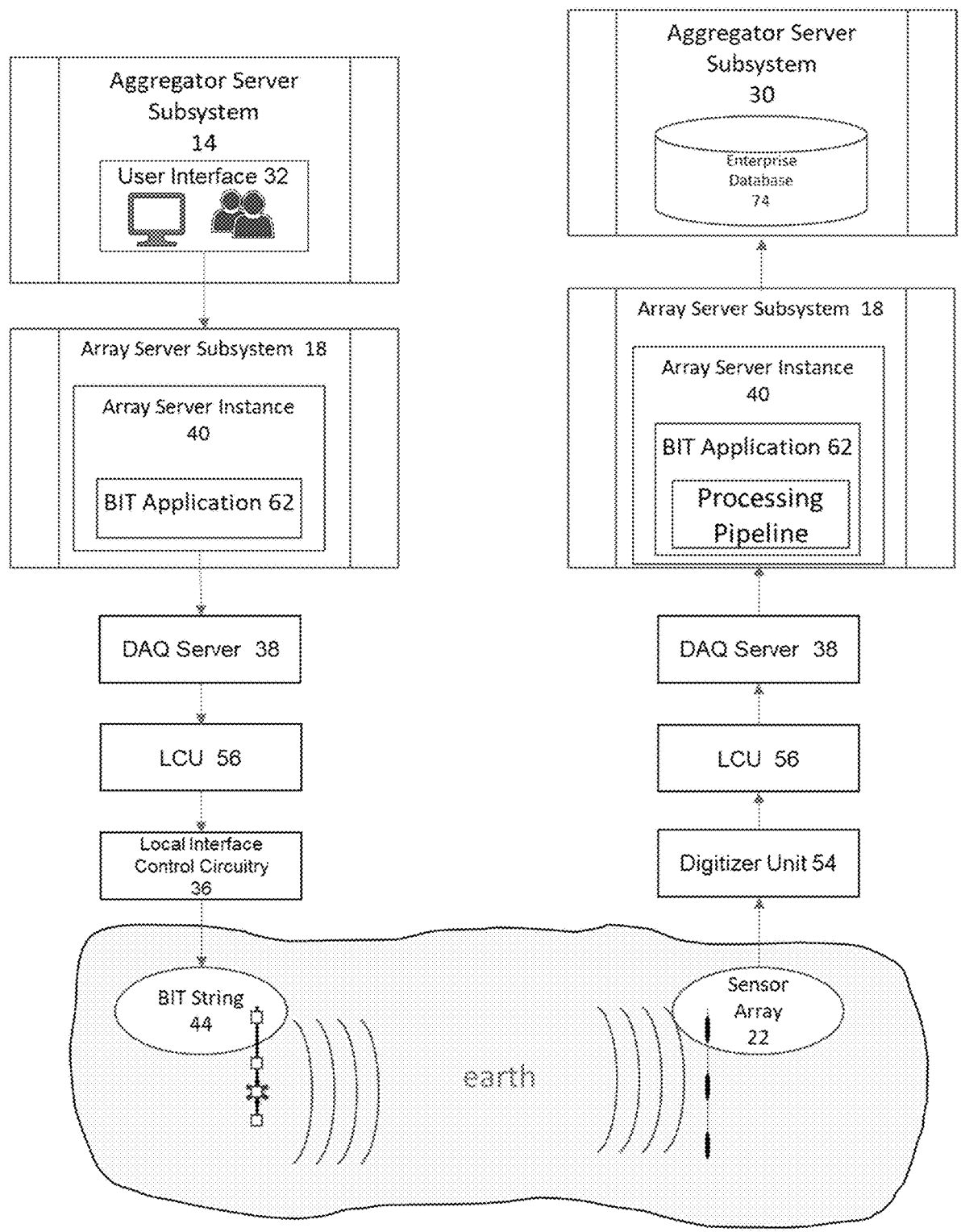
FIG. 15 illustrates elements of the System associated with an exemplary built-in-test capability and the flow of information, command and control signals and data signals supporting that capability.

Referring also to FIG. 15, the State of Health (SOH) subsystem provides passive monitoring of the output of every individual sensor via internal testing of the electrical properties and frequency response of individual sensors when appropriate for the particular type of sensor deployed in the System 10. However, the built-in-test function provides frequency-controlled active sources (e.g., actuators) installed collocated in the elastic media with the sensor arrays 22 when the arrays are initially installed. The SOH subsystem provides automated and on-demand active and passive testing of the System 10 operations, including testing of responses of all sensors in all of the arrays to one or more frequency-controlled sources transmitting known waveforms from known locations at known power levels.

The Array Server Subsystem 18 receives time-stamped digital data from the DAQ Subsystem and provides the signal and information processing for data derived from each sensor array along a pipeline dedicated to one sensor array 22. The Array Server Subsystem is hosted on the Array Server computational platform. See FIGS. 3 and 9. Outputs from the Array Server Subsystem 18 include derived event information sent to the Aggregator Subsystem for further processing.

Figure 12:
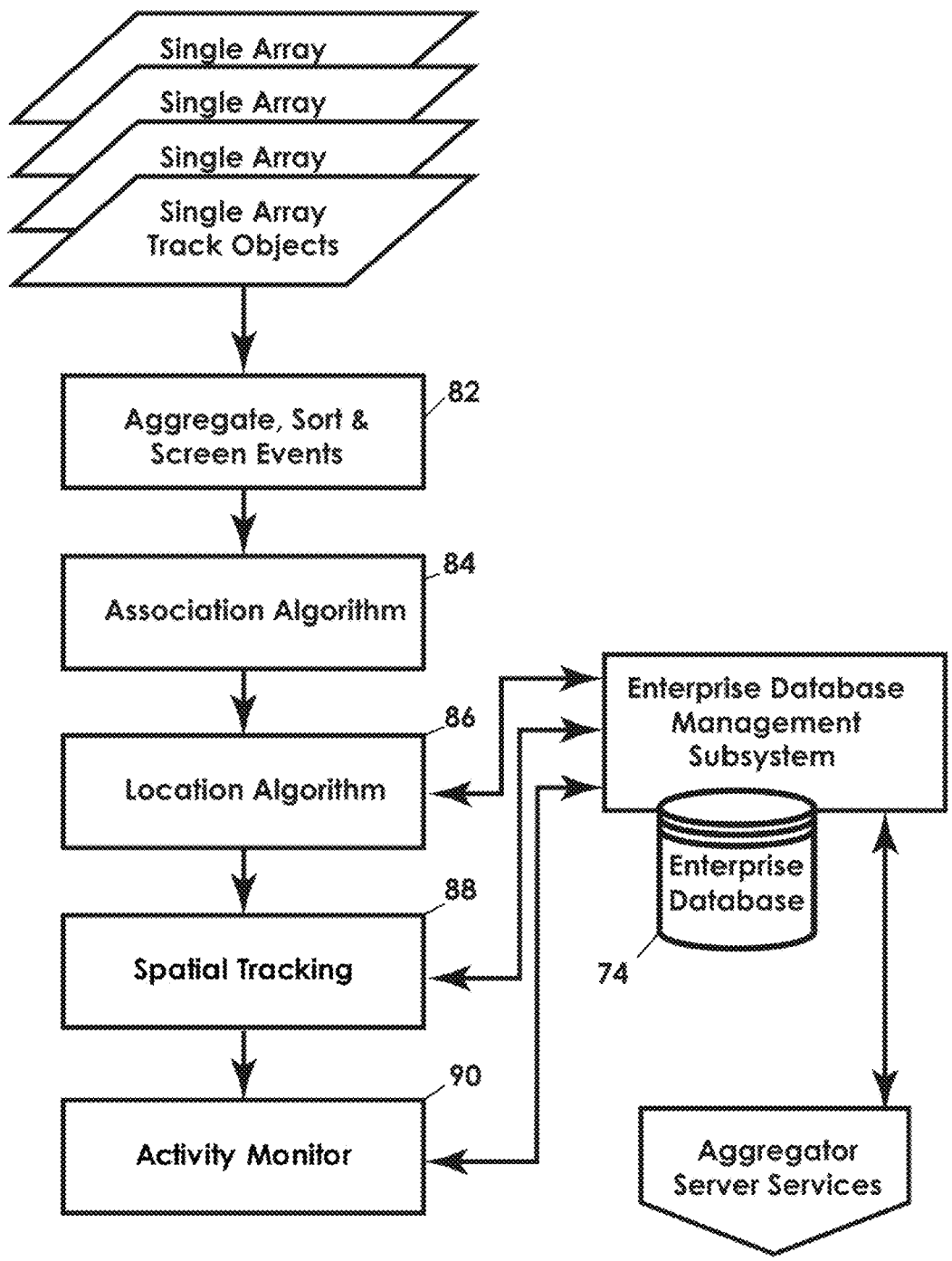
FIG. 12 is a functional flow for processing in an aggregator subsystem.

Referring to FIG. 12, the Aggregator Subsystem manages services that aggregate data, apply rules and functions, store information and display information. To this end, the Aggregator Subsystem receives event related information from multiple array servers into a processing pipeline that, based on the combination of this information, identifies source classes and activity classes and outputs information such as localization and tracking of seismic events into its database and forwards the information to the Aggregator Server Subsystem.

Both the Aggregator Subsystem and the Aggregator Server Subsystem are software components hosted on the Aggregator Server computational platform. The Aggregator Server Subsystem 30 receives database information from one or more Aggregator Subsystems 24, manages the data entry functions for the System database, and provides user access to the stored information. When the confidence criteria are met on identified Activities, the Aggregator Server issues an Alert to the User Interface Subsystem for dissemination.

The User Interface Subsystem provides display management services for alert information and network and array status information through a graphical geographical-based display. The User Interface Subsystem provides a unified operational picture with interactive display of maps, geographic data, and information logs relating to alerts. An operator may interact with the System 10 to access data and information in the Aggregator database 48 for graphical and tabular display, study, analysis, and report generation of the detected events that together form the Activity of interest. Automated information processing components continue to monitor the identified Activities of Interest, provide alert status updates to maps and logs, and provide updates to the operators as specified in the system configuration, freeing the operator to initiate alert response protocols.

Figure 4:
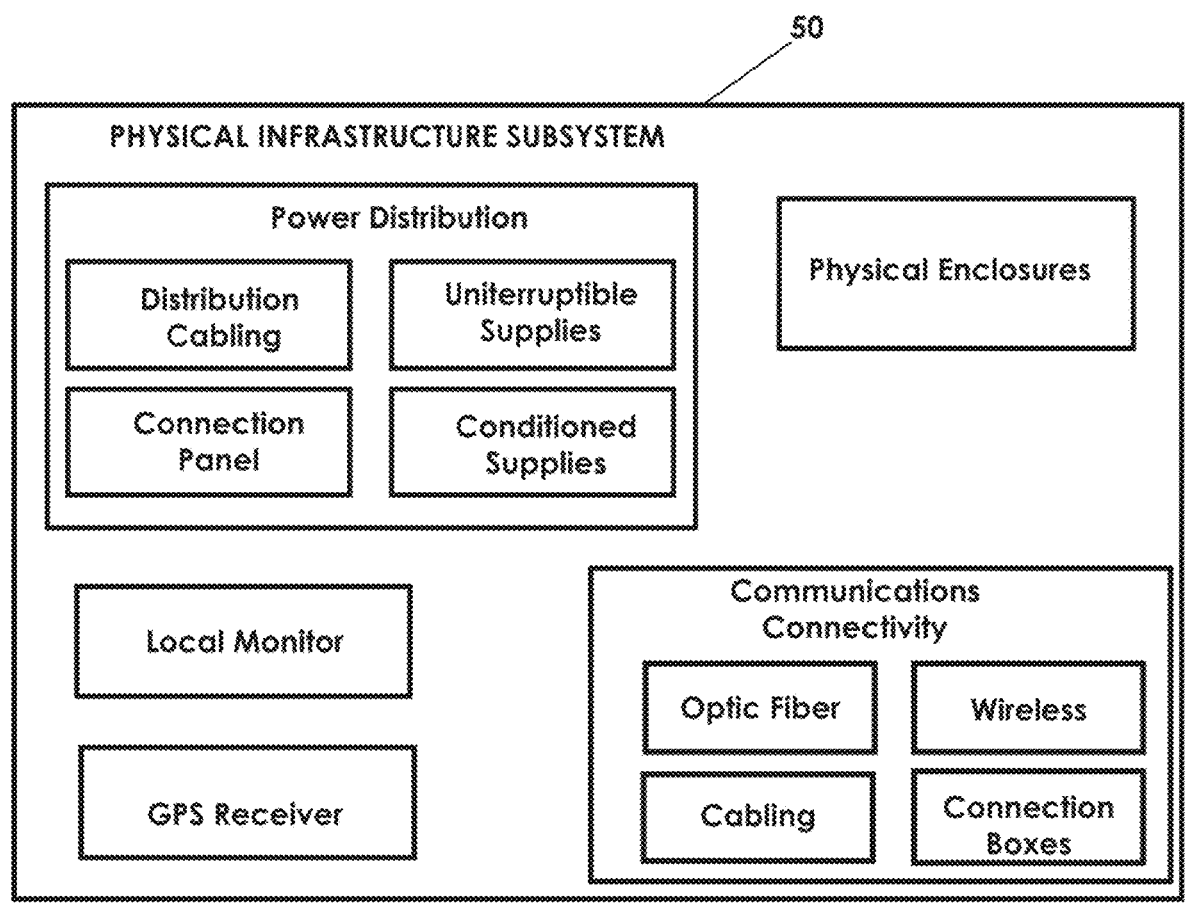
FIG. 4 illustrates the physical infrastructure associated with the illustrated System.

Referring to FIG. 4, the system architecture includes a Physical Infrastructure Subsystem 50 providing:

a) Continuous power and grounding to the Sensor Subsystem and other field components,
b) Continuous power and grounding to computing components,
c) Two-way communications via standard communications cabling using either metal conductors or optic fiber pairs, or wireless communications means using components readily available in the marketplace,
d) Weather-proof and tamper-evident enclosures that house electronic components, electronic connections, and communications connections.
e) Redundant data storage hardware devices required by the System computational enterprise,
f) GPS data connectivity, and
g) Local monitoring capability through a supervisory interface.

Some of these infrastructure components are deployed on a Network Segment basis. Additional infrastructure elements exist to provide power, transmit and receive communications, and house connections depending on and varying with the installation site. The Enterprise Servers connect to appropriate data storage hardware that contain the acquired digital data and derived information related to detected events information. For example, FIG. 3b indicates a "dedicated datastore" that services the data storage requirements of the DAQ Server. As also shown in FIG. 3B, additional data storage hardware is managed through the Aggregator Subsystem 24 and the Aggregator Server Subsystem 30 for database operations and User Interface data services, as well as State of Health logs and related meta-data.

The data storage hardware is connected over a network connection to provide long-term raw data and event data storage and data management. Long-term data storage managed within the data storage hardware is accessible by operating technicians for tasks such as analysis or event review.

The Sensor Subsystem 14 comprises the physical sensing elements 23 buried in the ground, as well as cable and connector components. The sensing elements 23 act as point-sensors for the frequency band of interest and may be geophones, seismometers, accelerometers or similar inertially based sensory apparatus. The sensing elements may also be capacitive, piezoelectric, magneto-strictive, optical, optic fiber, or sensors that work on similar principles. The primary requirement for the individual sensors is that they produce a continuous output that is proportional to the time-varying amplitude of the seismic wave impinging upon the sensor, or proportional to a time-derivative of that amplitude.

The term "point-sensor" is to be understood as a description of the size of the sensor relative to the wavelengths of the sensed wavefield, which measures the applicable field at a single point in three-dimensional space, rather than exhibiting properties of a distributed sensor that measures the field over a finite aperture compared to the wavelength of the measured signals. As indicated in Table 1, the dimensions of a point sensor are much smaller than the wavelength of the maximum frequency of interest.

cm (0.1 m) dimensions are well within point-sensor considerations for typical design frequencies in the 100 Hz range.

Because the seismic strain originating with an elastic wave traveling in the earth media is a vector field, it is desirable (but not required) that the sensor capture all the components of particle motion (strain). Thus, the array elements may each be a three-component-seismic sensor package comprising three seismometers, geophones, or accelerometers, that respond to strain along one axis, and are oriented such that the three principal components of strain may be output as three separate signals. However, the sensor may also be a sensor that responds equally to strain in any direction, also called an omni-directional sensor.

Examples of suitable sensors for use in the System include: Geospace GS-1, Geospace HS-1. Geospace GS-ONE and One-LF, Geospace SMC-1850, and Geospace Omni-X-LT. As is common, a durable over-molded jacket surrounds each sensor and wiring service loop. The cables and connectors may be designed to withstand a high-pressure, salt-water environment to ensure they do not fail under foreseeable site conditions. The cables are also designed to provide extra pairs of conductors for the purposes of in-situ sensor testing and evaluation.

In the illustrated embodiments the array elements are collectively configured to form compact volumetric point-sensor arrays emplaced underground, i.e., a three-dimensional arrangement enclosing a volume of earth material. The sensor arrangements in the sensor arrays 22 are designed with geometries appropriate for successfully acquiring data that can be processed based on the spatial coherence of the signals. Principles of array design can be found in many readily available modern texts. However, not all design concepts are appropriate for compact volumetric arrays. See, for example:

TABLE 1

| Frequency (Hz) | Wavelength in Air (m) | Fractional Ratio (%) | 5% wavelength (m) | Wavelength in Soil (m) | Fractional Ratio (%) | 5% wavelength (m) |
|---|---|---|---|---|---|---|
| 10 | 34.4 | 0.291 | 1.720 | 80 | 0.125 | 4.000 |
| 100 | 3.44 | 2.907 | 0.172 | 8 | 1.25 | 0.400 |
| 200 | 1.72 | 5.814 | 0.086 | 4 | 2.5 | 0.200 |
| 500 | 0.688 | 14.535 | 0.034 | 1.6 | 6.25 | 0.080 |
| 1000 | 0.344 | 29.070 | 0.017 | 0.8 | 12.5 | 0.040 |

| Frequency (Hz) | Wavelength Water (m) | Fractional Ratio (%) | 5% wavelength (m) | wavelength sediment (m) | Fractional Ratio (%) | 5% wavelength (m) |
|---|---|---|---|---|---|---|
| 10 | 100 | 0.1 | 5.000 | 200 | 0.05 | 10.000 |
| 100 | 10 | 1 | 0.500 | 20 | 0.5 | 1.000 |
| 200 | 5 | 2 | 0.250 | 10 | 1 | 0.500 |
| 500 | 2 | 5 | 0.100 | 4 | 2.5 | 0.200 |
| 1000 | 1 | 10 | 0.050 | 2 | 5 | 0.100 |

Columns in Table 1 represent vibration frequency, associated wavelengths in various media (air, soil, water, sediment), fractional ratio of, for example, a sensor with a dimensional extent of 10 cm to each wavelength, and a computation of five percent of each wavelength. A sensor with a physical dimension which is five percent or less of the wavelength of the system's design frequency is considered a point-sensor for that particular medium and frequency range. The phase velocity used for air is 344 m/s, soil, 800 m/s, water, 1000 m/s, and sediment, 2000 m/s. As is evident from Table 1, sensors in soil or sedimentary media with 10

Johnson, D. H. and D. E. Dudgeon (1993) Array Signal Processing: Concepts and Techniques. Prentice Hall, Upper Saddle River.

Butler, J L., and C. H. Sherman (2016) Transducers and Arrays For Underwater Sound. Springer International Publishing, Switzerland.

Gu, Y. J. (2010) Arrays and Array Methods in Global Seismology. Springer Science+Business Media B.V., Netherlands.

Vermeer, G. J. O. (2012) 3D Seismic Survey Design, second edition. Society of Exploration Geophysicist, Tulsa.

Monk, D. J. (2020) Survey Design And Seismic Acquisition For Land, Marine, And In-Between In Light Of New Technology And Techniques. Society of Exploration Geophysicists, Tulsa.

The array design within each Network Segment may vary, and the distances between the emplaced array sensors in a Network Segment may also vary. Factors to be considered include the expected range of source signal strengths; required location resolution; and network tolerance to the loss of the functioning of an array. Through the customization of array designs within each Network segment 12, the System 10 is adaptable to pre-existing infrastructure and ensuring consistent performance capability along, for example, non-linear boundaries having variable topographies and geologies, and limited deployment areas.

Embodiments of the sensor arrays 23 suitable for the sensor subsystem 14 are customizable based on several factors. For example, embodiments of the arrays may base the number of sensors on the array gain required to observe signals of interest, relative to ambient noise levels and the nature of the ambient noise. Chosen spacings between array elements may be based on the most relevant frequencies of interest for signals of interest and the signal propagation velocities in the media where the array sensors are installed. Together, the frequency content and the propagation velocities across the sensor array determine the wavelengths of the signals of interest; and the design frequency, $f_d$, sets the design wavelength $\lambda_d$, as described above. For example, with a small aperture array, there may be no advantage to conventional beamforming when the ambient background noise between sensors is also coherent and the sensor spacing, d, is less than half the wavelength of the design frequency (i.e., $d<\lambda/2$).

Conventional Bartlett beamforming takes advantage of the coherence of a signal received across the array from a common source and the simultaneous independence of the ambient noise field across that array. In this regard, Beamforming, (i.e., referred to herein as Spatial Coherence Processing), which is distinguished from temporal coherence alone, spatially averages phase differences in signal data received by different sensors 23 to emphasize signals that are temporally in-phase across the array at particular angles of arrival and phase velocities. Furthermore, features of the invention are, in part, based on recognition that an array with a small sensor spacing, d, compared to the signal wavelength, and/or with a small aperture, can only effectively process the most energetic signal at a given frequency when the background noise and any other source at that frequency are a corrupting source of error.

That is, with a small aperture array, there would be little or no possibility of resolving the bearing angle of a single one of multiple sources when the source signal of said single one of multiple sources is received simultaneously with signals from one or multiple other sources having the same frequency content. The fact that the ambient background noise is not independent across channels at these wavelengths due to the close proximity of the sensors also means that no advantage in improved SNR is had by adding additional sensors to the small aperture array (or for arrays where d is small compared to wavelength, e.g., for d<25% of $\lambda$.

The required angular azimuthal resolution dictates the desired specific aperture of the array. The process of designing the array geometry is an optimization problem balancing the above-mentioned variables within the limitations imposed by site restrictions and emplacement difficulties. In addition, cost/benefit aspects are to be considered with regard to system wide implications of an array design. Exemplary geometric sensor array designs suitable for some applications are shown in FIGS. 6a-6e. The array sensors may be arranged in cubic, cylindrical, hemispherical, or spherical geometries. Reference to a type of geometry is to be understood as specifying a surface shape along which array elements 23 are positioned.

For example, an array design for general security applications may comprise a simple array having as a maximum dimension a specified diagonal length or radius about a symmetric axis (e.g., a radius of 2 meters is acceptable). For a uniform cylindrical array with 7 elements per layer, including elements along the central axis (a hexagon with a center element per layer), and a two-meter distance between each layer, the element spacing would then be 2 meters; and for a phase velocity of 800 m/s, the design frequency would be $f_d$=200 Hz, and the design wavelength would be 4 meters. The total number of elements would be the number of layers $\mathcal{N}$ *7. For a 3-layer array, the aspect ratio would be 1:1, and the number of elements would be 21.

Figure 6A:
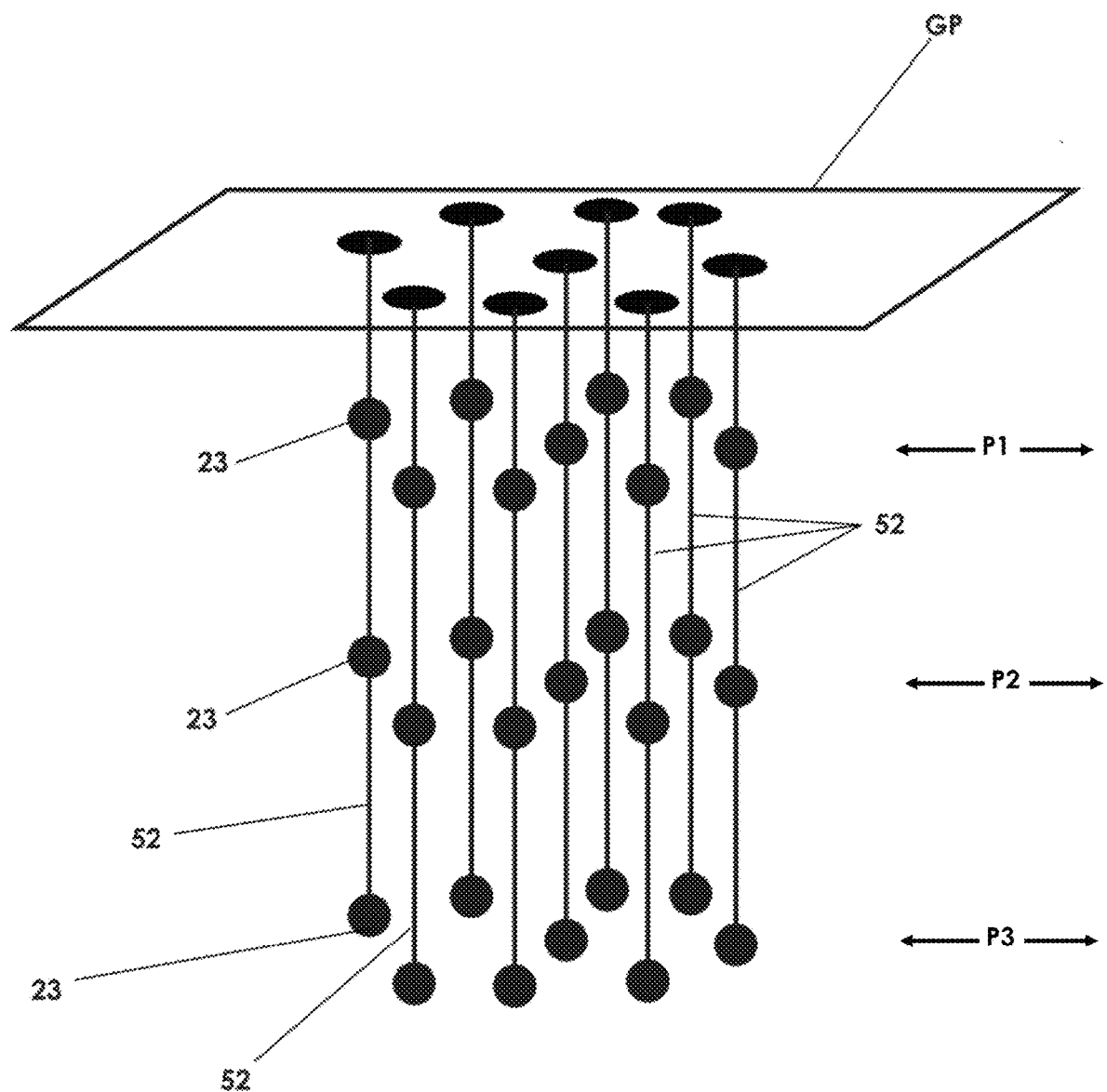
FIGS. 6A-6F illustrate several embodiments of volumetric sensor configurations.

For purpose of comparison, the sensor array embodiment of FIG. 6A depicts a uniform cylindrical array including sensors placed along a central axis that provides a total of 27 elements buried in the earth. The array elements 23 are arranged along three spaced-apart planes P1, P2 and P3 each disposed in a horizontal orientation parallel to an overlying horizontal ground plane, GP.

The sensors provide a regular octagonal convex hull in the horizontal plane with a center element per layer this having nine sensors 23 symmetrically positioned along each of the three planes. Each of eight sensors is positioned at 45-degree azimuthal increments in each plane and the ninth sensor is centrally positioned, i.e., on the central axis of the cylinder.

When the array is emplaced in the earth, the 27 array elements are deployed as nine vertically oriented three element strings 52. Each of the three sensors 23 in each string 52 is connected through a common sensor cable 53 for electrical connection between each sensor 23 and a collocated discrete digitizing unit, also referred to as a digitizer 54.

In this example embodiment, the array element spacing along the circumference is ~1.5 m for a radius of 2 meters and a horizontal aperture of 4 meters. The distance between layers may be set by the design frequency. For a phase velocity of 800 m/s, the design frequency $f_d$≈260 Hz, and the design wavelength is ~3 meters, and the total number of elements in the array is the number of layers $\mathcal{N}$ *9. For a three-layer array then, the spacing of the layers would be 1.5 meters for a vertical aperture of 3 meters, and the aspect ratio would be 3:4 or 0.75.

With a large number of array elements, it is possible to have multiple sensor-to-sensor spacings, i.e., multiple design frequencies, thereby increasing performance at multiple vibrational frequencies or across a broader frequency range. For the given example embodiment, it may also be appropriate for the spacing between horizontal layers of sensors in the array to be 2 meters, corresponding to a vertical aperture of 4 meters for a three-layer design, and a design frequency of ~200 Hz and an aspect ratio of 4:4 or 1.0.

Figure 6B:
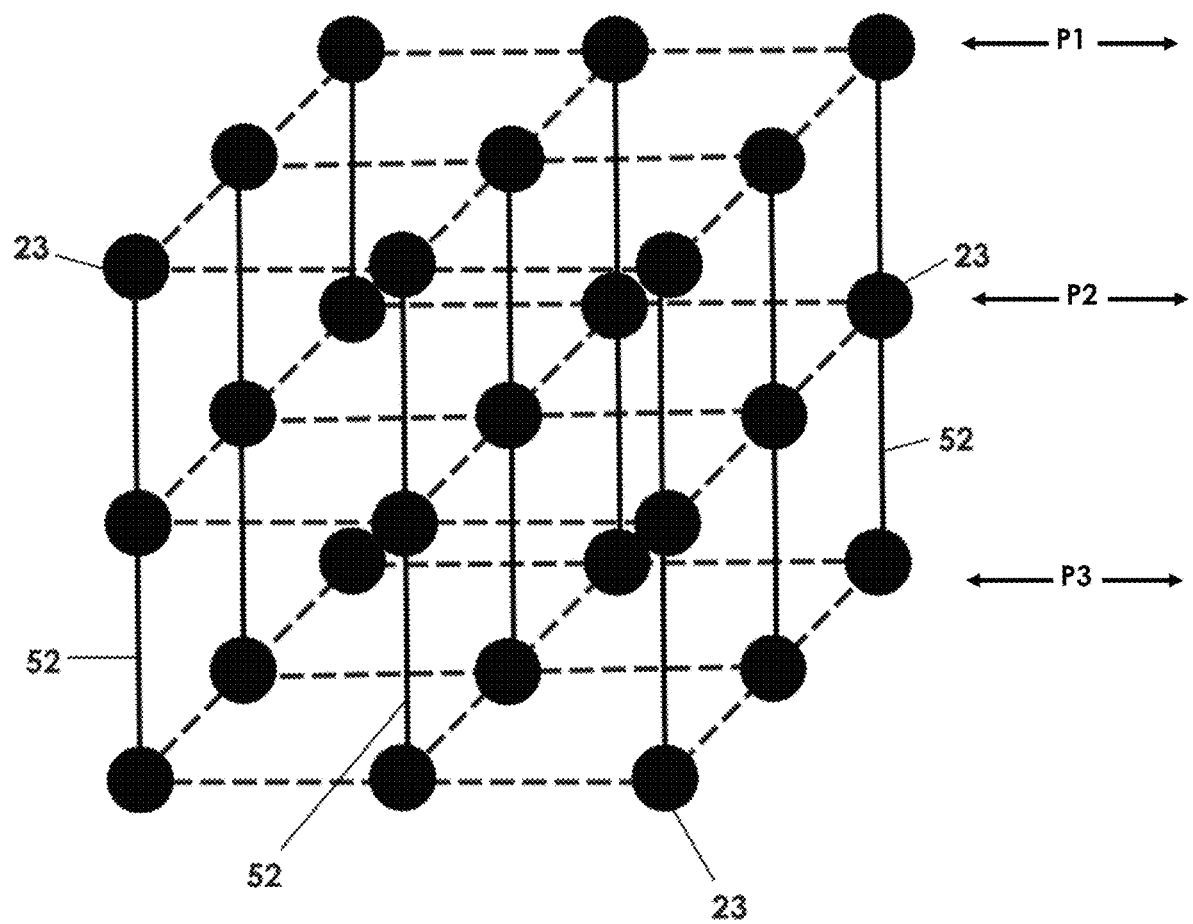

Still other applications may dictate a wider aperture, e.g., a radius of ~6.5 meters, and multiple design frequencies of ~80 Hz and ~300 Hz that dictate element spacings of 5 meters and 1.3 meters, and additional elements in order to meet angular resolution and SNR gain requirements. FIG. 6B illustrates an array of 27 spaced-apart array elements 23 arranged in the form of a cubic lattice configuration comprising three spaced-apart horizontal planes P1, P2 and P3 of array elements, each horizontal plane comprising nine elements, with each element in each plane vertically aligned with one element in each of the two other planes. The 27 spaced-apart array elements are also arranged in three spaced-apart vertical planes, each vertical plane comprising nine elements, with each element in each plane horizontally aligned with one element in each of the two other planes.

Figure 6C:
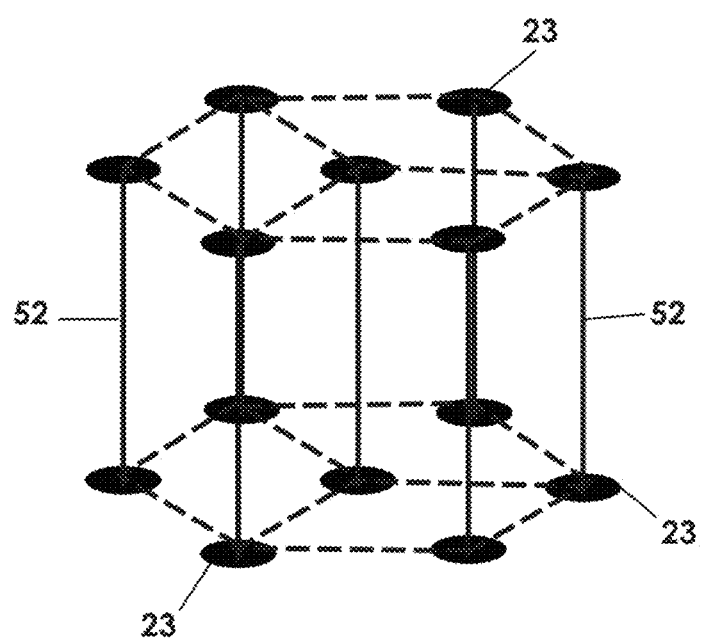

FIG. 6C illustrates an array of 14 spaced-apart array elements 23 arranged in a regular hexagonal prism configuration, shown as a uniform cylindrical array with two axially positioned elements. Arrays according to this embodiment have a minimum of at least two spaced-apart horizontal planes. Such an arrangement can reduce the sensor count, as an economic consideration or an ease of installation consideration, but at the expense of some angular resolution and system sensitivity. Adding a third plane of elements 23 would, in comparison to the embodiment shown in FIG. 6B, bring the sensor count to 21 and provide intermediate performance at intermediate expense and installation effort.

Figures 6D, 6E:
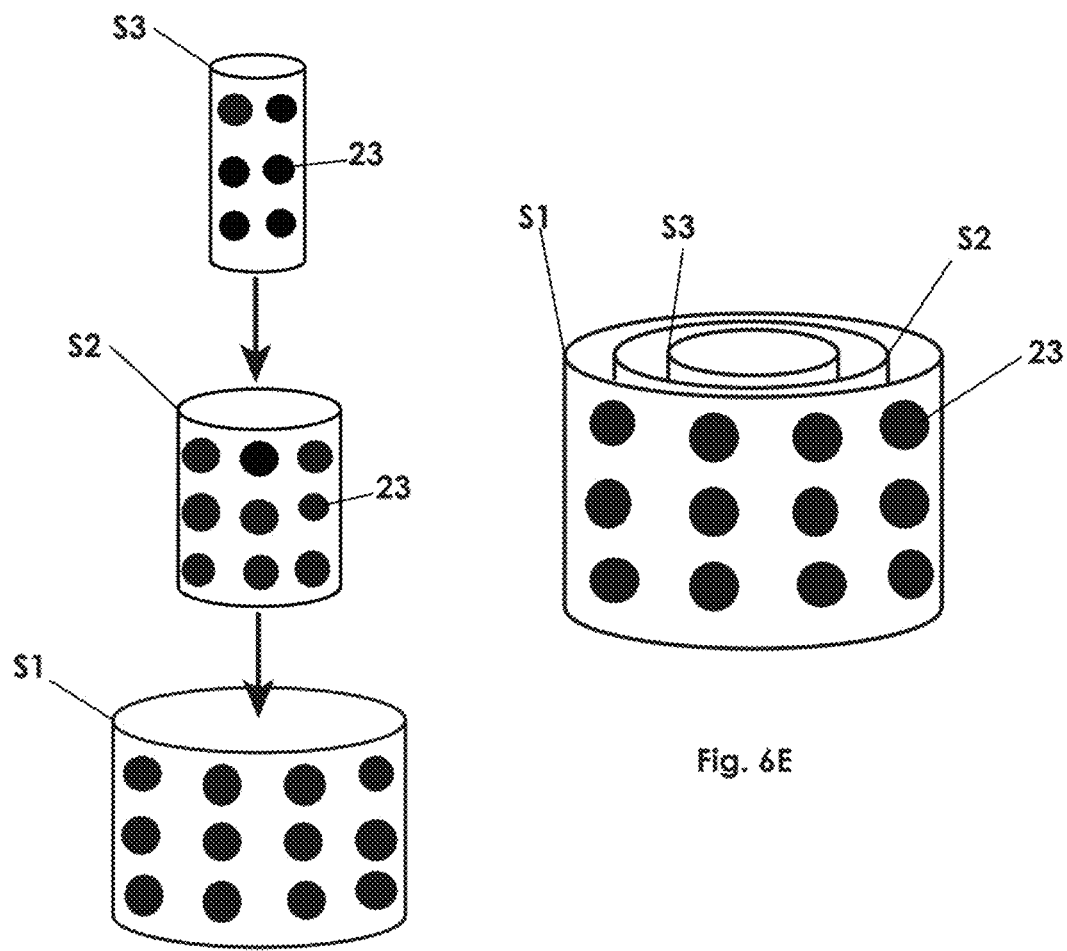

FIGS. 6D and 6E illustrate an embodiment of an array with elements 23 arranged in a concentric pattern of cylindrical shells. FIG. 6D shows three concentric shells S1, S2 and S3 in a spaced-apart (exploded) view while FIG. 6E provides a perspective view of the shells in the concentric arrangement. The vertical connecting cables are not shown. This array may also include an additional sensor string extending along the central cylindrical axis (not shown). The number of array elements deployed in this fashion may vary, according to economic considerations, ease of installation effort, performance, and system computational capacity considerations. In addition, array elements are not necessarily required to be vertically aligned. Such an arrangement would potentially cost more to emplace and may require additional cabling but may provide superior performance depending upon the requirements of the customized system.

Figure 6F:
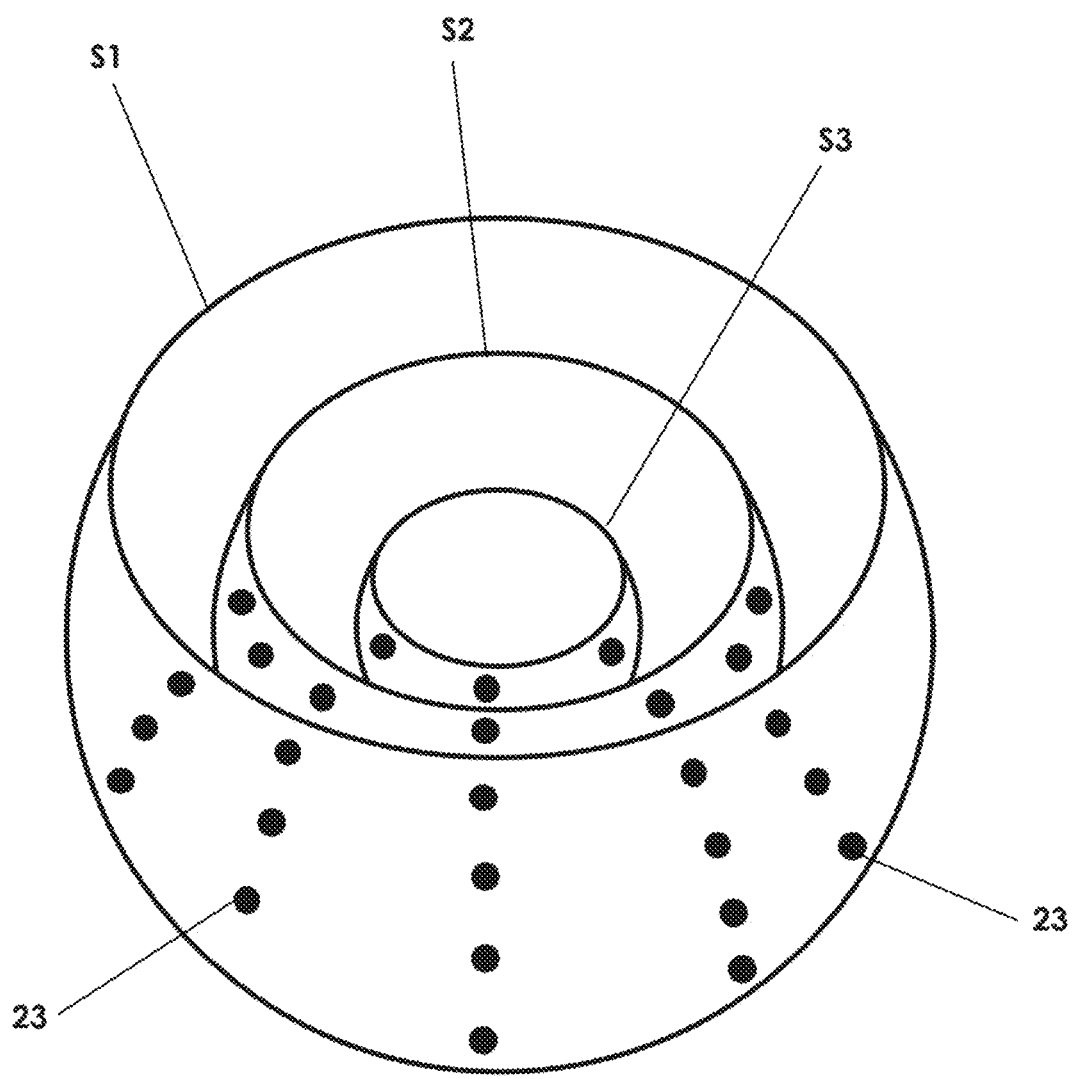

FIG. 6F illustrates yet another array element arrangement for installation. Placement of the array elements in the earth defines a portion of at least one spherical surface and is referred to as a spherical deployment, meaning the placement is along a portion of one or multiple spherical surfaces or shells. The spherical surface portions may advantageously range from a hemispherical segment to a segment extending over a greater solid angle. As in FIGS. 6D and 6E, connecting cables are not shown. The number of array elements deployed along one or more spherical surfaces may vary, according to economic considerations, ease of installation effort, performance, and system computational capacity considerations.

One advantage of a spherical deployment is that the specific aperture is uniform for all angles of arrival. A disadvantage is that, due to the increased number of boreholes required for array sensor installation, the installation process for a spherical deployment is slower, more complex, and more expensive. As in the previous example, there is no requirement that sensors be vertically aligned, but the stated disadvantages would be amplified for such a deployment. In addition to providing a plurality of concentrically positioned shells, another embodiment provides a surface shape in the form of a downward pointing paraboloid (not shown).

While FIG. 6 illustrate several possible symmetric geometries the array shapes need not follow along surfaces of regular contours. For instance, the illustrated cylindrical geometries of FIG. 6E are a vertical stacking of uniform circular arrays along cylindrical planes. However, the elements of the arrays need not be directly (i.e., vertically) above or below each other. There may be a relative rotation between the two-dimensional multiple uniform circular arrays, or only part of a cylindrical shape may be populated The array elements may also be arranged resembling a cubic-close-pack or hexagonal-close-pack lattice.

The spatial arrangements are not limited to regular three-dimensional shapes or lattices. Array geometries can be tailored to specific monitoring problems and site restrictions. However, for all cases the array must conform to a compact polytope in order for a Network Segment consisting of a plurality of arrays to have largely directionally uniform performance. For implementations of these varied geometries, accurate location determination of objects may require that sensor locations be known with accuracies to within a few centimeters, e.g., relative to an array centroid.

A process for determining the spacing between center points in sensor arrays 22 within the same Network segment is based on the ability to locate a detectable source within the monitored volume V and a chosen level of tolerance to the risk of failure of sensor elements in an array 22 within the same Network Segment 12. In an environment of high ambient noise, it may be desirable to ensure a detection range of a defined minimum signal strength at at least 100 meters from a sensor array, e.g., for an electromechanical source that imparts 1 kW of energy into the ground, in order to detect the source signal with a performance margin equivalent to a SNR of 5 dB. To locate such a signal, sourced from, for example, an 80 meter depth and using a minimum of two arrays, the maximum center-to-center array spacing can be no greater than ~120 meters, determined using simple right triangle geometry and using the formula derived in the next paragraph.

Figure 14:
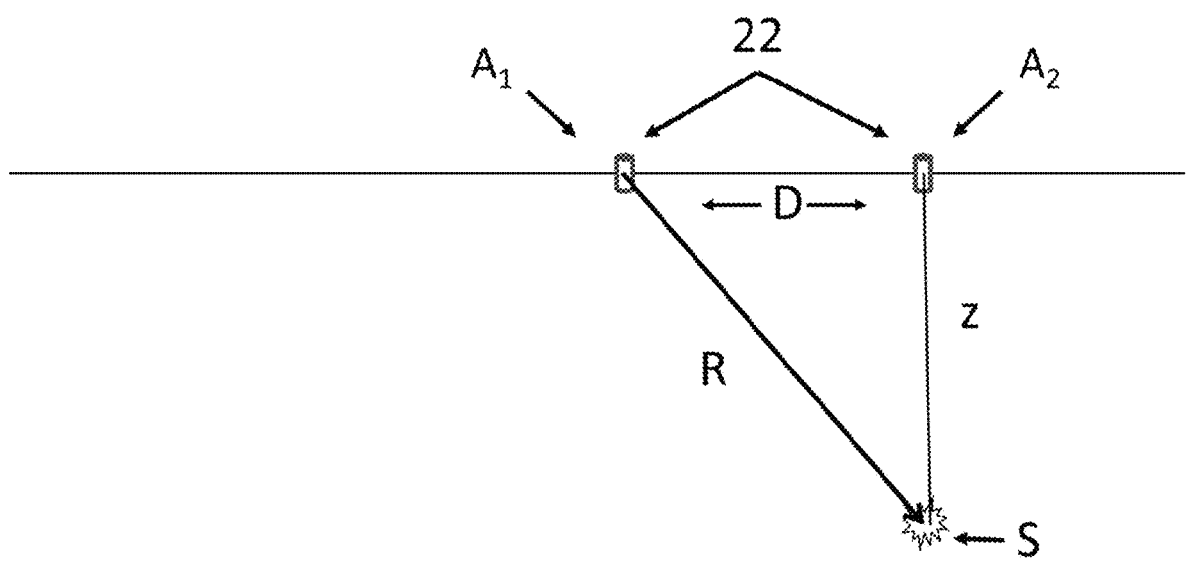
FIG. 14 illustrates an array spacing determination to ensure adequate coverage of the volume of earth being monitored by a series of arrays.

A methodology for calculating a more complete coverage within the monitoring volume V, between two arrays $A_1$ and $A_2$ is illustrated with reference to FIG. 14. Based on the energy emitted by a source, S, each array of plural sensor elements has a range of sensitivity, R, within which signals of interest from the source can be detected classified, located, and tracked. Determinations of source location requires fusion of data received during the same period from at least two sensor arrays 22 by the Aggregator Subsystem 24, Suitable array spacing, D, may be determined based on selection of a maximum source depth, z, directly below a sensor array, at which a signal of interest can be detected, classified, located, and tracked. The range, R, defines a spherical shape in the earth centered about each array, as shown for array $A_1$ in this example. See FIG. 14 which illustrates R, D, and z along a vertical plane passing through the two arrays, with R being the hypotenuse of a right triangle.

The spacing between the two arrays is then $D=(R^2-z^2)^{1/2}$. If the arrays have an effective range, R, of 100 m, and a sensitivity requirement to detect, classify, locate, and track sources of interest at z=80 m directly below each array, the array spacing, D, is limited to 60 m. When additional arrays are added to the Network Segment 12, for instance to the left and right of $A_1$ and $A_2$ at that same spacing, D, the dual array coverage to that same maximum source, depth, z, beneath each array will continue. Deeper dual coverage exists along the line between the two arrays due to the spherical nature of the sensitivity ranges. Because there is a risk that one array within a Network Segment may become non-functioning at some point during the lifetime of the System 10, it may be preferred to assure a greater overlapping coverage within the Network Segment 12 to avoid a complete gap in coverage upon the loss of one array. For example, an array spacing of ~50 meters, instead of 60 m may be chosen in order for the system to continue to perform but at a slightly degraded level of capability when one array is not fully functioning.

The Data Acquisition (DAQ) Subsystem 16 processes data for the $\mathfrak{R}=\{n+(\alpha+n)+(\beta+n)\}$ sensor arrays 22 in the first of N Network Segments 12 of each Sensor Subsystem 14. The illustrated data acquisition system operates with sensors which are point-transducers that respond to sensed seismic vibrations with an analog voltage proportional to amplitude of the sensed vibration signals. Components, e.g., the digitizers, are distributed throughout the deployed subsystem to reduce risk of system failure.

Figure 8A:
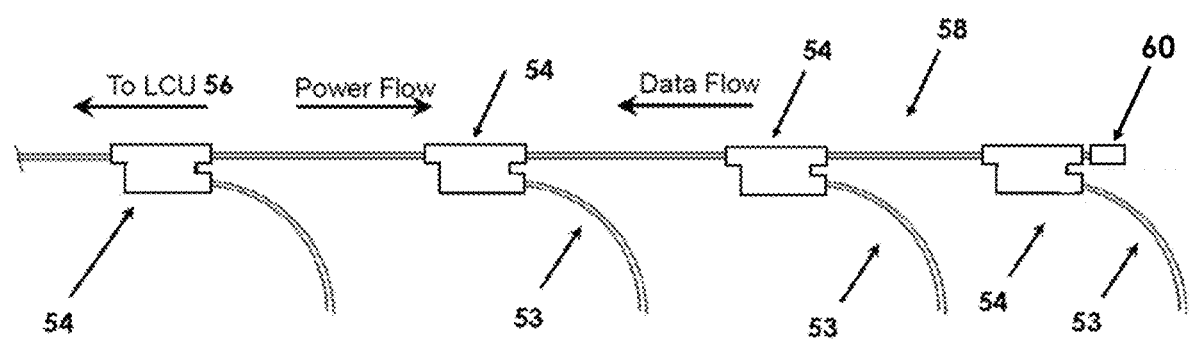
FIGS. 8A and 8B illustrate features of array and digitizer configurations with FIG. 8A showing an exemplary wiring diagram for digitizers between a Local Control Unit (LCU) and sensor cables, and FIG. 8B illustrating how up to five sensor arrays may be configured for connection to one LCU.
Figure 8B:
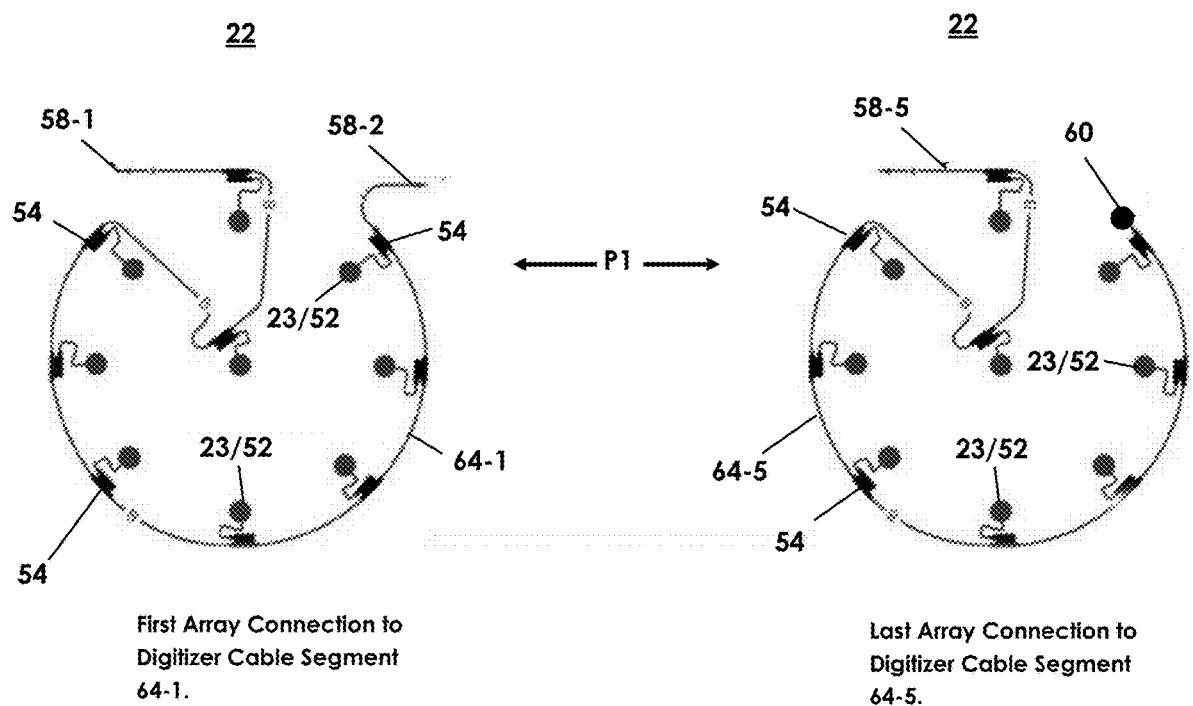

Referring to the partial schematic view of FIGS. 8A and 8B, in an example applicable to the sensor array embodiment of FIG. 6A, nine discrete digitizer units 54 are each connected in one string 52 via cable 53 and an LCU 56. A terminating device 60 is connected to the last one of the nine discrete digitizing units. The digitizing units are configured to handle all data channels from one string of array elements. For example, for a three-element string, if there is only a single channel sensor at each array element, then the digitizing unit is configured to service three channels.

However, if there are four array elements per string, each element consisting of a single channel sensor, then the digitizer unit is configured to service four channels. Moreover, if there are three-component sensors located at each array element in a three-element string, each sensor providing three channels of output, then the digitizer unit is configured to service nine channels. The requirements of the sensor deployment dictate the number of independent channels, which may be customized for each sensor array and the total number of sensor arrays. Accordingly, the design of each data acquisition subsystem is flexible and can be readily scaled to the design and number of sensor arrays.

FIG. 8B provides a partial plan view of the sensor array of FIG. 6A showing the afore-mentioned nine digitizers 54 positioned at the surface, with the nine digitizers 54 connected to process data from the twenty-seven array elements and transmit the digitized data to one LCU 56. For this illustration, each array element consists of a single channel sensor. The one LCU is dedicated to support data processing, and transfer data received from, the n×27 array elements 23 in the first n sensor arrays on the main cable 58. Within a single Network Segment then, there may be an arbitrary number of LCU's, the sum total being denoted as $\mathfrak{B}$.

Each of the nine digitizers is also connected via a Main Cable 58 to transmit n×27 streams of digitized sensor signal data to one of the LCU's 56 in the Network Segment 12. Among other functions, the LCU's 56 support timing and control functions for movement of data between the digitizers 54 and the DAQ server 38. As more fully described herein, FIG. 3A illustrates a configuration comprising $\mathfrak{B}$ LCU's 56, where data streams from array elements in the total of $\mathfrak{R}$ sensor arrays 22 are processed in groups of n sensor arrays for digital conversion and input through one of the $\mathfrak{B}$ LCU's 56 prior to input to the DAQ server 38.

Operation of array elements 23 functioning as point-sensors, may be based on interferometric principles using a data acquisition methods centralized around a laser light source, a photo-transducer, and computational platforms that output a stream of digital data proportional to the amplitude of the sensed vibrations. In such cases the DAQ subsystem is wholly contained within the centralized hardware platform instead of distributed throughout the Network Segment, and the LCU is eliminated as redundant hardware. Such optical systems can contribute to system risk management by limiting electronic components deployed outside of a central facility.

Point sensors which are not optically based may have discrete hardware and software components positioned close to individual groups of sensors 23 to condition and convert the analog sensor signals into time-tagged digital data streams for real-time-processing by the Array Server Subsystem of the Network Segment 12, Generally, frames of digitized signal data and required metadata are formatted and temporarily stored on the Array Server computational platform 40 or on the Aggregator Server computational platform 42.

Figure 7:
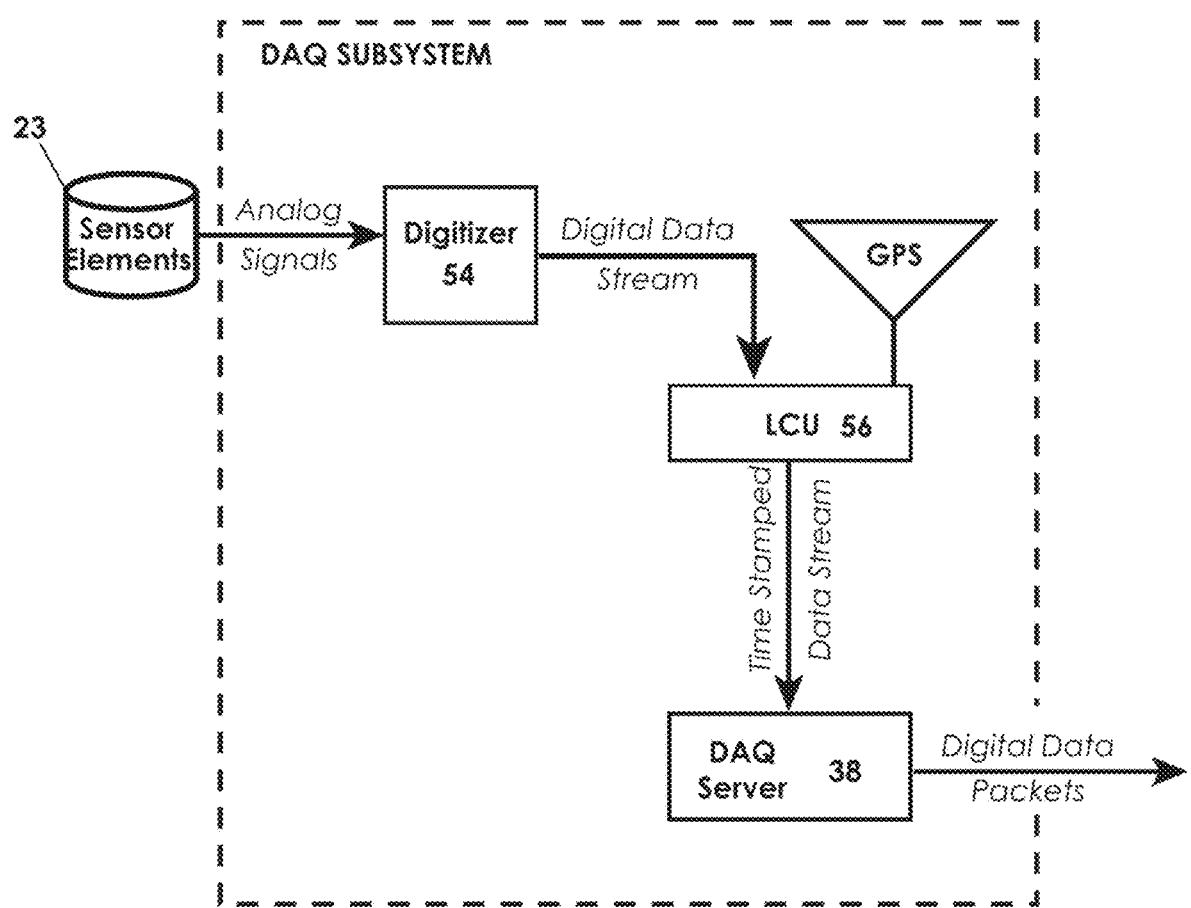
FIG. 7 illustrates details of the DAQ Subsystem of the disclosed System.

Referring to FIGS. 7 and 8, an embodiment of the DAQ Subsystem 16 is shown which receives signals from electromechanical sensors and which provides the functionalities for multi-channel digitizing in a local, i.e., distributed, manner, performing analog to digital (A/D) conversions with hardware positioned at or local to the acquiring sensors groups, e.g., within 25 meters of each array element 23. In the exemplary configuration the digitizing function is implemented with nine discrete, spaced-apart, multi-channel digitizers 54, each co-located with a subgroup of three array elements 23 to simultaneously receive all analog signals generated from the three array elements. Other multi-channel configurations are contemplated.

Figure 5A:
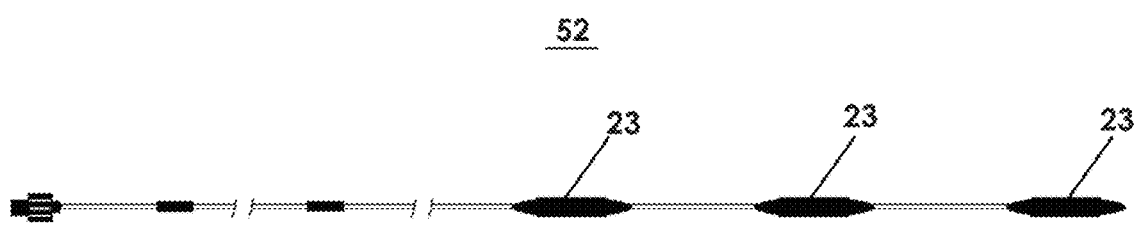
FIG. 5A-5C illustrate features associated with strings of sensors and Built-In-Test sources associated with embodiments of the System.
Figure 5B:
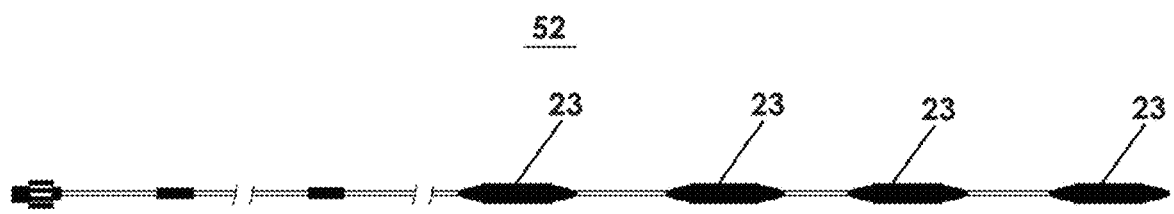

Given a plurality of emplaced $\mathfrak{R}\times 27$ array elements in each of the N Network Segments 12, a plurality of digitizer units are coupled to digitize signals from all $\mathfrak{R}\times 27$ array elements. In this example, with each sensor array 22, having 27 sensors (see FIGS. 6a and 8), nine discrete three-channel digitizers 54 are connected to convert 27 channels of analog signals from nine strings 52, each string 52 comprising three of the array elements 23 comprised of single-channel sensors as shown in FIG. 5A. FIG. 5B illustrates a string 52 comprising four array elements for use with a higher channel count version of the digitizer 54. Each DAQ Subsystem 16 is scalable and may include as few as only one LCU 56 per Network Segment 12 to receive analog signals from multiple emplaced arrays 22 of sensors. The example embodiment of the DAQ Subsystem 16:

a) receives the analog signals from the sensors,
b) converts the analog signals into a digital data stream
c) packages the digital data streams into frames of digital data,
d) provides timing and control of the digital data,
e) formats and time stamps frames of the digital data,
f) outputs the digital data to the DAQ Server 38 for processing,
g) logs the processed data for long-term storage,
h) and hosts built-in-test digital components.

In this example, each analog sensor channel is connected to dedicated and local digitizing circuitry (e.g., in a digitizer 54) and an electronic communications sub-assembly connecting the digitizing circuitry via cabling to provide parallel signal communication paths to the associated LCU 56. Again referring to the connection arrangement shown in FIG. 8, groups of the sensor arrays in the same Network Segment 12 are shown connected to one LCU 56 to transmit continuous digital data streams from multiple digitizers 54 to the LCU. Advantageously, each of the exemplary digitizer units 54 is positioned relatively close to the elements 23 in the sensor array 22 from which analog data is received, e.g., located in or about the same volume of earth material as the array elements providing the analog data for digital conversion. In the disclosed embodiments each digitizer 54 houses the dedicated electronic digitization assemblies required for parallel processing of the separate analog channels. An electronic communications sub-assembly, part of the digitizer cable segment, connects outputs from the digitizers 54 to the LCU.

FIGS. 5A, 8A and 8B collectively illustrate details associated with the array element strings 52, digitizer units 54, digitizer cable segments 64 and cabling associated with an LCU. FIG. 8B provides configuration details for the multiple sensor arrays 22 and digitizers 54 powered through the one LCU 56 which receives data from the associated array elements and digitizers. In this illustration, the array elements are single-channel sensors. According to the illustrated design, each LCU 56 shown in the figures can accommodate up to eight digitizer cable segments 64. Groups of the sensor arrays in the same Network Segment 12 are connected to one LCU via the digitizer cable segments 64. Each digitizer cable segment 64 can provide digitized sensor data for up to five sensor arrays 22, with the LCU capable of receiving data from as many as eight digitizer cable segments 64 thereby supporting up to 40 sensor arrays 22.

In the illustration of FIG. 8B, each digitizer 54 performs an A/D conversion on analog seismic data from up to three individual sensors in a string 52. In FIG. 8A, a portion of a digitizer cable segment 64 is illustrated, showing the last four digitizers 54 in the last of the five sensor arrays 22 for which sensor data is processed by a first LCU 56 identified in FIG. 3A as LCU 1. Each Digitizer (a) connects to the main cable (b) for its operating power and connects via a sensor cable (c) to a multiplicity of sensors, typically three, as shown in FIG. 5, to input their analog sensed seismic signals. The digitizer continuously digitizes the analog signals, and outputs the digital streams to the LCU.

As indicated in the partial view of FIG. 8B, showing connections among the first five sensor arrays in the $1^{st}$ Network Segment (shown in FIG. 3A), a first segment of the main cable 58 extends from the LCU 1 to the first of the five designated sensor arrays 22. The main cable 58 connects to the first in the series of nine digitizers 54 all of which are connected in serial along a first digitizer cable segment 64. See, for example, FIG. 6A. The nine digitizers associated with the first sensor array 22 support processing of the 27 sensor signals generated by array elements in the first sensor array 22. A first array element string 52, consisting of an exemplary three elements, connects with the first of the nine digitizers 54 associated with the first of the five sensor arrays connected to the first LCU (identified as LCU 1 in FIG. 3A). Similarly, second through ninth sensor strings 52 connect with the second through the ninth digitizers 54 associated with the first of the five sensor arrays. A second segment of the main cable 58-2 connects to receive signals from the second, third, fourth and fifth sensor arrays 22 via third, fourth and fifth segments of the main cable (e.g., segments 58-3, 58-4 and 58-5 and additional digitizer cable segments 64. That is, after connection with all sensors in the first sensor array is complete, the next segment of the main cable 58 is connected between the digitizer cable segment 64-1 and is further connected to the first of nine discrete digitizers 54 associated with the second of up to five sensor arrays. Details of connections to the third, fourth and fifth interim arrays are not illustrated. The final connection, to send data from the fifth sensor array to LCU 1, includes connection between the digitizer cable segment 64-4 of the fourth sensor array and a fifth segment 58-5 of the main cable 58 which fifth segment connects to a fifth digitizer cable segment 64-5 also having an exemplary nine multichannel digitizers 54 connected to receive multi-channel analog seismic data from nine three-channel sensor strings in a manner as described in conjunction with the description provided for the first digitizer cable segment 64-1. The termination plug 60 is shown attached next to the last in the last series of nine digitizers 54 to complete the electrical connections of the overall cable wiring with the main cable 58. The last nine digitizers 54 are connected along a last digitizer cable segment 64-5.

The afore described cabling for LCU 1 is exemplary of that which can be configured for all LCU's 56 in the DAQ subsystem 16 of FIG. 3, with the remaining 7 LCU input/output connections providing capability to support up to a total of 40 arrays. The wiring scheme of the digitizer configuration allows for two separate power circuits and two separate telemetry paths. All cables and connectors may be watertight and engineered to withstand ocean conditions.

Each LCU 56 time stamps the digital seismic data received from the digitizers 54, packetizes the data and transfers the digital data as a stream to the DAQ Server 38. The LCU's also provide power and timing control signals to the digitizer 54. The LCU clock may be synchronized with a GPS receiver time signal such that the timing will experience minimal drift and have at least a precision down to 1 part in $10^6$.

Noting that each LCU services multiple arrays, there may be one or several LCUs in each Network-Segment 12. The DAQ Server 38 functions as the computational hardware platform for hosted DAQ Server Application software which receives and converts data streams received from multiple LCUs to the standard Society of Exploration Geophysicist D (SEG-D) format, and logs that data to data storage hardware for long term storage, and then forwards continuous streams of the packetized digital data to data analysis and processing components in Array Processor Application instances described in FIG. 3 as running on hardware in the Array Server Subsystem 18.

Physical components of the DAQ Server 38 are centrally located to provide (i) all support to receive the data streams from LCUs, (ii) provide for physical storage of the data, and (iii) operate communications channels for forwarding data to the Array Server. A single DAQ Server provides all of the above-described services for the Network Segment.

The Array Server Subsystem 18 receives time-stamped digital data from the DAQ Subsystem 16 from all arrays in the Network Segment 12, applies all single-array signal and information processing pipeline components, enters results into the database resident on the data storage hardware units (e.g., the Enterprise Database of FIG. 3, part of the Infrastructure Subsystem), and forwards results to the Aggregator Subsystem. The Array Server Subsystem 18 includes the Array Server computational platform (hardware) which hosts Array Server instances that execute and control the Array Processor Application 21 as illustrated in FIG. 3A, and the State-of-Health Subsystem 46. The Array Server instances, one through β+n, execute the Array Processor Application which performs all of the computations for the algorithms applied to a single array. The Array Server computational platform provides all services to receive the data streams provided by the DAQ Server Application, the computational processors, and the communications channels for routing of the data.

A middle layer of software considered intrinsic to the Array Server Subsystem is called the Array Services Middleware, or just the Middleware. For the most part the Middleware is a passthrough for receiving the stream from the DAQ Server and redistributing the contained data into separate channel streams for the dedicated Array Server instances. The Middleware (i) receives the continuous digital data streams from the DAQ Server Application, (ii) repackages the data, (iii) organizes the continuous digital data streams into independent channels in virtual arrays, and (iv) distributes the repackaged data to the multiple Array Server instances. The continuous digital time series of processed data is formatted into data frames of defined time duration prior to streaming through the Array Processor Application.

Figure 2:
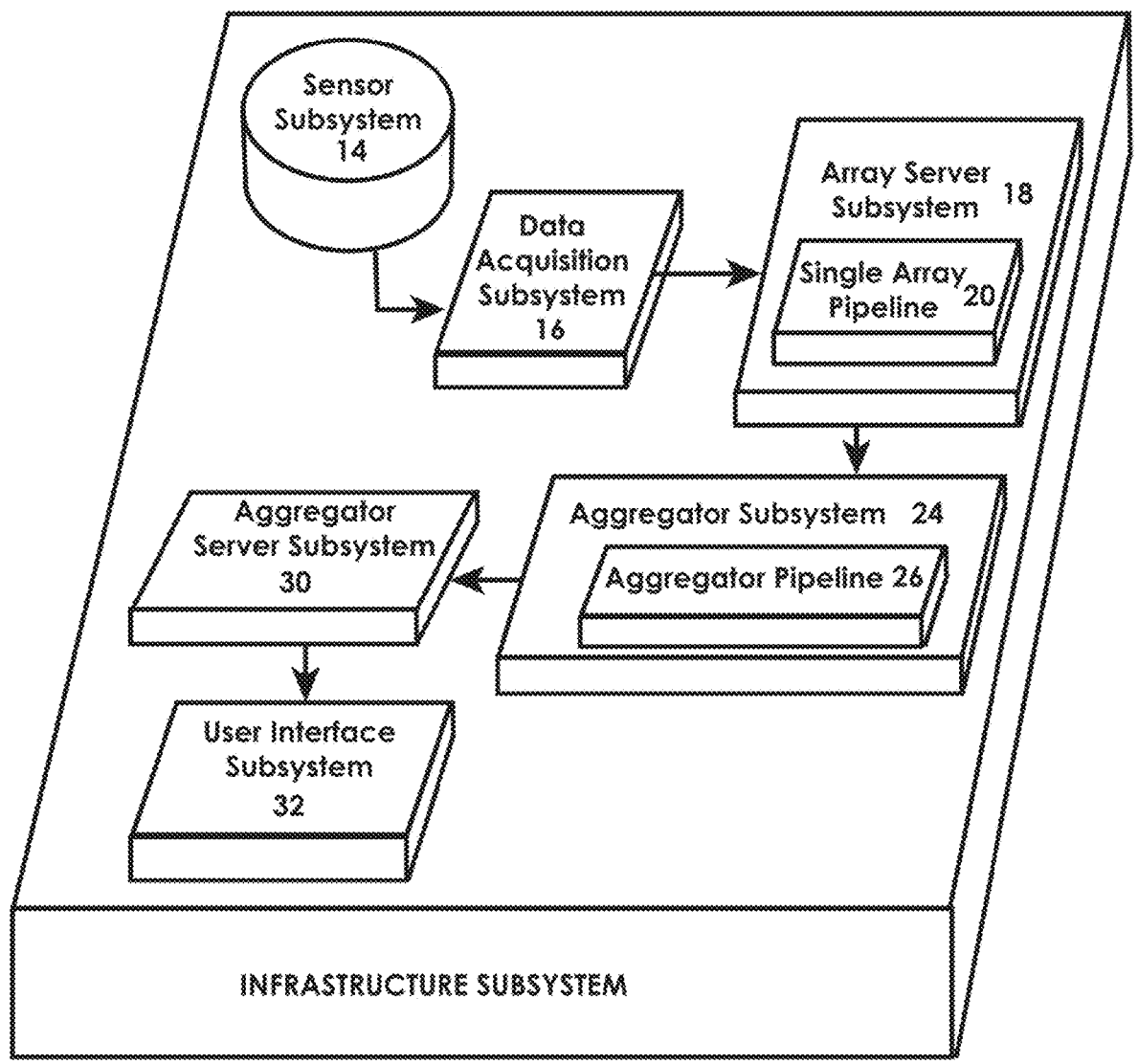
FIG. 2 is a functional block diagram of the System.
Figure 9:
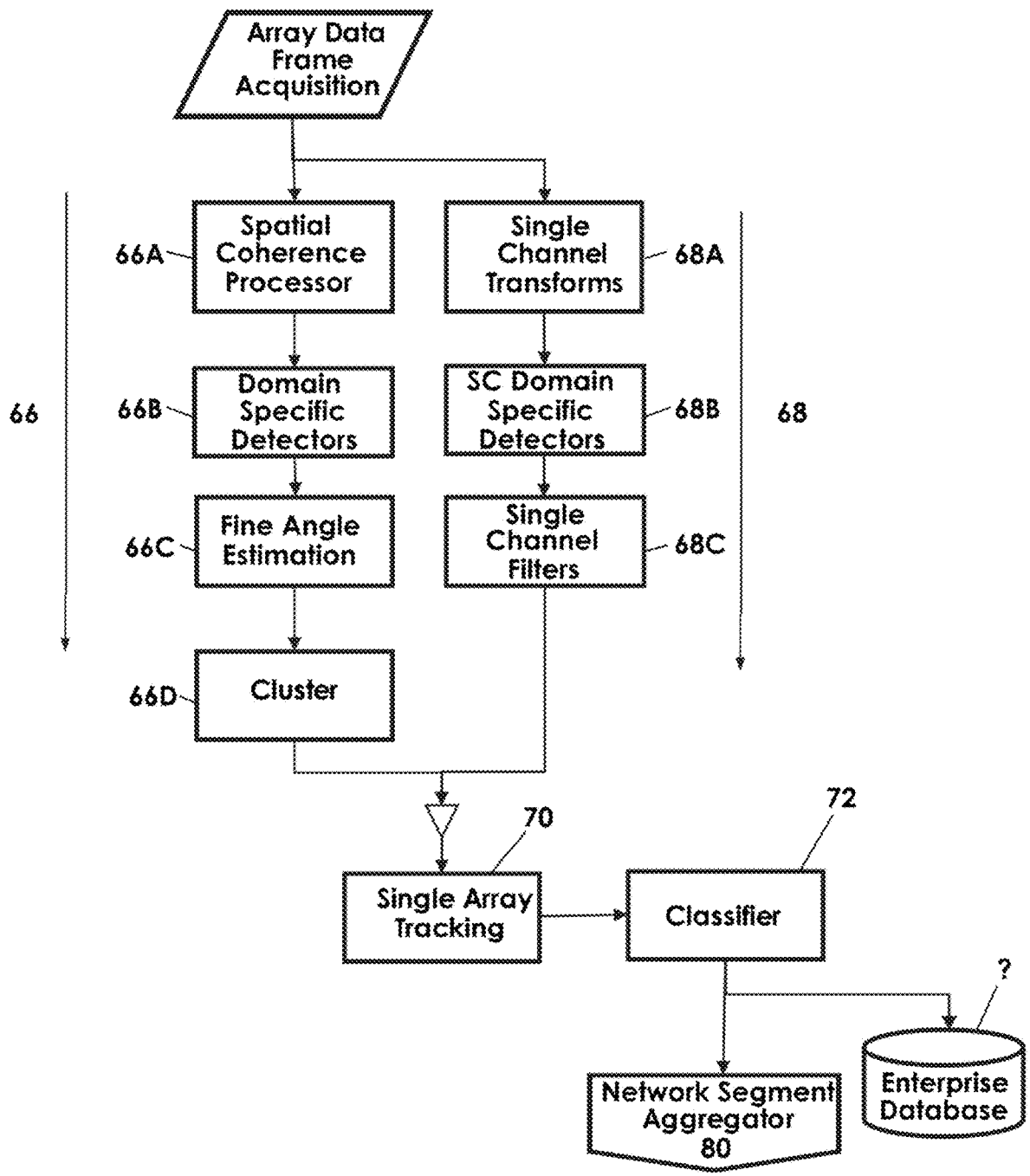
FIG. 9 is a functional flow for an Array Processor Application.

At the single array level, instances of the Array Processor Application (APA) 20, referred to in FIG. 2 as the Single Array Pipeline 20, are illustrated in FIG. 9, beginning with formatting of frames of array element data by the DAQ Subsystem 16. The APA 20 detects, classifies, and "tracks" signals of interest (SOI) in terms of characteristics versus time, over multiple data frames acquired by multiple array elements in one sensor array 22, and outputs the detections and accumulated information to a Network Segment Aggregator 80 for further processing. With reference to the functional block diagram of FIG. 3A, there are shown a plurality of APA Instances 20 in the Array Server Subsystem 18 of a first Network Segment 12. Instances of the APA 20 shown in FIG. 3A for the first Network Segment simultaneously and independently process the seismic data acquired by respective allocated sensor arrays 22. Generally, then, for each of the N Network Segments 12, a plurality of APA Instances 20 process seismic data acquired by the sensor arrays 22 in that Network Segment 12, in a like manner as that applied for processing the seismic data acquired within the first Network Segment.

Initial APA signal processing operations are performed in first and second parallel processing segments referred to as a Beamforming Signal Path 66 and a Single Sensor Data Path 68. An objective of the Beamforming Signal Path 66 is a determination of an angle of arrival (AOA) for a signal of interest (SOI) based, in part, on the coherence of signals acquired from multiple array elements within the common sensor array. The Single Sensor Data Path 68 processes data simultaneously with the Beamforming Signal Path 66 but based on seismic data from individual array elements without the application of information based on coherence of data acquired from a plurality of array elements 23. The outputs from these signal processing steps constitute information in the form of detected signal objects, or simply detection objects. Outputs from these processing paths 66, 68, are forwarded to the next processing step, Single Array Tracking.

In the Beamforming Signal Path 66, spatial coherence processor 66A initially operates on data frames to perform beamforming operations. Each beamforming operation creates a large number of discrete "beams" each of whose axis corresponds to specified angles for azimuth and dip with respect to a spherical coordinate system referenced to the geometric center point of the array 28, and a specified slowness (reciprocal velocity) value. The beams are a series of constructs derived from the continuous signals acquired by the array elements, each beam aligned along an axis extending between the center point of the sensor array 28 along a potential angle of arrival of seismic plane waves corresponding to that of a potential energy source. Details of the beamforming procedure are addressed in the Spatial Coherence Signal Processor (Beamforming) discussion which follows. See equations (1) through (23).

Each beam is defined methodically and automatically with a unique axis specified with parameters azimuth angle, dip angle, and slowness value. Each beam preferentially collects and enhances the seismic signals impinging upon the array with plane-wave fronts perpendicular to the axis defined by the beam axis azimuth angle, dip angle and the specified slowness. Because the actual slowness depends on numerous environmental parameters, as well as on the seismic wave type, e.g., a p-wave or an s-wave or Rayleigh wave, slowness is treated as a variable to enable determination of the most-correct beam values. In one embodiment, the seismic signal inputs for each data frame are phase shifted in the frequency domain to values that align the signals with a hypothetical wavefront arriving along the specified beam axis. The phase shift is determined corresponding to a time shift calculation of the delay of a plane wave arriving along the specified azimuth angle and dip angle for the specified slowness for the spatially distributed array elements. A summed signal value is associated with each set of beam parameters.

The beamforming output, consisting of the complete set of summed values for each set of azimuth angle, dip angle and slowness, s, for the current data frame is then passed to algorithms for Domain Specific Detection 66B where each beam result is interrogated. Those results meeting, for example, significant amplitude criteria, may be considered "detected signals of interest." Detection can occur in the time domain or in the frequency domain, depending on the nature of the seismic signal, and multiple detection algorithms can operate in either domain in parallel. Time and Frequency Domain Detection are described in detail in respective sections of the Detailed Description, accompanied by equations (24) through (26) and (27) through (38) respectively.

These "detected signals of interest" and their associated beam angle information are then processed to provide refined angular information in the Fine Angle Estimation stage 66C. The Fine Angle Estimation stage applies a weighted interpolation procedure for detected signals of interest having similar beam directions to determine the best averaged beam direction as a refined estimated signal AOA.

Next, the Clustering stage 66D groups the "detected signals of interest" based on multi-dimensional distance metrics to identify detections that are related in time, frequency, slowness, or space. Those in the set which do not meet criteria are discarded, or grouped together to form a different, separate information object. All clustered results are forwarded to the Single Array Tracking step 70.

Though not used for beamforming-based array applications, the second signal path of the APA, the Single Sensor Data Path 68, operates in parallel with the Beamforming Signal Path 66 to process sensor data individually. The digitized data is first transformed in a Single Channel Transforms stage 68A, using a Fourier transform or one or more other appropriate transforms to derive additional series that highlight one aspect or another of the signals of interest.

Examples of other appropriate transforms that may be applied in either processing Paths include the Hilbert transform, the series representing the RMS power over a moving window much shorter in duration than the data frame, the series representing an estimated point-by-point signal-to-noise ratio (SNR), the series representing the value of the Akaike Information Criterion, the series representing the result of cross-correlation of a known signal or pattern with the time series, the series representing moments or cumulants of the time series, band-pass filtered data, and band-reject filtered data. A large library of potentially valuable transforms drawn from well-known statistical signal processing approaches exists.

A Single Channel (SC) Domain Specific Detector stage 68B then evaluates each frame of data associated with each sensor for analyzable content, with similar operations as those performed on the beamformed data, but using different operational parameter sets to detect signals of interest. Time and Frequency Domain Detection are described in detail in respective sections of the Detailed Description, accompanied by equations (24) through (26) and (27) through (38) respectively. Detected content is forwarded to a Single Channel Filters stage 68C, where detection objects with undesired attributes can be filtered out such as low SNR detections or those with inconsistent information. The data completing this signal path are forwarded to the Single Array Tracking step 70.

Outputs from both the beam-based segment and the single-channel segment proceed to multi cycle processing in the Single Array Tracking Stage, where multi-cycle processing begins with associating detections within the multidimensional space of suitable extracted attributes as a function of time, and multiple detections of the single-array detection objects are "tracked," and where the attributes of the multi-cycle objects then aid in the following Classifier stage 72. As used here, the term "tracked" indicates the determination of the behavior of any particular signal attribute as a function of time using state-space algorithms. Angular direction attributes and frequency attributes are examples of what can be tracked over a time variable. However, the directional attributes are unavailable for the detection objects from the Single Channel stream.

Data descriptive of tracked objects, referred to as Single Array Track objects, are delivered to the single-array Classifier stage 72, where all the accumulated information on detected, relevant signals of interest is analyzed to determine source classes of detected signals, for instance personnel on foot, powered hand tools, or engine operation. All the information associated with the classification is stored in an Enterprise Database 74 and forwarded to the Aggregator Subsystem 24 for further processing by instances of a Network Segment Aggregator 80 and with data and information the Aggregator receives from other APA Instances 20 controlled by the same Array Server Subsystem 18.

The foregoing summary on single array pipeline processing is now followed by a more detailed explanation of operations of one embodiment of the System 10, it being recognized that the invention is not limited to any disclosed embodiments. As noted, the Array Processor Application (APA) 21 referred to as a single array processing pipeline, is restricted to processing the digitized signals and derived information obtained from a single sensor array. As illustrated in FIG. 9, the APA performs the following operations:

Signal conditioning,
Spatial-coherence signal processing (i.e., Beamforming) and data transforms,
Single channel transforms
Time domain detection of potential SOI's,
Frequency domain detection of potential SOI's,
Single channel domain specific detectors
Fine Angle Estimation of detections consisting of potential SOIs,
Single channel filters
Cluster and feature extraction,
Single Array Tracking, and
Classification.

The APA 21 applies this information to output directional event information and alphanumeric information for events that have a positive classification. The operations of the APA single array pipeline are divided into the two parallel software flows: beam forming signal path 66 and single sensor data path 68 illustrated in FIG. 9 where each component flow builds upon results of the previous process stages. The Beam Forming Signal Path 66 applies "spatial coherence processing" (further explained herein) operating on a plurality, e.g., all channels in a single sensor array 22. The Single Sensor Data Path 68 operates only on single channels of data received from individual sensors 23, independent of data or temporal information present in any other channel.

Referring again to FIG. 9, a general architecture of the processing pipelines suitable for each APA single array processing pipeline comprises a series of serial and parallel stages where each stage builds upon the signal and information derived from previous processing stages. Although embodiments of the pipeline may place processing stages in a serial sequence, some stages may be implemented with parallel processing. Various other combinations of serial and parallel processing will be apparent to persons of ordinary skill. As illustrated and afore described, an exemplary processing pipeline generally includes (i) a detection stage, (ii) a fine-angle of arrival estimation stage, (iii) a cluster analysis stage (a.k.a. pattern chaining stage), (iv) a single-array state estimation stage (also referred to as a tracking stage), and (v) a classification stage.

The initial step in the APA 21 involves receipt of acquired data frames and conditioning of data received from DAQ Subsystem 16. The Beam Forming Signal Path 66 applies the Spatial Coherence Processor 66A more generically known as a "beamformer" operation to create a series of discrete "beams" each of whose axis corresponds to specified azimuth angles $\Phi_i$ and dip angles $\theta_i$ with respect to a spherical coordinate system referenced to the geometric center point of the array 28, and a specified slowness (reciprocal velocity) value. The beams are a series of constructs derived from the continuous signals acquired by the array elements, each beam aligned along an axis extending between the center point of the sensor array 28 along a potential angle of arrival of seismic plane waves corresponding to that of a potential energy source.

For the beam derived for each beam main response axis, at least one processing pipeline operates on the data for the detection and classification of signals of interest. One of the objectives of the processing pipelines is the separation of the signals of interest from the uninteresting signals present in the total scene.

The different stages of the flows 66, 68 may share or employ common processes. For example, a Fourier Transform of a data frame occurs only once, and the transformed data is shared by both streams as appropriate. Also, algorithms that work in the time domain or frequency domain may be shared although with different input parameter values. Also, the same algorithms used to determine noise levels on a single channel may be used to determine noise levels on a single beam, although with parameters that are best suited to the expected differences in their respective data inputs, keeping in mind of the goals of their respective processing chains.

For discussion of detectors included in Domain Specific Detectors 66B in the flow 66, and the Single Channel (SC) Domain Specific Detectors 68B in the flow 68 reference is made to description of "Time Domain Detectors" and "Frequency Domain Detectors" which follow.

The signal-of-interest (SOI) detectors of the detection stages 66B, 68B may operate in the time-domain, the frequency domain, and the joint-time-frequency domain, on either a single processing frame or on a more extensive buffer composed of multiple processing frames, but where frame updates and application of one or plural detection processes may be performed during every processing cycle.

The fine-angle estimation stage 66C refines the angle-of-arrival (AOA) provided by the beam axis $B_i$ associated with a SOI for the recognized detections. The cluster analysis in the Clustering stage 66D, sometimes referred to as a pattern chaining stage, can be described as a series of operations performed on a single processing frame to identify particular patterns within the time domain, frequency domain, or joint-time-frequency domain representation of the data.

An example of a state estimation process is a tracker operating over a multi-dimensional, but not necessarily Euclidean, space, taking, for example, the discrete clusters or chains from the previous stage to form a state-based model of the signal attributes in terms of an AOA, a frequency, and other domains. In the illustrated embodiment the final stage of the processing pipeline for single sensor arrays performs classification of the pattern-associated signals of interest into discrete source classes.

The initial step in the Spatial Coherence Signal Processor 66A is to condition the received data, and to then apply a signal processing operation that combines the individual channels to emphasize the spatial coherency of the data streams (generically known as a "beamformer" operation). The term "Spatial" used in this descriptor distinguishes the disclosed technique from other methods designed to take advantage of the coherencies of sinusoidal signals strictly in time without any spatial considerations. The beamformer discussed here assumes plane waves arriving at the array, and sensors spaced such that the coherence between the signals of interest as seen on the separate sensors is very high, while the coherence in the diffuse noise is minimal.

Conventional use of the Spatial Coherence Signal Processor, i. e. beamforming processor, is explained in many publications, including for example Johnson, Don H., and Dan E. Dudgeon (1993) Array Signal Processing: Concepts and Techniques. P T R Prentice Hall, Upper Saddle River.

The goal of beamforming in the System 10 is to determine the AOA at a single array of spaced-apart sensors for point sensors responsive to seismic waves generated by sources of vibrational energy in the environment surrounding a sensor array 22. The beamforming process comprises defining a set of angles with respect to the array reference point and a set of propagation velocities applicable to the media within the array aperture and the applicable phase velocities, and then processing the data from all array elements such that for each defined angle (azimuth and dip) and velocity in the set, the plane waves arriving at the array along that specified angle and propagation velocity are emphasized via coherent processing. The array reference point is, for example, the geometric center point of the sensor array 28. See FIG. 6A and FIG. 10. The beamforming operation acts as a spatial filter for a particular AOA or "look-direction" and velocity. For each data frame, the strengths of signals arriving along the defined discrete set of angles and velocities are enhanced and determined. Therefore, for example, from 27 sensors configured as a uniform cylindrical array, a suite of 600 or more unique beam axes $B_i$ may be generated as a function of azimuth, dip, and velocity.

Because the sensor arrays are emplaced in a fully elastic medium, as opposed to an acoustic medium, the received seismic waves consist of multiple signals from the same source acting at a single point in time: superimposed P waves, S waves, and Rayleigh waves, arriving at the array elements nearly simultaneously. Because different types of seismic waves travel at different velocities, it is important to implement the beamformer using multiple propagation velocities. P-waves travel faster than s-waves, and s-waves travel faster than surface waves. The fact that seismic surface waves are dispersive further complicates the beamforming procedure. All of these waves can propagate to and through the array and are sensed by the array elements.

Continuing with the example of a single array having 27 elements, beamforming hypothesizes the direction from which the plane wave is propagating from an arbitrary source position to the geometric center point of the sensor array 28. The series of discrete beams then are constructs derived from the continuous signals acquired by the array elements, each beam aligned along an axis $B_i$ extending between the center point of the sensor array 28 along a potential angle of arrival (AOA) of seismic plane waves corresponding to that of a potential energy source. This axis of direction can be described in terms of specified azimuth angle $\Phi_i$ and dip angle $\theta_i$ with respect to a spherical coordinate system referenced to the geometric center point of the array 28 (See FIG. 10).

For the beam derived for each beam main response axis $B_i$ (MRA), at least one processing pipeline operates on the data for the detection and classification of signals of interest.

One of the objectives of the processing pipelines is the separation of the signals of interest from the uninteresting signals present in the total scene. The beamforming operation, applied as a spatial filter, may be implemented in the time domain by, for example, applying time delays associated with a hypothetical plane wave impinging upon the sensor array along the specified main response axis and velocity, to the data received in each frame originating from each individual array element, and then summing the data from all array elements to produce a new set of data frames (a delay-and-sum beamformer). This operation is repeated for each defined beam main response axis $B_i$ and velocity.

The beamforming operation takes advantage of the spatial coherence of a plane wave signal from sensor to sensor. In other words, the signals, when appropriately shifted in time or phase, will constructively interfere, i.e. will be coherent, whereas other signals, even plane wave signals arriving from other directions, will destructively interfere. In addition, stochastic signals such as diffuse ambient noise is known to always destructively interfere. In general practice, the beamformer operation is implemented in the frequency domain, where the time delays become phase delays.

Use of beamforming algorithms other than the basic delay-and-sum beamformer are contemplated. Types of beamforming algorithms useful for incorporation in the System 10 include the Conventional Bartlett beamformer, the Minimum Variance Distortionless Response (Capon) beamformer, the Maximum Likelihood beamformer, the Space-Time Adaptive Processing beamformer, and similar algorithms which are not excluded from being implemented with the disclosed System architecture alone or in combination with other algorithms.

In applications of spatial-coherence processing for seismology using planar arrays, the slowness vector is a projection of the velocity vector on a horizontal surface. The prior art passive seismic sensor arrays for the most part have been planar in nature, i.e., along the surface of the Earth. For the frequencies commonly used in such applications for all practical purposes, these arrays can be thought of as horizontal arrays, thereby neglecting small differences in elevation, given the large wavelength and AOA of sensed seismic signals. Thus the projection of the velocity vector onto the essentially plane surface becomes an apparent propagation velocity, and the slowness is the reciprocal of the apparent propagation velocity.

However, for three-dimensional arrays, where three-dimensional spatial-coherence processing is applied, the velocity vector incorporates the true propagation velocity and there is no "apparent" velocity. The slowness is the reciprocal of the actual vector propagation velocity across the array.

The Spatial Coherence Signal Processor 66A performs the following operations:

- Receives data frames defined in the Array Services Middleware
- Upon startup, computes the complex phase delays for each array element with respect to the defined array reference as a function of sensor position, frequency, and the grid point location in slowness space that represents the beam main response axis. These factors are stored and do not need to be recomputed for standard beamform operations, except upon a change in the physical configuration or for more advanced beamforming algorithms.
- Conditions data such that the channels of data from the individual sensors are equalized.
- Transforms data frames from each sensor into the frequency domain using the Discrete Fourier transform. However, other approaches such as the Cosine Transform are also applicable. The result is the frequency domain projection of the time series as complex-valued frequency-domain coefficients.
- Multiplies the vectors of complex valued frequency-domain coefficients by the precalculated phase delays. The result is a set of complex numbers in the frequency domain, as a function of the three components of slowness space.
- Sums and stores the results as frequency domain frames that are the equivalent of a time-domain delay-sum operation. The magnitudes of these numbers squared are the sensed coherent power at that frequency, for each beam. The following is exemplary.

The array processor receives a frame of data which is entered into the array queue of the array server subsystem 18 for processing. Assuming a bandpass signal of the form $$s(t)=\alpha(t)\cos(2\pi f_c t+\phi(t)) \quad (1)$$

where $f_c$ is the center frequency or the carrier frequency in the communications systems formalism, $\alpha(t)$ represents a slowly varying amplitude and $\phi(t)$ represents a slowly varying phase factor.

Equation (1) can then be expressed as a complex sinusoidal kernel as $$\tilde{s}(t)=\alpha(t)e^{j2\pi f_c t+j\phi(t)} \quad (2)$$

also known as the analytic signal.

The propagation of an elastic wave at a distance from the source which is greater than many wavelengths can be approximated by planar wavefronts. This implies that the signal observed at one array element can be characterized as a delayed version of the signal observed at another element in the same array.

The analytic signal observed at the lth sensor is then $$\tilde{s}_l(t)=\tilde{s}_1(t-\tau_l) \quad (3)$$

where the delay $\tau_l$ depends on both the position of the lth element relative to the first and the AOA of the plane wave makes impinging upon the sensor array. The additional distance the wavefront travels to reach an element a distance d away in a three-dimensional geometry is $$d\cos\psi \quad (4)$$

where $\psi$ is the angle between the line connecting the two elements and the direction from which the plane wave is propagating (the unit vector normal to the plane wave front). The time delay between the signal arriving at a reference sensor defined at a position R in the array and the lth sensor can then be written as $$\tau_{Rl} = \frac{d_{Rl}\cos\psi}{c_{ph}} \quad (5)$$

where $c_{ph}$ is the velocity of propagation of that particular phase or mode of vibration (i.e., compressional wave, shear wave, or surface wave) across the array. The numerator is, of course, the scalar or dot product between the vector from the array reference to the sensor and the unit vector normal to the plane wave front. The subscript R in the time delay $\tau_{Rl}$ will be taken as implied and understood, not appearing explicitly in the following equations. At the lth sensor then, the observed signal would be $$\tilde{s}_l(t)=\alpha(t-\tau_l)e^{j2\pi f_c(t-\tau_l)+j\phi(t-\tau_l)}\approx\alpha(t)e^{j2\pi f_c(t-\tau_l)+j\phi(t)} \quad (6)$$

where the approximation is valid if $\alpha(t)$ and $\phi(t)$ vary slowly over the measurement interval. This formulation is true for narrowband signals. When the source signal does not satisfy narrowband constraints, then a broadband beamformer must be used. That is accomplished in the frequency domain by simply implementing a separate narrowband beamformer on each frequency bin. Starting with the signal component, the complex envelope of the signal measurement from the lth array element is $$\tilde{s}_l(t) \approx a(t)e^{-j2\pi f_c\tau_l+j\phi(t)} \quad (7)$$
$$= \tilde{s}_l(t)e^{-j2\pi f_c\tau_l}$$

where the delay $\tau_l$ ($\tau_{Rl}$) in the signal equates to a change in phase of $2\pi f_c\tau_{Rl}$. Arranging the signal measurements over the time period $[\tau_p, \tau_p+T_p]$ from the lth element into the lth column of a matrix yields:

$$x = \begin{bmatrix} \tilde{s}_l(\tau_p) & \cdots & \cdots & \tilde{s}_L(\tau_p) \\ \tilde{s}_1(\tau_p+T_s) & \cdots & \cdots & \tilde{s}_L(\tau_p+T_s) \\ \vdots & & & \vdots \\ \tilde{s}_1(\tau_p+[n-1]T_s) & \cdots & \tilde{s}_L(\tau_p+[n-1]T_s) \end{bmatrix} \quad (8)$$

where $T_s=1/f_s$ is the sampling period, $n=T_p f_s$ for elements $l=[1 \ldots L]$ defined relative to R being the array reference point or reference element. This matrix can be expressed as the vector outer product $$X=sd^T \quad (9)$$

decoupling the temporal structure into s and the spatial structure into d, and where the emboldened format indicates a mathematical vector in the usage of linear alrgebra, such as a column vector.

The sampled signal vector is $$s=[\tilde{s}_R(\tau_p)\tilde{s}_R(\tau_p+T_s) \ldots \tilde{s}_R(\tau_p+[n-1]T_s)]^T \quad (10)$$

and the spatial structure of the signal is captured by a vector of phase shifts $$d = [1 e^{-j2\pi f_c \tau_{R1}} \ldots e^{-j2\pi f_c \tau_{Rm}}]^T \quad (11)$$

where the phases adjust for the time delays from the reference element. The vector d is known as the steering vector of the array because it points the beamformer to the arrival angle used to form the time delays, along a beam MRA.

Figure 10:
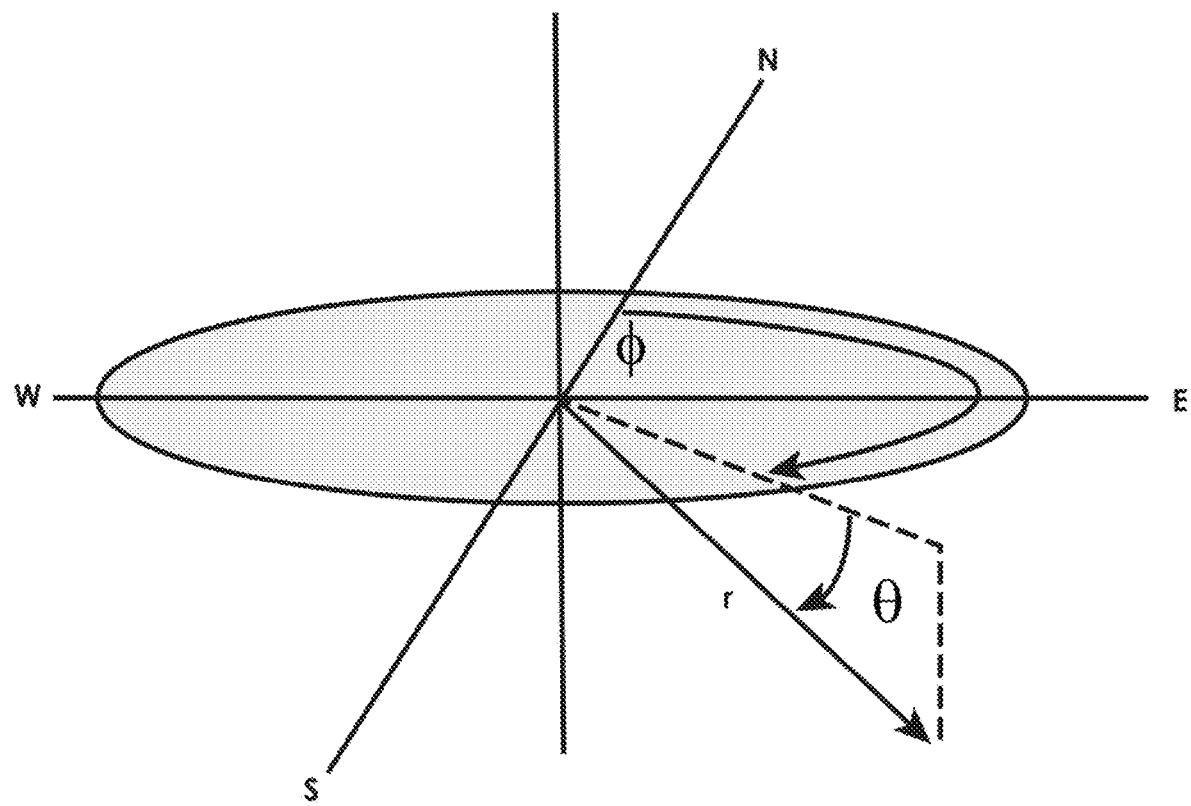
FIG. 10 illustrates a coordinate system for specifying beam direction.
Figure 11:
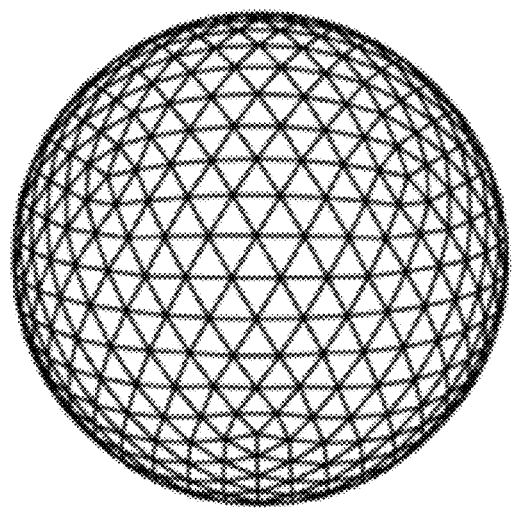
FIG. 11 illustrates an icosphere with vertices indicating candidate directions for initial evaluations of candidate beams associated with processing coherent signals.

The bandpass signal received by an individual element 1 in an array of sensors, impinging upon that sensor with angles (0, 0) with respect to the coordinate system of the array as shown in FIG. 10, may have the form:

$$y_l(t) = \alpha_l(\theta,\phi) \tilde{s}(t) + n(t) \quad (12)$$

where
$\alpha(\theta)$ is a complex valued vector containing the amplitude and phase effects of propagation from a source to the individual sensors, n(t) is additive white Gaussian system noise, and $|\vec{s}|$ is the absolute value of the slowness vector, the inverse of $c_{ph}$.

The spherical coordinate system used here is defined in terms of a radius, $\phi$ being an azimuth east of north, and $\theta$ being a dip or depression angle where positive sweeps down from the horizontal plane. This is the same as the standard spherical coordinate convention except that it's flipped such that positive $\theta$ (positive dip) is down, into the Earth.

The data frame of discrete time samples is then:

$$y_{t,l} = \alpha_l(\theta,\phi) \tilde{s}_t + n, t = [1,2, \ldots N_{frame}] \quad (13)$$

where $N_{frame}$ is the number of data samples in the frame.

A common data frame length, when taking into account frequencies, the signals of interest, timeliness, and processor capabilities is about 1 or 2 seconds. Sequential data frames may overlap in time, such that there may be a ~0% to ~90% overlap of each sequential frame. It is convenient then to define an indexed data frame as $$Y_{FN,l} = y_{t,l} \quad (14)$$

where FN,l are simply unique identifiers or indexes that allow the data frame to be uniquely associated with a slice of time and a particular channel/element.

The main response axes for the set of beams is defined according to a tessellation of a geodesic polyhedron having icosahedral symmetries, with the array located at the center. It should be recognized that there are other valid methods to define the gridding for the main response axis and what is presented here is a method chosen based on optimizing the spatial distribution and coverage for a general solution.

The vector in slowness space is defined within the spherical coordinate system FIG. 10 as the [slowness magnitude, azimuth, dip] coordinates where slowness magnitude is the inverse of the waveform propagation speed across the array, and azimuth and dip define the unit vector directions pointing outward from the array reference center point 28, with positive dip sweeping downward from the horizontal axial plane. This space is discretized into a fixed set of grid coordinates (slowness magnitude, azimuth angle, depression or dip angle). For example, a radial grid is defined by parameters minimum slowness, maximum slowness, and slowness increment. These radial values define nested spherical shells of constant slowness magnitude.

For each radius value, the angular grid coordinates (azimuth and dip) are defined by the values corresponding to the vertices on an icosphere, an example of which is shown in FIG. 9. The 3D grid then consists of nested icospheres with the specified slowness magnitude radii at the specified azimuth and dip angles. These are the set of beam main response axes. After the beam main response axes are defined, the time delays required for each sensor to align a plane wave front normal to that response axis can be calculated. These differences in time correspond to differences in phase for the individual frequencies.

The time delay between the signal arriving at a reference sensor defined at a position R in the array and the lth sensor has been written above as $$\tau_l = \frac{d_{Rl} \cos \psi}{c_{ph}} \quad (15)$$

Rewriting (15) in terms of vectors relative to a reference point R such as the array geometric center point 28, and relative to the plane wave wavefront, $$\tau_l = |\vec{s}|(\vec{n}_l \cdot \vec{m}(\theta,\varphi)) \quad (16)$$

where the angles $\theta$ and $\varphi$, dip and azimuth, are the spherical coordinate angles, $\vec{m}(\theta, \varphi)$ is the unit vector normal to the plane wave wavefront defined with respect to the array reference point R, the same for all sensors because of the plane wave assumption. Vector $\vec{n}_l$ is the spatial vector from the lth sensor to the array reference point R (The extra distance is given by the dot product $d_{Rl} = \vec{n}_l \cdot \vec{m}(\theta,\varphi)$), and $|\vec{s}|$ is the magnitude of the slowness vector and the reciprocal of the magnitude of the velocity vector.

In order to use this in a beamformer application, the vector $\vec{m}$ becomes the main response axis $\vec{M}$ (unit vector) pointing from the array reference point R in the angular direction $(\theta,\varphi)$ such that:

$$\vec{M} = \vec{m}(\theta,\varphi) \quad (17)$$

The phase shift then in units of radians for a given frequency and time delay is $$2\pi f_c \tau_{Rl} = 2\pi f_c |\vec{s}|(\vec{n}_l \cdot \vec{m}(\theta,\varphi)) \quad (18)$$

where $f_c$ is the center frequency of a narrow band, so it immediately becomes apparent that the phase shifts need to be calculated for each discrete frequency, and for the beam with main response axis pointing in direction $\vec{M}$ $$2\pi f_c \tau_{Rl} = 2\pi f_c |\vec{s}|(\vec{n}_l \cdot \vec{m}(\theta,\varphi))$$

$$\Phi_l(f_c, \vec{M}, |\vec{s}|) = \exp[-j2\pi f_c |\vec{s}|(\vec{n}_l \cdot \vec{M}(\theta,\varphi))] \quad (19)$$

where $\Phi_l(f_c, \vec{M}, |\vec{s}|)$ are the individual entries in the steering vector d for specific values of $f_c$ and the beam main response axis, and the specified value for slowness $|\vec{s}|$.

For conventional beamformers, these phase factors are calculated once for each beam main response axis, as a function of frequency and slowness magnitude, when the array processor is initialized, after all installation and final hardware checks and then stored for use. The phase factors are re-calculated only when the array configuration changes. However, for adaptive beamforming operations such as space-time-adaptive processing, the phase factors are recalculated according to the allowed adaptation period, which is usually much greater than a single frame duration. In a possible variation, the phase factors could also be a function of radial distance from the array, based on spherical spreading from a point. However, in most applications, the plane-wave approximation is sufficient.

The beamforming process operates on each of an exemplary 27 frames of digitized sensor data originating from each sensor in an array. In one embodiment the operations are cyclically implemented in the time domain by repetitively operating on every digital data point in the 27 frames, applying the different time delay values $\tau_l$ from the set of predetermined time delays. The range of values in the set of time delays is based on the calculated range of values for a hypothetical plane wave impinging upon the array sensors at the specified direction $\vec{M}$; $\vec{M}=\vec{m}(\theta,\varphi)$ with the specified slowness $|\vec{s}|$. See Equations (15), (16) and (17). This operation is performed for each point in the frame per sensor for the specified time delays.

The data in each of the 27 frames are then time aligned and summed to produce a new data frame of data values. The operation is repeated for all combinations of the unique angles $\vec{M}$; $\vec{M}=\vec{m}(\theta,\varphi)$ and the specified values of slowness $|\vec{s}|$ to produce the time delays to be applied to the data frame. When all combinations of the unique angles $\vec{M}$; $\vec{M}=\vec{m}(\theta,\varphi)$ and the specified values of slowness $|\vec{s}|$ have been cycled through, the next frame of data is processed.

To align signals arriving from a particular direction at a particular value for slowness across the array, the proper time delays must be applied. Those time delays may be implemented by performing all processing in the frequency domain using the corresponding phase factors.

The Fourier coefficients $F_l$, are determined for the frame $Y_{FN,l}$ $$F_l = FFT[Y_{FN,l}] \tag{20}$$

specific to the data channel acquired from sensor 1, and where FFT denotes the application of the fast Fourier transform. This transform into the frequency domain may apply Bartlett's method, Welch's method, the modified discrete cosine transform method, or related commonly known methods based upon the discrete Fourier transform and designed to mitigate spectral leakage or the effects of aliasing.

The Fourier coefficients $F_l$ are then multiplied by the phasors as a function of frequency $f_c$ to align the acquired data, and the result is summed over the L channels into the beam value $$F_{\vec{M},|\vec{s}|,f_c} = \sum_{l=1}^{L} F_{l,f_c} \Phi_l(f_c, \vec{M}, |\vec{s}|) \tag{21}$$

such that $F_{\vec{M},|\vec{s}|}$ represents the frame of all of the complex coefficients spanning the frequency band present in the data frame $x_t$ for all channels l, aligned on the beam main response axis designated by $\vec{M}$, at the slowness $|\vec{s}|$. In one embodiment, the frequency terms in the sum over frequency may be subject to filtering functions within the frequency domain prior to the application of the steering vector. This operation may be performed using the frequency response of any standard filter, or it may be performed using appropriate window functions in the frequency domain, or it may be performed by applying multiple taper functions in the frequency domain.

The filter operation may be applied as specific to element channels, such that there may be an adaptive or tracking filter that is designed to remove specific narrow band tones, modulated narrow band tones, or specific patterns in time or frequency or joint-time frequency. Some of these filter applications may be automated. This step is relevant because of the nature of the geophysical media, that sometimes undesirable signal components may appear only at one sensor or one column of sensors due to the response of the earth to particular stimulus, or due to flaws in emplacement methods, or due to other interfering manmade infrastructure outside of the definition of the System.

Because the specific power $P(\vec{M},|\vec{s}|,f_c)$ sensed at the array, at frequency $f_c$ and slowness space coordinates $(\theta, \varphi, |\vec{s}|)$, is $$P(\vec{M}, |\vec{s}|, f_c) = \left\| \sum_{l=1}^{L} F_{l,f_c} \exp\left(-j2\pi f_c |\vec{s}|(\vec{n}_l \cdot \vec{M}(\theta, \varphi))\right) \right\|^2 \tag{22}$$

Then $$P(\vec{M},|\vec{s}|,f_c) = \|F_{\vec{M},|\vec{s}|,f_c}\|^2 \tag{23}$$

Processing Stage 68A for the Single Channel Transforms applies, for example, a vector space transform such as a Fourier or Hilbert transform to the input data stream. In other embodiments the operation may be calculating a root-mean-square, or a ratio of the series to other quantities or features derived from the series. The signal-to-noise ratio is an example of one such ratio. These transforms are standard signal processing operations found in afore cited signal processing books. See, also, Abraham, D. A., (2019) Underwater Acoustics and Signal Processing. Springer Nature Switzerland AG, Chaim; Boashash, B. (2016) Time-Frequency Signal Analysis and Processing: A Comprehensive Reference. Elsevier; Priestly, M. B. (1981) Spectral Analysis and Time Series. Elsevier Academic Press, London; Swanson, D. C. (2000) Signal Processing for Intelligent Sensor Systems. Taylor and Francis, Boca Raton; Van Trees, H. L., K. L. Bell, Z. Tian (2013) Detection, Estimation, And Modulation Theory. John Wiley & Sons, Hoboken; and Yilmaz, O. (2001) Seismic Data Analysis. Society of Exploration Geophysicists, Tulsa.

These transforms may be viewed as derived series, such as in the last example, or they may be projections, such as in the first example, but all are forwarded on for application of further processing in the additional APA stages shown in FIG. 9. Any algorithm may maintain its own buffer of data that includes previous data frames. In some embodiments an operation in the Single Channel Transform stage may include an intermediate step applied in another domain, such as the frequency domain, and then an inverse transform back to the original time domain. For example, a pre-whitening operation that balances spectral content may be applied in the frequency domain and resulting after the inverse transform in a time domain signal with suppressed low frequency noise or enhanced high frequency signal content.

Time domain detection occurs within the Domain Specific Detectors 66B and the Single-Channel Domain Specific Detectors 68B illustrated in FIG. 9. The time domain detectors receive the beam data frame from the spatial coherence signal processor 66A or receive the single channel data frame after the Single Channel Transform stage 68A and execute algorithms for identifying the presence of broadband signals of interest embedded in processed time domain data. Time domain detection signals of interest include repeated patterned impulsive transient signals, repeated unpatterned impulsive transient signals, and persistent impulsive signals. The detection module may apply multiple detection processes tailored to characteristics of relevant classes of the signals of interest. For example, the time-domain detection algorithms consider dominant signal period, impulse duration, wavelet shape and time-amplitude-phase patterns. The detector stages perform detections on both a single cycle basis and a multiple cycle basis, i.e. on a single processing frame or on a more extensive buffer composed of multiple processing frames. The methods also include estimating the state of the expected background noise derived from time averaged data.

For each pre-defined main response axis specified for the values of the magnitude of the slowness in a sensor array tessellation any of the following may be applied:

- Filtering in the frequency domain if not previously applied
- Weighting in the frequency domain to equalize predefined bands based upon previous measurements of power, if weighting is not already applied in the Single Channel Transforms stage 68A.
- Transforming from the frequency domain back into the time domain to produce a modified time series.
- Deriving additional series from the modified time-domain series as transforms of time-domain data
- For each of the derived data streams, storing multiple buffers of single or multiple frame data for follow-on processing applications In an embodiment, filtering functions may be added to the Beam Forming Signal Path 66 e.g., in the frequency domain, prior to any other operation but post beamforming. This filter operation may be performed using the frequency response of any standard filter, or using appropriate window functions in the frequency domain, or by applying multiple taper functions in the frequency domain. The filter operation may also be performed with any adaptive filter for active noise reduction that is based on a single channel of element data.

After application of any such filter, a weighting or shading function may be applied to provide an equalization of power across bands, or an amplification of power across bands. The beamformed frequency domain frame for the beam with main response axis M and slowness I g may then be transformed back into the time domain:

$$Y_{FN,\vec{M}} = \text{Re}[\text{IFFT}(F_{\vec{M},|\vec{s}|,f_c})] \quad (24)$$

resulting in:

$Y_{FN,\vec{M}}$ the time domain data frame with identifier FN, and for the beam with main response axis $\vec{M}$, and for slowness magnitude $|\vec{s}|$, where the function IFFT indicates an inverse Fourier transform.

Transform back to the time domain data frame may be a necessary operation because, although the initial data frame is completely real valued, approximations, filter operations, and band equalizations applied in the frequency domain may create some small magnitude complex values which warrant removal after transforming back to the time domain.

Operations (in some cases transforms) applied to the modified time series or additional derived series include but are not restricted to: Received signal power series; Multiple comb filter analysis; Phase matched filter analysis; Autocorrelation and Cross-correlation analysis; Noise model computation (for multiple noise models); SNR estimation; Cepstral analysis; Change detection (based from SC transformed or beam derived series); Dynamic time warping and embedded pattern recognition; and Artificial intelligence processes designed to operate over extended data buffers and recognize patterns.

Advantageously, results of the aforementioned operations produced from the time series $Y_{FN,\vec{M}}$ may form detection statistics, with detections of SOI's declared based upon the value of particular statistics compared to a threshold. Generally, the detection operation does not take place on a point-by-point basis. Rather, a test cell is defined in terms of a number of points, and the values of the algorithm estimate within that test cell are either averaged, or the median is taken, or the maximum is determined. The exact form of the comparison may take on a hypothesis test, a probabilistic ratio test, a likelihood test, or simply a value in the form of a power that may be compared to an absolute physical threshold value. That value for the test cell is compared to a threshold based on formulations of, for example, a constant-false-alarm-rate, a signal-to-noise (power) ratio, or accumulations of power over sequential analysis frames. Additional threshold criteria may be based on minimum F statistics.

The threshold operation can be defined for a real-valued $\mathcal{F}$, where $\mathcal{F} > 0$:

$$\text{threshold}(\mathcal{F}): \mathcal{F}_{\geq \text{thresh}} ;= \mathcal{F} \text{ or } 1$$

$$\mathcal{F}_{<\text{thresh}} ;= [\ ] \text{ or } 0 \quad (25)$$

The threshold for detection may also take into account the estimated value of the diffuse noise, as well as estimates of signal power associated with interfering clutter sources. The detection statistic may also take into account the multiple values extracted from the time domain data using cooperative detectors operating on derived series, such as period. The detection statistic may also take into account the resulting values from the identical algorithm operators on nearby beams.

The results of these algorithm operators $\lambda_{FN}(\vec{M}, |\vec{s}|)$ are then amenable to perform detection processes such that $$D_t = \text{threshold}[\lambda_{FN}(\vec{M}, |\vec{s}|)] \quad (26)$$

which results in the set of $D_t$ discrete threshold crossing cells from the function $\lambda_{FN}(\ )$. Detections are then stored for usage in the subsequent stages. From this standpoint, the "detection" is now discrete information that may include, for example, a data frame index; a Beam index or beam main response axis; a time index or sample number; an Algorithm name and metadata; a value of a detected quantity; or a noise value estimate.

Frequency domain detection occurs within the Domain Specific Detectors and Single-Channel Domain Specific Detectors as illustrated in FIG. 9. Frequency domain detection focuses on identifying the presence of band-limited signals of interest embedded in the frequency domain data.

Signals of interest for frequency domain detection operations include narrow-band continuous phenomena of longer duration, or constant frequencies or tones generally referred to as "continuous waveform (CW)" signals. Other SOI's best understood and detected in the frequency domain include: frequency modulated (FM) signals, frequency-shift keyed signals, phase-shift keyed signals, and other signals that cannot be expressed as narrowband but still may occupy a limited finite frequency band, and are best described as band-limited overlapping or interfering deterministic signals, or band-limited stochastic signals. Assuming then a passband signal, the total power in that signal for the beam with main response axis $\vec{M}$ as a function of the slowness magnitude $|\vec{s}|$ is then the power present in the individual narrow band frequency bins, summed over all frequencies in the passband:

$$\sum_{f=f_0}^{f_{Nyquist}} [P(\vec{M}, |\vec{s}|, f_c)] = \qquad (27)$$

$$\sum_{f=f_0}^{f_{Nyquist}} \left[ \left\| \sum_{l=1}^{L} F_{l,f_c} \exp(-j2\pi f_c |\vec{s}|(\vec{n}_l \cdot \vec{M}(\theta, \varphi))) \right\|^2 \right]$$

$$P(\vec{M}, |\vec{s}|) = \sum_{f=f_0}^{f_{Nyquist}} P(\vec{M}, |\vec{s}|, f) \qquad (28)$$

For sources separated in frequency then, a search to find the point in slowness space that maximizes the coherent power can be written as:

$$(\vec{M}, |\vec{s}|)_{max,band} = \underset{(\vec{M},|\vec{s}|)}{\operatorname{argmax}} [P_{band}(\vec{M}, |\vec{s}|)] \qquad (29)$$

where band=$[f_{lower}, f_{upper}] \subset [f_0, f_{Nyquist}]$, and the argument of the argmax( ) function is evaluated over all possible values of $(\vec{M}, |\vec{s}|)$ within band on a grid in search of the set of values $(\tilde{M}, |\vec{s}|)_{max,band}$.

$(\vec{M}, |\vec{s}|)_{max,band}$ are the values of $(\vec{M}, |\vec{s}|)$ within band that maximize the argument of the argmax( ) function with respect to these same variables.

The values that the variable band in Equation 28 can take on may represent more than one frequency band within the entire available bandwidth. For example, band may be a set of defined sub-bands such that $$\text{band} = \begin{bmatrix} (f_a, f_b) \\ (f_c, f_d) \\ \vdots \end{bmatrix} \subset [f_0, f_{Nyquist}] \qquad (30)$$

where $f_a < f_b, f_c < f_d$, and $[f_a, \ldots, f_b] \notin [f_c, \ldots, f_d]$, etc.

In some embodiments, the frequency terms in the sum over frequency are made subject to filtering functions within the frequency domain prior to any other operation but post beamforming. Such operations may be performed using the frequency response of any standard filter, or may be performed using appropriate window functions in the frequency domain, or may be performed by applying multiple taper functions in the frequency domain. The filter operation may also be performed by any adaptive filter for active noise reduction based on a single channel or beam. In other embodiments, the argmax( ) function is applied to each frequency bin to find the point in slowness space that maximizes the power in that frequency band. This is, for each frequency bin, $$(\vec{M}, |\vec{s}|)_{f,max} = \underset{(\vec{M},|\vec{s}|)}{\operatorname{argmax}} (P(\vec{M}, |\vec{s}|, f_c)) \qquad (31)$$

These power maxima points represent one method of deriving discrete points in time and space $(\vec{M}, |\hat{s}|)$ that may be examined to detect SOI's. For example, the points $P(\vec{M}, |\vec{s}|)_{max,band}$ or $P(\vec{M}, |\vec{s}|)_{f,max}$ may be subjected to a threshold based on formulations of a constant-false-alarm-rate, signal-to-noise (power) ratio, or accumulations of power over sequential analysis frames within that pixel of slowness space. Additional threshold criteria may be based on minimum F statistics. With the threshold operation defined as threshold($F$);$F \geq$thresh;=$F$ or 1

$$F<\text{thresh};=[\ ] \text{ or } 0 \qquad (32)$$

Then, $$P(\vec{M}, |\vec{s}|)_{max,f} = \text{threshold}\left(\underset{(\vec{M},|\vec{s}|)}{\max} (P(\vec{M}, |\vec{s}|, f_c))\right) \qquad (33)$$

and the coordinate in the three-dimensional slowness space is $$(\vec{M}, |\vec{s}|)_{f,max} = \underset{(\vec{M},|\vec{s}|)}{\operatorname{argmax}} (P(\vec{M}, |\vec{s}|, f_c)) \qquad (34)$$

In another embodiment, the detection function is performed on each discrete frequency within the band followed by summation over frequency such that the total power estimate becomes:

$$P_{det}(\vec{M}, |\vec{s}|) = \sum_{f=[f1\ldots fN]} P(\vec{M}, |\vec{s}|, f_c) \qquad (35)$$

$$= \sum_{f} P\left(\text{threshold}\left(\underset{(\vec{M},|\vec{s}|)}{\operatorname{argmax}} (P(\vec{M}, |\vec{s}|, f_c))\right)\right)$$

In another embodiment, narrow band processes act upon the spectral representation of the beam without the argmax( ) operator being applied to derive intermediate functions in the frequency domain:

$$\Pi(q, \vec{M}_p, |\vec{s}|, f_c) = \Pi[F_{\vec{M}_p, |\vec{s}|, f_c}^q] \qquad (36)$$

Where $\Pi$ is a complex mathematical process operating over q frames, $q \subset [1, \ldots, N]$, i.e. q spectral estimates of sequential data frames where the current data frame is 1 and the oldest data frame is N, from one or more adjacent beams p generally of the same slowness $|\vec{s}|$, and $$F_{\vec{M}_p, |\vec{s}|, f_c}^q$$

is specific to operating on the beamformed frequency component $f_c$ from the qth sequential data frame(s) from beam(s) defined with main response axes $\vec{M}_p$, and for the slowness specified $|\hat{s}|$, such that the function power can be calculated as $$P(\Pi(q, \vec{M}_p, |\vec{s}|, f_c)) = \left\| \Pi[F_{\vec{M}_p, |\vec{s}|, f_c}^q] \right\|^2 \qquad (37)$$

and then be used in detection metrics not involving summation over a wide band, as previously discussed.

Such examples of complex processes, II, may be Phase-locked or phase matched filters, Functions of relative magnitudes of specific frequencies and beams for a single frame or for multiple frames, Functions of multiple frequencies and beams for a single frame or for multiple frames, Ratios of estimated signal and noise estimates where the noise estimates are derived over multiple frequencies as well as multiple frames and may include multiple adjacent beams. Other examples include variances of power, and variances of variances, higher order moments and cumulants calculated on a band-limited basis, Combinations of discrete frequencies, beams, and frames designed to uncover hidden randomly modulated periodicities, Functions of higher order spectra, Recombinations of frequencies designed to recover the total power from harmonically related frequencies, Recombinations of frequencies designed to recover total power split between fractionally related frequencies, Change detection (based from SC transformed or beam derived series), and Artificial intelligence processes designed to operate over extended data buffers and recognize patterns.

The previous functions are all discrete in time, but are nevertheless continuously derived functions in time. In other words, one function value will be calculated for every frame and no frames will be skipped, so as to result in a continuously derived series. These functions $P(\Pi(q,\vec{M}_p,|\vec{s}|,f_c))$ are then amenable to perform detection processes such that $$P=\text{threshold}[P(\Pi(q,\vec{M}_p,|\vec{s}|,f_c))] \quad (38)$$

results in the set of P discrete threshold crossing cells from the function P( ).

Detections are stored for usage for the following stages. From this standpoint, the "detection" is discrete information that may include: a data frame index, a beam index or beam main response axis, a time index or sample number, a frequency or frequency bin index, an algorithm name and metadata, a value of detected quantity, or a noise estimate value.

The Fine Angle Estimation component receives detection cells from the Time Domain and Frequency Domain detection components, and the beamformed data from the Spatial Coherence Signal Processor, and performs an interpolation to better resolve azimuth and dip of detection cells. The interpolated azimuth and dip angles become part of the detection structure. The interpolation looks over all adjacent beams in azimuth and dip and weights the azimuth measurements from the different beams by the observed power in the beam. Several interpolation schemes are appropriate for this calculation including but not limited to linear interpolations and cubic spline interpolation. The Single Channel filter applies rules for screening out problematic Single Channel Domain Specific Detections. These "filters" are logical operations that reject detections or flag detections as invalid based upon the information populating the detection object and are not related to the kinds of filters applied to modify the frequency content of a time domain signal (e.g., band pass filter). However, an example of these filters is to remove detections related to known or recognized clutter sources as a function of their joint time-frequency expressions.

The detection cells for all beams are made available for analyses that group cells together to form patterns in time, frequency, and space, i.e. cluster analysis. Therefore, the cluster analysis is in effect, also a pattern chaining stage. The cluster analysis stage 66D is the final step in the processing of a single data frame, or "single-cycle processing" and results in a set of discrete single-cycle detection objects that capture signals of interest identified from both time-domain and frequency-domain detection operations, and assembles all attribute information from the compatible detections that are considered to be related.

After the Cluster and Feature Extraction stage, the continuous data stream is no longer available for processing (although it will remain in the database as element level data), and only extracted information is available for additional processing. This important "discretization" step then aids in reducing the communications and processing loading of the follow-on stages, enabling a single processing server to service many arrays.

In one approach a metric represents a distance in space, time, and slowness, and sets of rules are applied such that similar detection cells occurring in close proximity (according to the metric) are grouped together into the single-cycle detection objects. Scattered single detection cells are excluded from additional processing stages. The space dimension may be any measure that can be used with angular distances. The difference in beam index may be a measure of distance, as well as the difference in the beam main response axes containing the two single detection cells, or whatever fine bearing estimate exists for the detection cells. Clustering over slowness is limited by a single-link clustering approach with the maximum allowable distance equal to one slowness increment, in effect allowing only those detections in adjacent slowness bins to be joined. The approach falls under the set of cluster analysis algorithms that are termed "agglomerative" in that the clusters are determined by accumulating members, and not by dividing a larger set.

Additional clustering dimensions are possible. For example, the space dimension may be broken into the azimuth and dip components and applied separately. Including frequency, either as a bin or in actual units of Hz is also a possible dimension that would allow separation of sources with different frequencies occupying the same spatial dimensions, and a similar operation considering harmonically related frequencies is an obvious extension. Any attribute that provides a discrimination potential between sources may be used to form a distance metric enabling cluster analysis in a multi-dimensional sense.

A final step of this exemplary processing stage performs an estimation of the state of the united detection object acting to consolidate the set of information drawn from the extracted features combined from the detection cells. The single cycle detection objects are then made available for multi-cycle processing. The single cycle detection object features may include, for example: Centroid location in ($\theta$, $\varphi$, $|\vec{s}|$), Total (summed) power, Population, Enclosed (convex) volume, Density, Spatial moments, Member similarity, or Membership which includes the frequencies present in the grouping. In the context of the overall system, the cluster of discrete detections and the information derived about the detections and from the cluster define an "event." An event then is bounded by time to occur only within a single cycle.

The cluster operation also includes a final selection step that tests the properties of the agglomerated clusters. The selection allows screening based on properties of SNR, population, dimension, density, and aspect (a measure of shape in multiple dimensions). For example, cluster selection allows singleton clusters (single detection cell clusters)

to be screened out, and also allows clusters that exist across a large number of beams to be eliminated from further consideration.

Multi-cycle processing is initiated using state-based estimation routines incorporating single cycle detection object information, i.e., events, into dynamic models of how that information evolves in time. The Single Array Tracking stage 70 is a general process as used for the single array and is not limited to the common understanding for producing a position versus time, or a positional track, or a spatial track. As used herein, tracking algorithms are any multi-cycle processing that results in an understanding of some state of the detected signals of interest over time. In other words, the tracking algorithms result in a multi-cycle detection object with a state vector including features derived from the joint set of single-cycle events. These multi-cycle events are referred to herein as single-array track objects. Such events are associated with an existing single-array track object based on proximity in the space of $(\theta, \varphi, |\vec{s}|, t)$ and probability of belonging to an existing track object.

Those events that are not associated with an existing track object are used to initialize new single-array track objects. The tracking algorithms share features common with other algorithms designed to estimate the state of a discrete information object, such as the ability to "coast" if a measurement is missing in a processing cycle. Similar algorithms include Kalman filters, alpha-beta-gamma filters, and particle filters.

Track objects include an assortment of features derived from the combined information in the track. Those features include the basic current state of the track in terms of the parameters of azimuth and dip, or frequency, and the events that have been associated to that track (membership) and their features, and all of the historical information for that track regarding state and membership. In addition, features such as duration, density (associations/duration), duty cycle (active time/duration), and signal-to-noise-ratio are measures considered part of the track object features.

Measures such as the angular range and variance of the track state variables, covariance matrices and Frobenius norm of the covariance matrices of the track, and angular range and variance over the set of events associated with the track are computed and stored. An updated interpolation of the track azimuth and dip angles is also produced based upon the single array track solutions. Track objects may include measured power features calculated as both "instantaneous", single-time-step values $P_{TrackY}^{Instant}(\vec{M}, |\vec{s}|)$ and as accumulated values $P_{TrackY}^{Accum}(\vec{M}, |\vec{s}|)$. The accumulated power is a sum of the instantaneous power over the duration of the track object:

$$P_{Track}^{Instant}(\vec{M}, |\vec{s}|, t) = \sum_{f \in Track} P(\vec{M}, |\vec{s}|, f, t) \tag{39}$$

$$P_{Track}^{Accum}(\vec{M}, |\vec{s}|, t) = \sum_{u \in Track} P_{Track}^{Instant}(\vec{M}, |\vec{s}|, u) \tag{40}$$

where: the sum over "f∈Track" includes only the events that have been identified as belonging to this Track; t indicates the present frame in time; and the sum over "u∈Track" includes recent track history up to t.

The accumulated track power is the sum of instantaneous track power over cycles u of the track history; the accumulated power calculation may be limited in terms of the number of cycles. In an example embodiment, a fit of specific track features vs. time is performed and stored as a feature to indicate a moving or stationary source. In addition, the argmax( ) of the accumulated track power is used to determine a weighted azimuth angle, dip angle, and slowness:

$$[(\vec{M}, |\vec{s}|)_{max}]_t = \underset{(\vec{M}, |\vec{s}|)}{\mathrm{argmax}}[P_{Track}^{Accum}(\vec{M}, |\vec{s}|, t)] \tag{41}$$

For stationary sources, the accumulation of track power makes the values of $(\theta, \varphi, |\vec{s}|)_{max}$ much less variable than if they were calculated statistically from individual power from the same set of single processing cycles. Additional track object features, or those features inherited by the track object from the events, may be used to form state-estimates, such as frequency. For that specific case, the processing system is then performing joint-time-frequency analysis. However, the combination of features may also be tracked such that a single track is formed based on the combination of both azimuth and frequency. Thus, the space that state estimation is performed within is generally multidimensional including dimensions beyond just the spatial distribution in time.

Decisions on track objects being maintained or dropped are performed using metrics of track object quality, and standard rules. For example, after no associations of events are made to an existing track object for several cycles, the track object may be closed and may be dropped.

The purpose of the Classifier stage 72 is to generate a statistically robust decision as to the type of source generating the signal of interest. The first step is an assessment of the class of the signal, which is, by necessity, multi-cycle. Components may be run either every processing cycle or on-demand, when in an event-driven architecture. Therefore, the Classification Processor is a collection of algorithms rather than a single monolith. The results of these assessments are used to make a determination which provides indications as to whether or not the information derived from detected and tracked signals meets threshold criteria for classification as originating with particular source classes. The analysis indicates whether the information reduced from the collected data suggest one or more class-specific classifications.

In one embodiment, a track object is initially assigned a class of null, pending, NaN, or N/A. The preliminary classification categorizes the observed signal of interest according to the derived characteristics in slowness space, time, and frequency. For example, a broadband, instantaneous signal without significant duration is typically classified as an impulsive transient (IT) signal, whereas a narrowband tone-like signal of significant duration and lacking changes in frequency as a function of time is typically classified as a CW signal. Between these well recognized end members lie a number of possible signal classifications depending on the joint time-frequency (JTF) behavior of the signals; patterns, or lacking of patterns in the JTF behavior; and patterns in the slowness distribution of the signal power.

In general, a source of seismic energy may generate multiple types of signals. This is attributable to both the nature of the source and the nature of the propagation media in the ability to support shear waves. Therefore, appropriate multiple information objects representing the accumulated information reduced from multiple types of signals may be associated or merged, and that joint information "object" may be taken as evidence for or against the presence of a specific source class.

Using this paradigm, multiple types of sources may coexist in the data stream and be successfully separated and classified so long as the feature sets derived therein are separable. Such determinations indicate that one or more threshold criteria are met which establish a minimum confidence level that the assessment is correct. This application of the classification algorithms results in: (a) a conclusion that a track object is a member of a particular class; or (b) a conclusion that the track object originates with a source not of interest. Each conclusion is accompanied by a confidence level. The classification algorithms culminate in a classification decision based on the consolidated multi-cycle feature set.

For example, one classification algorithm applies a classification and regression tree (CART) approach. Within this approach, after each update to a track object, a series of business rules and statistical decisions are applied that may include linear discrimination analysis (LDA), quadratic discrimination analysis (QDA), logistic regression classification (LRC), or multinomial logistic regression to discriminate between two or more classes. The regression tree may not be fully traversed if the accumulated information does not provide the required evidence: the furthest-progressed result is what is reported. This approach is used for both time-domain and frequency domain derived track objects.

Another component of the classification algorithms focuses on track motion analysis, which is more commonly known in the literature as "target motion analysis" but in this case there is no equivalence between a single-array track object and a potential target with a location. As an example, if the angular velocity is consistently greater than a predefined threshold value, or if the range or variance of angle vs. time exceeds threshold values, this track is deemed originating with a nonstationary source and a flag is set on this feature. For stationary sources, then the azimuth angle, the dip angle, and slowness computed from the argmax( ) of the accumulated track power is the preferred solution for those dimensions. For moving sources, a quadratic curve is fit to the measurements of angle. The values of that fit are used in follow-on classification algorithms, and the goodness-of-fit is also stored.

The classifier algorithms also assess track quality using track features such as duration and density, and for moving sources, goodness of fit. A confidence in the track is computed, representing a probability that the track meets one or more specific track motion models.

Frequency domain classifiers are also applied using the features derived in the previous stages. For example, one derived series represents comparisons of the spectral power of the signal with the time averaged power of the ambient noise on a per-frequency basis. In one classification algorithm, that series is used in the determination of patterns in the spectral content on a single cycle as well as a multiple-cycle basis. Artificial intelligence classification algorithms may be applied to the frequency domain analysis. These artificial intelligence algorithms classify patterns in the conditioned joint-time-frequency domain representation of the signals and return a measure of correlation between example source patterns and the observed signals. A similar approach takes the previously computed time-domain features to determine a source class based on the most likely match.

For example, time domain processing may include analysis of particular time-phase patterns of the signal. The value of each pattern correlation represents a feature, and those features are compared and combined in the classifier stage to produce the determination on the source attribution. Similarly derived features can be used in a regression scheme as previously described. The output of the classification stage is a label applied to the track object, a measure of confidence, the algorithm supplying the label and associated classifier features subject to the algorithm and the result chosen. More than one algorithm may supply a label, in which case there may be multiple labels represented in the data structure. The confidence measure is specific to the algorithm supplying the label and may be in the form of a traditional statistical confidence, likelihood values, p-values, or other statistical measures of confidence, significance, or goodness of fit. The additional information supplied by the classifier is stored in the Enterprise Database 74 and available to the State of Health Monitor Subsystem and the Aggregator Subsystem.

Features included in example embodiments of the State of Health (SOH) Subsystem 46 actively and passively monitor components and functions of the System 10, including: passive monitoring of the output of individual sensors, active testing of electrical properties of these and other electrical components and any changes in frequency response of individual sensors.

The SOH Subsystem 46 performs active testing of the response of all elements 23 of a sensor array 22 of a Network Segment 12 by activating one or more frequency-controlled, low power test sources 34 that are external to and independent of any components associated with acquisition of data from the array elements 23, and which transmits specified waveforms at specified power levels from specified locations. During normal operation of the System 10, the SOH Monitoring Subsystem 46 continually monitors the signal output of each sensor, post data acquisition, to determine if a problem is developing in individual sensors or an acquisition channel. Passive monitoring includes computing long term averages of the digital stream output by each sensor, the variance and other moments, monitoring for clipping in sensor dynamic range, monitoring for non-responsiveness, monitoring for long-period signal wander, and monitoring for instantaneous glitches and dropouts in channels.

The active testing sources generate signal strengths above noise levels at short source-to-element ranges. These sources, principally electromechanical actuators 34, effectively achieve an active built-in-test (BIT) function that enables individual testing of entire sensor arrays 22 and all individual array elements 23 with an independent external source of vibration that propagates with sufficient power to all of the array elements. The useful frequency range of the actuators 34 may, for example, span from ~10 Hz through a few kHz for testing of the sensor arrays. The BIT actuators 34 are capable of generating a variety of vibrational signals such as impulsive transients, tones, and swept frequency signals within the actuator 34 useful frequency range. Multiple test sources (e.g., actuators) 34 may be deployed in hardware configurations similar to those of the sensor strings 52 illustrated in FIGS. 5A and 5B.

Figure 5C:
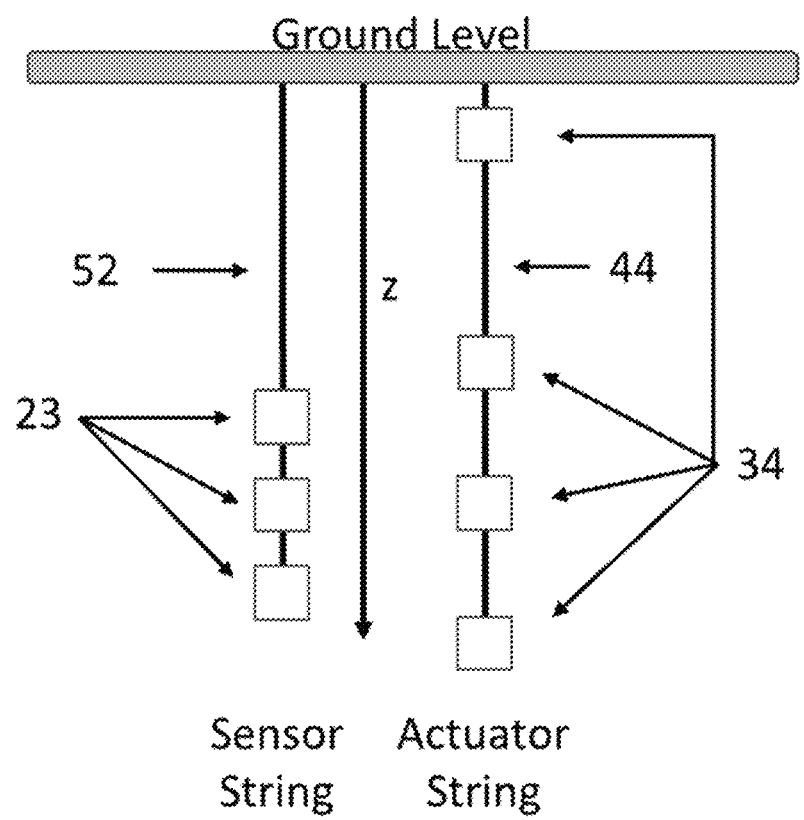

The BIT actuator strings 44 are emplaced within the array aperture or at advantageous locations near the associated array 22 at the time of installation and are connected via cable to local interface control circuitry 36 that includes a digital-to-analog converter, an amplifier, and control electronics in an environmentally robust package that is located near the top of a borehole containing a BIT string 44 of test actuators. For purposes here the local interface control circuitry is referred to as the DAC unit (Digital to Analog Converter unit). As shown in FIG. 5C, the BIT string 44 may comprise a series of four spaced-apart test sources 34 extending along the borehole. The transmitted power can be controlled, e.g., ranging up to tens of watts.

The test sources 34 may be controlled through the Array Server Subsystem in conjunction with the DAQ Server 38. In one embodiment, all BIT functions are controlled through a BIT Application software module, a component of the SOH Subsystem 46, which is hosted on the Array Server computational platform 40. The BIT Application indicates which test signal configuration may be utilized, e.g. impulsive transient trains, or constant frequency tones, or swept-frequency chirps, or pseudo-random noise, combined to form complex tests. In an example embodiment, the BIT Application automatically activates BIT on a selectable schedule, as recorded in configuration files that specify the order and combination of test signal files and actuators. Alternately BIT is activated on-demand via operator commands received through the UI Subsystem 32.

Upon receiving a command to initiate BIT from the BIT Application, the DAQ Server 38 sends control signals and test waveforms through the LCU to the specific DAC unit to selectively drive particular actuators 34 with analog voltage signals that generate seismic transmission. In the illustrated embodiment, the BIT Application causes the DAQ Server 38 to issue appropriate operational control commands and a digital version of the test output signal to a specific LCU 56, which routes the commands and the test output signal to a specific DAC unit 36, whereby signals are converted from the digital values to an analog voltage, which is amplified and then sent to a specified one or more of the actuators. Thus, upon command, the vibrational test signal is generated, propagates across the sensor array to the array elements, is received by the array elements, and then acquired through the normal operations of the DAQ Subsystem.

The Array Server 40 receives test signal data received by array elements 23 and acquired through the DAQ Subsystem, and the BIT Application automatically processes the resulting data. The Bit Application processing pipeline performs verification that test signal data output from each sensor occupying array element 23 in each sensor array 22 of the Network Segment 12 is acceptable, and that each sensor array is, operating within specifications, and the single array is performing as expected.

A feature of the invention is based on recognition that accurate and effective operation of the System 10 is dependent on more than manufacturing tolerances and the reliability of sensors and other electronic components. Response of sensors to stimuli at either near-field or far-field ranges, depends in part on coupling between the sensor and the geologic media, including the local environment of the sensor. Geologic environments may vary on the scale of meters and that scale is important in considering the wavelengths associated with the frequencies of SOI's received by the System 10 processes. Therefore, even when sensors are manufactured to exacting tolerances, there may be differences in sensor response owing solely to emplacement and local geologic conditions. The BIT Application measures the response of the total System 10, i.e., of both the sensor and the coupling of array elements 23 under conditions influenced by characteristics of the subsurface media. This yields a more complete characterization and assessment of the responsiveness of the Sensor Subsystem 14 as a whole. To summarize, the BIT Subsystem and related methods allow accounting for differences in array element responsiveness due to factors external to a sensor itself including emplacement and coupling with the media as well as local or variable geologic conditions across the array aperture.

The BIT Application component of the SOH Subsystem 46 can characterize the response of sensor platters in an array (e.g., elements 23 along spaced-apart horizontal planes P1, P2 and P3 shown in the FIGS. 6A-6F), and columns or strings of sensors, e.g., in arrays deployed in assemblages of multiple boreholes. The results of processing BIT signals through BIT Application processing pipelines are used to adjust equalizations among signals from multiple array elements 23 prior to beamforming. An improved beamforming processing result is thereby provided for operation of the System 10 based on monitored changes in responsiveness and performance of both the individual elements and the sensor arrays 22 as a whole over time. The results of each BIT event are stored in the Enterprise Database 74 and are accessible via the user interface. FIG. 15 presents an overview of the information, command and control, data and signal path through the Built-In-Test capability and of the System 10 elements which support that capability.

The Aggregator Subsystem 24 receives event information data from multiple array servers 40 and combines the processed information in the final stages of the processing pipeline, i.e., in the Aggregator Pipeline 26, to locate sources of the most recent common events, create and update spatial tracks, identify source classes, and monitor and classify recognized Activities. The Aggregator Subsystem 24 outputs information such as the location of events and the spatial tracking of events over time into the Enterprise database 74.

Signals from each sensor array 22 are processed through the Data Acquisition Subsystem 16 and the Array Server Subsystem 18 at the individual array level and forwarded for aggregator processing at the Network Segment level. Generally, at the Network Segment level, the signals and information are combined from multiple spatially separated sensor arrays 22 in the same Network Segment. Advantageously, these arrays may provide overlapping coverage in range and azimuth, this facilitating automatically locating a source of energy by the System 10.

With reference to the functional block diagram of FIG. 12, there is shown an embodiment of a Network Segment Aggregator 80, designated in FIG. 3A as one of N Aggregator Instances 80 for each of N Network Segments 12. Each Network Segment Aggregator initially receives the information derived at the array level from each of the sensor arrays 22 in the associated Network Segment 12, and processes the inputs to fuse information from among the individual sensor arrays to derive new information from the fused set. The new information may include position data, tracking data, history and state data, and activity information for one or multiple sources associated with classified events.

Inputs to each Network Segment Aggregator 80 may be based on detected, tracked and classified Single Array Track Objects, corresponding to sources of interest, their type classification, their azimuth angle $\Phi_i$ and dip angle $\theta_i$ (relative to the center point of the sensor array 28) over time, and other derived features appropriate for the identified source class. This information set arrives and is processed in an asynchronous fashion from multiple arrays to support the provision of real time information across the User Interface in a manner timely enough to facilitate effective response.

The first stage 82 of the Network Segment Aggregator 80 collects, sorts, and screens data in the information stream generated by and for the Classifier Stage for Single Array Track objects. A table is generated and populated with the input from each array. The inputs are prioritized by object time and screened for track quality and confidence in the class label.

Next, an Association Algorithm 84 identifies events reported by at least two different arrays in the same associated Network Segment, for which multiple event occurrences identified data from different arrays that meet temporal criteria, similarity criteria, and with azimuthal angle criteria such that the reported information may be associated with a single event. When these criteria are satisfied, the beam axis B, associated with the single event of interest identified for each of multiple sensor arrays 22 in at least one of the Network Segments 12 and any additional signal and time characteristics is used in the application of Location Algorithm 86 to determine the location of the signal source. The details of the location procedure and the associated positional uncertainties are addressed in the discussion of the Location Algorithm 86 which follows. See equations (42) through (44). Several location determination procedures are provided by the Location Algorithm, including beam intersection, time difference of arrival (TDOA) and other well-known location techniques that combine available information.

A feature of the Location Algorithm 86 is the generation of location information for the source of interest based on intersection of two or more beam axes $B_i$ in different sensor arrays 22 which are found to have an association with the same seismic source of energy. The beams, $B_i$, extend from center points 28 of different sensor arrays toward the same seismic source of energy, i.e., at least approximately the same source location. Each beam axis is centered on a defined array center, its azimuth angle $\Phi_i$ and a dip angle $\theta_i$ for a specified propagation velocity, but carries with it some uncertainty with regard to the actual $\Phi_i$ and $\theta_i$ values.

Figure 13:
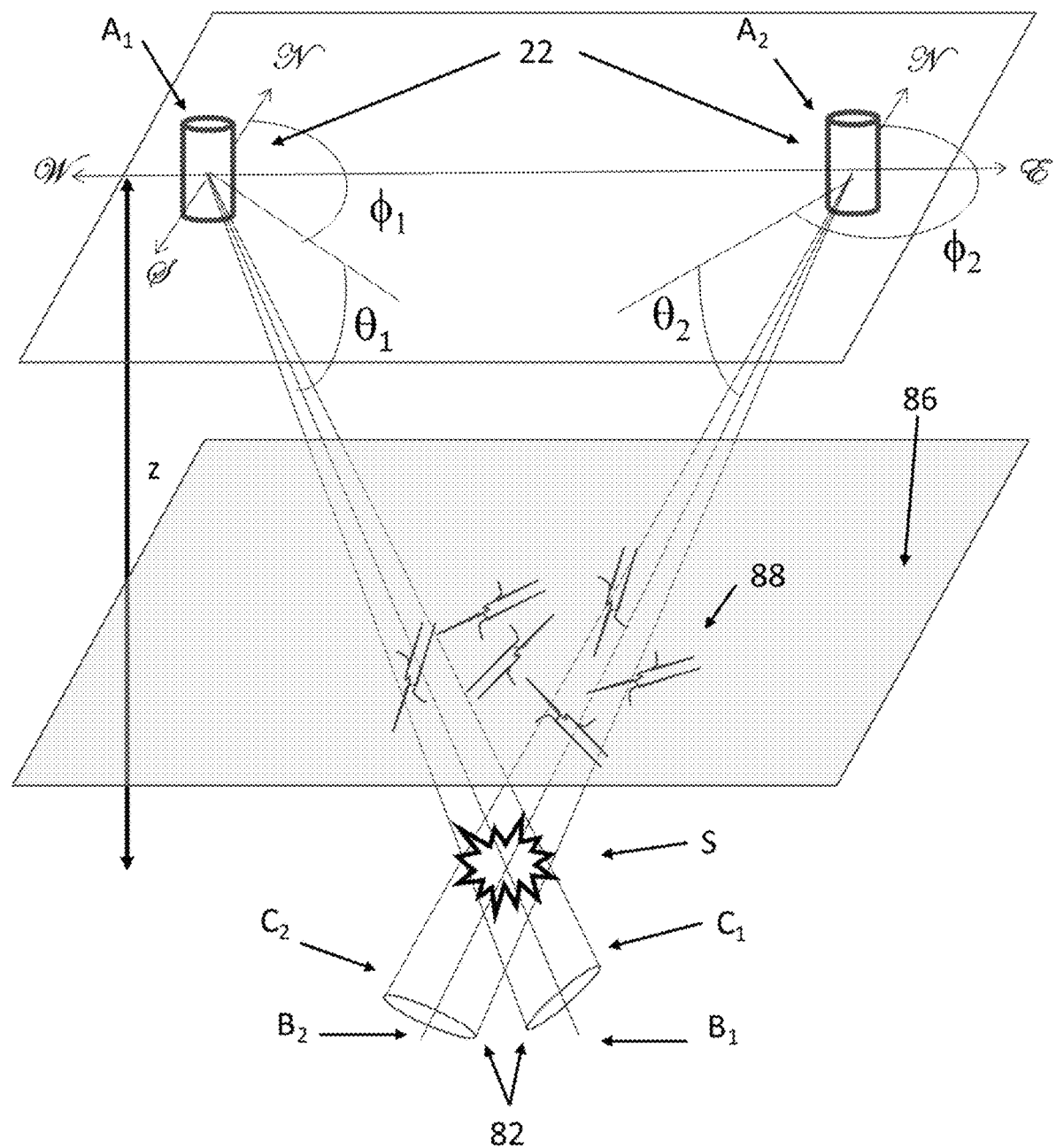
FIG. 13 illustrates a location process for multiple arrays, based on determining an intersection point of array beams.

This uncertainty may be generally approximated a solid cone, referred to as an uncertainty cone 82, symmetrically centered about each beam axis B. See FIG. 13 which illustrates two sensor arrays A1 and A2 from which respective beam axes $B_1$ and $B_2$ extend toward a source location, S. The beam axes are drawn along those directions corresponding to the AOA (defined by azimuth angle $\Phi_i$ and a dip angle $\theta_i$) from the sensor arrays A1 and A2 to provide an approximate location in three-dimensional space for that signal source. The uncertainty cones $C_1$ and $C_2$, associated with beam axes $B_1$ and $B_2$, respectively extend about the beam axes. The depth z of source S varies according to the application being served by the system. For instance, depth z for a shallow sensing application typically varies between 10 and 40 meters, while depth z for deep monitoring typically varies between 5 and 15 kilometers. At these depths, geologic boundaries 86 containing fractures 88 or other geological inhomogeneities may exist and through which the source signals must pass to reach the sensor arrays 22.

Estimated source location and related information are stored in the Enterprise Database 74. The Aggregator simultaneously processes data to identify one or more source locations based on all distinct track objects, using an algorithm that features a combination of methods including TDOA and triangulation algorithms and is flexible to include all available time-defining and directional information. Once a location is determined, an Activity Monitor running on the Aggregator host initializes a new Activity, or associates the location into an existing Activity, provided criteria are passed indicative of the signal source participating in a common activity, where the criteria are based upon measures of similarity, compatibility, and proximity.

Using the determined location information, the next processing stage 88 in the Network Segment Aggregator performs Spatial Tracking of the one or more located signal sources applying standard positional tracking schemes. The sources may be stationary, in motion, or characterized by intermittent movement. The resulting Spatial Tracking information is stored in the Enterprise Database and may be provided across the User Interface. At this point, the fused set of information known about the source of the signal includes its classification, location and movement, and all other subordinate extracted and derived information down to the original detection information.

The last stage 90 of processing in the Aggregator pipeline 26 provided through the Activity Monitor which scans the cumulative Activity information to determine if the state and numerical confidence of the Activity. All this information is stored in the Enterprise Database 74 for delivery to the User Interface 84, provided as a service through Aggregator Server Services, in the Aggregator Server 42, to the User Interface client. The general flow The Aggregator Subsystem is hosted on the Aggregator Server computational platform which is part of the Aggregator Server Subsystem. A single Aggregator Server 40 may host multiple Aggregator instantiations; generally, one Aggregator instance is required for processing of all information generated from all sensor arrays in a single Network Segment. However, if the Network Segment is particularly large in terms of the number of arrays and/or complex in terms of array installation and distribution, the System is customizable to allow for additional Aggregator instances to provide services to a Network Segment.

Aggregator Instances perform the following functions: receiving the single array track and event information objects having positive classifications from multiple arrays; compiling the information into an ordered table as a function of the array providing the information; filtering the table for most recent events to form a prioritized list; screening the events for confidence; associating the most recent events with events of like classification from the table of single array tracks and the list of events, based on minimizing time between events within an allowable time window; locating events; performing source specific spatial tracking of located events; associating proximate spatial tracks containing the events with an Activity; initiating, maintaining, and monitoring of Activities; and managing the Enterprise Database 74.

Single array track and event information (objects) derived by the APA 21, with positive class assignment are promoted to the respective Aggregator Instance 80 of Aggregator Subsystem 24 for multiple array information processing by the Aggregator Pipeline 26. A positive class assignment is considered as attaining any label other than NaN, unknown, pending, N/A etc. The Aggregator Instance 80 works across data-frame based cycles that the APA 21 has defined, and operation of the Aggregator Pipeline 26 is triggered by the reception of a new event (or updated single-array track) to the Aggregator Instance.

The Aggregator Subsystem 24 provides a single Aggregator Instance 80 that executes and controls an Aggregator Pipeline 26 which is responsible for compiling the received APA information into an ordered table as a function of the sensor array 22 providing the information and the time the information was received.

The Aggregate, Sort and Screen Events Stage 82 in the Aggregator Pipeline 26 of the Aggregator Instance 80 filters the table compiled from the received APA information for the most recent events to form a prioritized list of events received within a time period. Event membership in other hierarchical information objects remains intact as is common in relational databases. The event list is screened for confidence of the classification value and single array track quality. Geometries of events are also screened using the determined azimuth angle and dip angle to identify those events compatible with the hypothesis they originate with the identical source at a single location.

The reduced list of events become the candidate set for the Associate Algorithm Stage 84. The objective of this function is to associate the most recent events with the same classification from the input list of single array tracks and events based on minimizing the time difference between events, within a predefined allowable time window. This "associate" operation is similar to a low dimensionality cluster analysis operation. The time window extends backward from the current system time for the specified duration. The result is a reduced list of associated events that are the candidates for input to the Location Algorithm Stage 86. Location of a common source is determined based on the reduced set of associated events having identical classifications. For the case in which multiple events associate but there are no "best fit" pairs, a location for each pair of events in the association is determined. For example, a set of three events associating together could result in two event locations. The location algorithm may also be based on time difference of arrival (TDOA) when such information is available and adequate, or it may be based upon triangulation based on beam geometries of the events when no time-defining information is available or when time-defining events drawn from the signals are not tightly correlated across multiple sensor arrays 22 providing the information objects.

Location of CW signals is more problematic than impulsive signals due to the absence of a clearly time-defining events, such as the leading edge of a pulse that would enable measurement of the time of arrival. In some cases, cross correlation procedures can be used to determine a time-defining ambiguity function related to the time of arrival of CW signals. The relative time shifts, or the relative times between the peak values of two cross-correlation functions can represent an estimate of the TDOA of the source from the point of view of the multiple receiving arrays. These cross-correlation procedures can work well using the sensors of a single array.

Nevertheless, it is often difficult to use cross-correlation procedures for CW signals from two separated arrays due to the fact that continuous waveforms are by nature repetitive, resulting in repeated matching of the waveform as phases align, and often resembling an interference pattern that is not very useful, especially for the case of stationary sources. This can also be thought of as the case of spatial coherence processing for a single array when the frequency of the signal is well above the design frequency of the array, and spatial aliasing occurs. Determining coherence of signals acquired from two spatially separated sensor arrays, receiving seismic signals propagating along two uncharacterized and complex paths cannot be guaranteed. It is often difficult to determine a single maximum in the correlation function.

For processing pipelines like the ones described herein, requiring detection of multiple types of signals, location algorithms based upon the combination of all available information are the most useful. That information may include (but is not guaranteed to include) the TDOA, the frequency difference of arrival (FDOA), the AOA (i.e., azimuth and dip angle information), and the slowness vector. The location information may also take into account varied propagation modes, such as Rayleigh waves (a.k.a. surface waves), versus solid or body waves. The available information is combined in a linearized recursive maximum likelihood estimation procedure that results in a location.

Another feature of the System 10 and related methods is capturing the estimates of error in observations and model inputs and reducing that error to improve accuracy of the ultimate location determination as well as the uncertainty in that solution. Typical TDOA techniques recognize a standard or systematic error term and a random error term. The standard error estimates the error due to the uncertainty in the input model, while the random error captures the error originating with the input measurements for that particular event. The total error is considered to be $$\sigma^2 = \sigma_{Model}^2 + \sigma_{Measurement}^2 \qquad (42)$$

The total error is then available to use to appropriately weight observations. As before, these techniques are considered part of the prior art for impulsive transient events.

The extended duration of typical narrow band signals, including CW events, can also be advantageous. For example, single impulsive transient events may be considered the ideal ultimate in a time-defining signal, but single array track information is impossible to generate from a single impulsive transient. That is, there is no duration that exceeds a data frame.

In contrast, state based estimation using the multiple sensor arrays produces multiple single array tracks containing the azimuthal and dip angles for each data frame increment. Thus, the measurement (random) error term has two components, 1) an error in any individual azimuth measurement, or delazA; and 2) the error in the set of observed azimuths over time, or delazB. Regarding the error in the measured azimuth angle, the quality of the measurement in along each beam axis for each time increment can be determined with, for example, an F-statistic. It may be advantageous to determine this error ahead of time (a priori) as part of the array design and expected array performance. A Cramer-Rao Lower Bound (CRLB) calculation may be applied to constrain the variance on azimuth and dip angle measurements. The CRLB calculation determines the theoretical lower bound, or minimum, on the variance of an unbiased estimator of a deterministic parameter. Embodiments of the invention may use a CRLB calculation to populate delazA independent of in-situ measurements.

The second part of the random error term is the variance in the measurement of azimuth from multiple sequential data frames. This variation is measured as the sample variance of a random process and populates the delazB term. The combined error then becomes:

$$\sigma^2 = \sigma_{Model}^2 + [\text{delaz}A^2 + \text{delaz}B^2] \qquad (43)$$

For the global monitoring problem, the problem of determining location in a three-dimensional space and time is overdetermined with many observations, yielding a solution with a well determined error ellipse. For the case of passive local area monitoring, the location problem is underdetermined with only 2 azimuth observations. This is overcome by solving for the horizontal parameters (lat, lon), and including depth in the solution when dip is available and consistent. Thus, solution convergence will be routinely problematic without including these robust error terms. Including these terms allows the construction of a physically and numerically defensible error ellipse for each location.

When the dip angle observation is available and consistent, depth is able to be determined. The approach is exactly the same in evaluating a series of dip angle measurements and extracting the variance as performed for azimuth angle measurement. The above algorithmic approach is based upon determining an unbiased estimate, thus allowing for the error terms to appropriately reflect that uncertainty. In the presence of unknown biasing terms however, the estimate will also be biased. Reducing the error terms under that situation requires a better understanding of the result of the bias and removing that bias, either through a better theoretical understanding or applying an empirical correction.

Determining the summed total effects of the biased variables is accomplished through calibration, with a procedure where repeated controlled experiments are used for an empirical determination of the bias using, for example, known sources of energy actuated at known locations and depths (the ground truth locations). The empirical error between the solution of the location of the calibration sources and the ground truth location of the sources is the direct measurement of the systematic bias in azimuth or dip angle. Applying these bias terms to the location algorithm not only improves the location accuracy but reduces location uncertainty as well. The correction term is directly applied to the observed measurement.

Using the calibration procedure also avoids the need to fully understand the unknown biasing of the variables in the location problem. That is, the complete understanding is not required because the calibration correction removes the bias. The error in the measured correction term then is delazCal and replaces the model error. The total error becomes:

$$\sigma^2 = \sigma_{delazCal}^2 + [delazA^2 + delazB^2] \quad (44)$$

The same approach applies to correcting dip angles and determining source depth. The described location algorithm uses these correction terms determined as a function of geographic position and depth, as well as frequency to provide an accurate estimation of the three-dimensional location and the error in that location.

Spatial Tracking Stage 88 applies standard algorithms to track the source position over time. Typical algorithms used to produce a spatial track include the extended Kalman filter, the alpha-beta-gamma filter, particle filters, or Bayesian tracking methods. Features such as the source velocity vector and measures of track quality, are derivable from the spatial track information and stored with the track state in the Enterprise Database 74.

Following the spatial tracking process, the Activity Monitor Stage 90 monitors the set of all located and tracked sources for spatio-temporal activities of interest. Monitoring is across the entire set of spatial tracks and events derived from all arrays serviced by each Aggregator instance. The objective of the Activity Monitor stage is to combine information in the form of locations and spatial tracks to identify groupings meeting criteria indicative of an activity of interest. The Activity Monitor is an event-driven process, triggered upon update of the spatial track state with newly associated events for which association is based in part on processing of data indicative of locations.

Specifically, the Activity Monitor stage associates candidate spatial tracks and event locations with an "Activity" based upon measures of similarity, compatibility, and proximity. The similarity metrics are computed based on the time history of the spatial tracks and track information. Compatibility limits the association based on the likelihood of track information objects and events being of source classes consistent with participating in a common "Activity." For example, the likelihood of a stationary energy source and one that shows consistent motion being related to the same spatio-temporal activity is low, and can be made dispositive under a rule based approach.

The proximity measures use spatial tracks, track information objects, and events to compute a multi-dimensional statistical distance between candidates. A distance metric may be created from the Euclidean spatial distance, track time, and track duration, in combination with other quantitative features such that the overall metric resembles a Bhattacharyya or a Wasserstein distance. The "Activity," consisting of multiple spatial track objects, then becomes an information object comprised of the fused information from the population of spatial tracks, track information objects, and events having been associated to the Activity. Characteristics such as population, time density, duty cycle, centroid, convex volume or area, and spatial density are computed using the joint-information in the Activity. To fuse the information it is meant that the properties of the information objects are joined in the mathematical sense wherever appropriate by forming a union between sets. For example, the duration of the Activity is the total time duration from the initiation of the first single-array track object within the first spatial track associated to the Activity to the last update of the most recent spatial track associated to the Activity.

The Activity Monitor stage maintains the state of open activity information objects. The form of the state vector depends upon the source classes associated to the Activity, but in all cases would include source motion variables. The determination that a group of spatial tracks and events are an activity of interest can be based on the set of fused information present in the Activity along with the derived characteristics and the Activity state. Classification of the Activity is best performed using a regression-tree scheme that applies a label based upon broad criteria. For example, a single Activity may include sources indicating construction at a single location, or the Activity may include sources indicating a group of people on foot transiting the area. Activity classes are not so limited to these exemplary two activities, and would include all those that are separable, as well as "indeterminate" and "unknown."

The Aggregator Subsystem 24 also manages aggregator components of the Enterprise Database 74 which may be a plurality of discrete distributed media. The Database Management Subsystem 92 is responsible for starting and connecting a database server that provides services to the Aggregator Instance 80. The Database Management Subsystem 92 supports multiple types of databases. Upon startup, the Database Manager reads a configuration file determining which database server to configure and connect to the Aggregator Server 42.

The Database Management Subsystem 92 provides a common interface for storing, retrieving, and querying the Enterprise Database 92. The common interface allows the Aggregator and Aggregator Server to access different types of databases using the same methods without changing software. The common methods (e.g. store, retrieve, sql Query) and interfaces are implemented using a database factory for connecting different types of databases.

The Aggregator Server Subsystem 30 services multiple Aggregator Instances receiving database information originating with one or more Aggregator Instances, providing the interface and configuration information for users and services, managing the client interface and database services, and performs supervisory monitoring of the System. The Aggregator Server 42 communicates with the UI Subsystem 32 to provide periodic reports, Alerts and information requests, as a service to the UI.

The Aggregator Server Subsystem 30 provides the following administrative functions: User access configuration; Configures Services for dashboard display user interfaces (UIs); Configuration of UI Map Services; and Configuration of alert monitoring functions and Alert services.

The Aggregator Server Subsystem 30 provides the following supervisory monitoring functions: System stability monitoring for servers and arrays; Alert monitoring; State of health condition-based alerts; and alerts for Activities of interest.

The Aggregator Server Subsystem 30 also manages the following services: Alerting services; Web client services (including dashboard display data services and UI map services); Playback services; and External Command and Control Display Equipment (CCDE) interfacing services.

The Aggregator Server Subsystem provides for failover monitoring between primary and secondary servers. The SOH Subsystem 46 provides information that becomes entered into the Enterprise Database 74. The Aggregator Server 42 also monitors the SOH data and provides regular reports, either on demand or at specified intervals; automated notification upon occurrence of specific events; and notification if the System SOH reaches any of the user specified conditions. This information is made available through the UI, or through alternate channels such as text messages or phone calls for specific notifiable events.

The Aggregator Server 40 monitors Activity information entered into the Enterprise Database 74 on an event-driven basis and issues an Alert to the UI when confidence criteria are met for particular Activity classes, with that alert entered into a System log. The Aggregator Server 40 then maintains that Alert until such a time as it is dismissed, either by the automated analysis system or through the UI. The Aggregator Server 40 includes all of the software to support the UI subsystem 32. The UI software, discussed in following sections, is based on a client/server architecture.

The Aggregator Server functions as the web server which the web client connects to for retrieval and display of information on the GUI. For example, the client requests messages from the server for array SOH or Location data and displays the information on the map. Thus, any hardware capable of running web browser software that can connect to the Aggregator Server, such as a smart cellular telephone, a tablet or e-reader, or a computer, can be used to monitor the System 10. Playback services work in a similar way, with the web client controls requesting data from the Aggregator Server 40 to be appropriately processed prior to streaming to the client UI Subsystem 32 for playback. Playback Services replays stored historic events such as alphanumeric/waveform information, or waveform data that can be plotted as joint-time-frequency displays, or can be played through a speaker or headphone after applying the appropriate band-shifts for the human ear. The Aggregator Server playback controller functions include database search, setting the playback speed, JTF display processing, and server-side audio processing.

The Aggregator Server 40 also provides services for third-party command and control display equipment (CCDE). The Aggregator Server is the interface between the System and CCDE that is external to the System networks. The Aggregator Server external interface conforms to the Security Equipment Integration Working Group messaging standards SEIWC-0101C. For example, upon establishing connection, the Aggregator begins message flow and system reporting.

The session begins with reporting the status and configuration of the System 10. The CCDE acknowledges the information received to which the Aggregator Server 40 responds with "session established." Once the session is established between the CCDE and the Aggregator, information about the system can be reported, including device configuration, SOH fault, tamper, and Alert detections.

The operator interacts with the System 10 via the graphical user interface of the UI Subsystem 32 to examine maps, geographic data, and information logs related to the system SOH and notifiable events. Results from the processing pipeline are communicated via standard Web Services using the operator-specified security protocols to the designated computational resource under control of the System operator for display. The UI architecture is based on a client/server architecture. The Aggregator Server functions as the web server. The web UI client may be written in HTML and Javascript which runs in the browser. The web client connects to the Aggregator web server to download the information to display for the operator. For example, when the client requests messages from the server for array SOH or for location data, the information is displayed on a map provided by the UI Subsystem 32.

The UI Subsystem 32 performs the following functions: display of critical fault notifications; display of a Activity-of-Interest alert; displays of a complete system status on-demand; initiating system-wide self-test and array Built-In-Test (BIT) on command; playback of data; playback of sample cases that can be used for operator training; producing summary reports of status or logged Activities; and provision of form-based interfaces for interacting with the Enterprise Database 74.

Automated processing pipeline components of the System 10 provide alert status updates to the map and logs and provide updates to the operators as specified. All notifiable events are displayed on the map-based interface. The operator is able to pan and zoom in the geographic display. The geographic display interface is able to display a variety of maps such as standard street maps, shaded relief maps, contour maps, and satellite photo-mosaics. In all cases map layers may be added containing labels and annotations, political boundaries, and similar layers available in most geographic information systems. The map services use Javascript APIs (e.g. ArcGIS, Google Maps, etc.) to display information on the maps. Playback services work in a similar way, with the web client controls requesting data from the Aggregator Server to be appropriately processed prior to streaming to client UI for playback. Adjustable playback speed controls are made available on the UI.

Playback Services replay stored historic events such as alphanumeric/waveform information, or waveform data that can be plotted as joint-time-frequency displays or can be played through a speaker or headphone after applying the appropriate band-shifts for the human ear. In addition, the system can playback derived information such as joint time-azimuth displays, with additional single-array track information included as a separate layer. These playback functions are separate from the standardized geographic map displays. Nevertheless, logged alert events and associated information, such as Activities and/or spatial tracks can also be played back on top of the geographic map displays.

Systems and methods have been described for determining localization information for an energy source positioned below a ground surface. Analytical pipelines enable real time computationally complex assessments, including highly accurate position determinations and classifications for low energy level signals of interest. Illustrated embodiments utilize compact volumetric polytope arrays to perform coherent processing of signals of interest acquired with multiple arrays.

Coverage of the System 10 over terrain is scalable with incorporation of multiple sensor arrays allocated to Network Segments. Sensor array designs are three-dimensional with respect to wavelengths of interest, provide high probabilities of detection and accurate localization in 3D. The exemplary system detects low signal-to-noise ratio signals, characterizes the signal sources, associate like sources detected by multiple arrays, locates the physical position of the sources underground, and spatially tracks their movement, if any. Embodiments fuse angle of arrival information acquired with coherent processing and time of arrival information for still further improved localization accuracy. State of Health and Built-in-Test functions are available to identify changes in System performance, causes of change in performance and onset of failures. The combination of three-dimensional full aperture arrays with coherent processing enables discrimination between multiple similar, but spatially spaced-apart, sources. The System 10 is based on flexible, scalable hardware and software architectures which can be customized for differing applications, over wide ranges (e.g., linear boundaries or bounded areas extending to tens of kilometers and many square kilometers, respectively).

While the invention has been described with reference to particular embodiments, it will be understood by those skilled in the art that various changes may be made and equivalents may be substituted for elements thereof without departing from the scope of the invention. Accordingly, the scope of the invention is only limited by the claims which follow.

The claimed invention is:

1. A system for determining localization information for a first energy source positioned below a ground surface based on sensed seismic signals associated with a first signal of interest (SOI) generated by the first energy source, the first SOI including first waveform components associated with a first design frequency for which phase velocity and wavelength of the first waveform components vary based on properties of media below the ground surface, the system comprising: a sensor subsystem including a first group of seismic sensors arranged in a first array emplaced below the ground surface, which sensors are responsive to sense seismic energy from the first energy source in a frequency range extending from 10 Hz to 2 kHz, and where, a plurality of the sensors in the first array are point sensors spaced apart in a three-dimensional distribution, where at least one subset of sensors in the first series of
 sensors has a first separation distance that correlates with half the wavelength of a first waveform component in the first SOI associated with the first design frequency, and with respect to a horizontal plane extending along a direction parallel to a portion of the ground surface: sensors in the first array extend in a vertical dimension below the ground surface with the first separation distance between a first sensor in said one subset and a second sensor in said one subset; and
 a processing subsystem coupled to receive seismic data acquired from sensors in the first array, the processing subsystem including a processor and storage media having computer instructions stored thereon to perform spatial coherent processing of said first waveform components associated with the first design frequency, where:
 the coherent processing performed on seismic signals received from said at least one subset in the first series of sensors, determines a three dimensional angle of arrival of the first SOI from the first energy source to the first array.

2. The system of claim 1 where, the sensors in the first array are arranged as a three-dimensional bounded convex polytope with sensors at vertices of the polytope,
 and the exterior surface of the convex polytope defining convex polygons, the length of whose edges correspond to sensor separations specified according to a design frequency.

3. The system of claim 1 including
 a second subset of sensors having spacings between pairs of the sensors in said second subset rendering the coherent processing of said seismic signals responsive to waveform components associated with a second design frequency so that, when coherent processing is performed on seismic signals received from said second subset in the first series of sensor elements, a second three dimensional angle of arrival of a second SOI to the first array is determined; and
 relative to one of said waveform components associated with the second design frequency, impinging on a first sensor in said second subset, and having a wavelength associated with the second design frequency, at the first sensor in said second subset, the first sensor is a point sensor, having maximum dimensions less than five percent of the wavelength.

4. The system of claim 3 where, with respect to the horizontal plane extending along the direction parallel to a portion of the ground surface:
 sensors in the first array extend horizontally along and below the ground surface with a first separation distance between the first sensor in said second subset and a second sensor in said second subset; and
 the first separation distance correlates with half the wavelength of a second waveform component in the second SOI associated with the second design frequency when the second waveform component impinges on the sensors in said second subset.

5. The system of claim 1 configured to determine localization information where:
 the sensor subsystem includes a second group of seismic sensors arranged in a second array emplaced below the ground surface, which sensors are responsive to sense seismic energy from the first energy source in a frequency range extending from 10 Hz to 2 kHz; and the processing subsystem is coupled to receive seismic data acquired from sensors in the second array and execute computer instructions to perform coherent processing of said first waveform components associated with the first design frequency and acquired from sensors in the second array, where:
 a second subset of sensors in the second series of sensors has spacings between pairs of the sensors in said second subset rendering the coherent processing of said seismic signals responsive to the first waveform components associated with the first design frequency, and the coherent processing performed on seismic signals received from said at least the second subset in the second series of sensor elements determines, a three dimensional angle of arrival of the first SOI from the first energy
 source to the second array.

6. The system of claim 5 where:
 the three dimensional angle of arrival of the first SOI from the first energy source to the first array is defined by a first beam vector which intersects a reference point of the first array and the first waveform components from the first energy source;

the three dimensional angle of arrival of the first SOI from the first energy source to the second array is defined by a second beam vector which intersects a reference point of the second array and the first waveform components from the first energy source; and the processing subsystem includes storage media having further computer instructions stored thereon to provide location information for the first energy source based on intersection of the first and second beam vectors.

7. A method for determining localization information for a first energy source positioned below a ground surface based on sensed seismic signals associated with a first signal of interest (SOI) generated by the first energy source, the first SOI including first waveform components associated with a first design frequency for which phase velocity and wavelength of the first waveform components vary based on properties of media below the ground surface, the method comprising:

providing a sensor subsystem including a first group of seismic sensors arranged in a first array emplaced below the ground surface, which sensors are responsive to sense seismic energy from the first energy source in a frequency range extending from 10 Hz to 2 kHz, and where, a plurality of the sensors in the first array are point sensors spaced apart in a three-dimensional distribution, and at least one subset of sensors in the first series of sensors has a first separation distance that correlates with half the wavelength of a first waveform component in the first SOI associated with the first design frequency, and with respect to a horizontal plane extending along a direction parallel to a portion of the ground surface: sensors in the first array extend in a vertical dimension below the ground surface with the first separation distance between a first sensor in said one subset and a second sensor in said one subset;

providing a processing subsystem coupled to receive seismic data acquired from sensors in the first array, the processing subsystem including a processor and storage media having computer instructions stored thereon to perform spatial coherent processing of said first waveform components associated with the first design frequency; where the coherent processing performed on seismic signals received from said at least one subset in the first series of sensors, determines a three dimensional angle of arrival of the first SOI from the first energy source to the first array.

8. The method of claim 7 further comprising arranging the sensors in the first array as a three dimensional bounded convex polytope with sensors at vertices of the polytope, and the exterior surface of the convex polytope defining convex polygons, the length of whose edges correspond to sensor separations specified according to a design frequency.

9. The method of claim 7 further comprising:

providing a second subset of sensors having spacings between pairs of the sensors in said second subset rendering the coherent processing of said seismic signals responsive to waveform components associated with a second design frequency so that, in coherent processing performed on seismic signals received from said second subset in the first series of sensor elements, a second three dimensional angle of arrival of a second SOI to the first array is determined; and relative to one of said waveform components associated with the second design frequency, impinging on a first sensor in said second subset, and having a wavelength associated with the second design frequency, at the first sensor in said second subset, the first sensor is a point sensor, having maximum dimensions less than five percent of the wavelength.

10. The method of claim 9 further comprising:

with respect to the horizontal plane extending along the direction parallel to a portion of the ground surface:

arranging sensors in the first array to extend horizontally along and below the ground surface with a first separation distance between the first sensor in said second subset and a second sensor in said second subset; and the first separation distance correlates with half the wavelength of a second waveform component in the second SOI associated with the second design frequency when the second waveform component impinges on the sensors in said second subset.

11. The method of claim 7 further comprising:

providing, in the sensor subsystem, a second group of seismic sensors arranged in a second array emplaced below the ground surface, which sensors are responsive to sense seismic energy from the first energy source in a frequency range extending from 10 Hz to 2 kHz; and configuring the processing subsystem to receive seismic data acquired from sensors in the second array and execute computer instructions to perform coherent processing of said first waveform components associated with the first design frequency and acquired from sensors in the second array, where:

a second subset of sensors in the second series of sensors has spacings between pairs of the sensors in said second subset rendering the coherent processing of said seismic signals responsive to the first waveform components associated with the first design frequency, and the coherent processing performed on seismic signals received from said at least the second subset in the second series of sensor elements determines, a three dimensional angle of arrival of the first SOI from the first energy source to the second array.

12. The method of claim 11: where:

the three dimensional angle of arrival of the first SOI from the first energy source to the first array is defined by a first beam vector which intersects a reference point of the first array and the first waveform components from the first energy source;

the three dimensional angle of arrival of the first SOI from the first energy source to the second array is defined by a second beam vector which intersects a reference point of the second array and the first waveform components from the first energy source; and the method includes providing location information for the first energy source based on intersection of the first and second beam vectors.

\* \* \* \* \*